(12) United States Patent
Cho et al.

(10) Patent No.: US 10,804,567 B2
(45) Date of Patent: Oct. 13, 2020

(54) ELECTROLYTE SYSTEM FOR LITHIUM METAL SECONDARY BATTERY AND LITHIUM METAL SECONDARY BATTERY INCLUDING THE SAME

(71) Applicant: KOREA INSTITUTE OF SCIENCE AND TECHNOLOGY, Seoul (KR)

(72) Inventors: Won Il Cho, Seoul (KR); Mun Sek Kim, Seoul (KR); Ji Hyun Ryu, Seoul (KR); In Wook Nah, Seoul (KR); Min Seop Kim, Seoul (KR); Sun Min Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 175 days.

(21) Appl. No.: 15/975,016

(22) Filed: May 9, 2018

(65) Prior Publication Data
US 2018/0331393 A1 Nov. 15, 2018

(30) Foreign Application Priority Data

May 11, 2017 (KR) .......................... 10-2017-0058629
Jan. 3, 2018 (KR) .......................... 10-2018-0000649
(Continued)

(51) Int. Cl.
*H01M 10/0569* (2010.01)
*H01M 10/0525* (2010.01)
(Continued)

(52) U.S. Cl.
CPC ....... *H01M 10/0569* (2013.01); *H01M 4/382* (2013.01); *H01M 10/052* (2013.01);
(Continued)

(58) Field of Classification Search
CPC ......... H01M 10/0569; H01M 10/0567; H01M 10/0568; H01M 10/0525; H01M 10/052;
(Continued)

(56) References Cited

U.S. PATENT DOCUMENTS

2014/0127577 A1  5/2014  Fleischmann et al.
2017/0222268 A1* 8/2017  Abe ........................ H01M 6/16

FOREIGN PATENT DOCUMENTS

KR    10-1074783 B1    10/2011
KR    10-1471793 B1    12/2014
(Continued)

*Primary Examiner* — Laura Weiner
(74) *Attorney, Agent, or Firm* — Rabin & Berdo, P.C.

(57) ABSTRACT

Disclosed is an electrolyte for a lithium metal secondary battery and a lithium metal secondary battery including the same. An electrolyte system is intended to maintain the energy density of a secondary battery based on a lithium metal negative electrode and to extend the life of a battery. Particularly, an electrolyte for a lithium metal battery which forms a stable SEI film capable of inhibiting formation and extension of lithium dendrite so that the negative electrode of a lithium metal battery having a high possibility of battery ignition may be stabilized and an internal short-circuit may be prevented, and a lithium metal secondary battery including the same is provided.

16 Claims, 56 Drawing Sheets

(30) Foreign Application Priority Data

Jan. 3, 2018 (KR) .................. 10-2018-0000650
Jan. 3, 2018 (KR) .................. 10-2018-0000651

(51) Int. Cl.
*H01M 10/0567* (2010.01)
*H01M 4/38* (2006.01)
*H01M 10/0568* (2010.01)
*H01M 10/052* (2010.01)
*H01M 4/02* (2006.01)
*H01M 4/525* (2010.01)
*H01M 4/505* (2010.01)
*H01M 4/58* (2010.01)

(52) U.S. Cl.
CPC ... *H01M 10/0525* (2013.01); *H01M 10/0567* (2013.01); *H01M 10/0568* (2013.01); *H01M 4/505* (2013.01); *H01M 4/525* (2013.01); *H01M 4/5825* (2013.01); *H01M 2004/027* (2013.01); *H01M 2004/028* (2013.01); *H01M 2300/0037* (2013.01); *H01M 2300/0045* (2013.01); *Y02E 60/122* (2013.01)

(58) Field of Classification Search
CPC .... H01M 4/525; H01M 4/505; H01M 4/5825; H01M 4/382; H01M 2004/027; H01M 2300/0045; H01M 2300/0037; Y02E 60/122
See application file for complete search history.

(56) References Cited

FOREIGN PATENT DOCUMENTS

| KR | 10-2015-0004179 A | 1/2015 |
| KR | 10-1538079 B1 | 7/2015 |
| KR | 10-1586139 B1 | 1/2016 |
| KR | 10-2016-0078334 A | 7/2016 |

\* cited by examiner

ELECTROLYTE SYSTEM FOR LITHIUM METAL SECONDARY BATTERY AND LITHIUM METAL SECONDARY BATTERY INCLUDING THE SAME

CROSS-REFERENCE TO RELATED APPLICATIONS

This application claims, under 35 U.S.C. § 119, the priority of Korean Patent Application Nos. 10-2017-0058629, 10-2018-0000649, 10-2018-0000650, and 10-2018-0000651 filed on May 11, 2017, Jan. 3, 2018, Jan. 3, 2018, and Jan. 3, 2018, respectively, in the Korean Intellectual Property Office, the disclosures of which are incorporated herein by reference in their entireties.

TECHNICAL FIELD

The following disclosure relates to an electrolyte system for a lithium metal secondary battery and a lithium metal secondary battery including the same.

BACKGROUND

The first concept of a lithium ion battery (LiB) was suggested in 1962. Right after that, a LiB secondary battery was suggested by M. S. Whittingham (Exxon Company), followed by the disclosure of a Li—TiS$_2$ battery. However, commercialization of a battery using lithium metal and TiS$_2$ as a negative electrode and positive electrode, respectively, was failed. This is because a lithium metal battery (LiM) has poor safety and TiS$_2$ sensitive to air and water requires high cost for its preparation. Then, commercialization of a currently used LiB could be succeeded by solving the above-mentioned problems through the use of graphite and anodic oxide (developed by J. O. Besenhard) capable of reversible lithium intercalation and deintercalation as a negative electrode and positive electrode, respectively. At first, commercialized LiB products was launched by Sony Co. And Asahi Co. in 1991 for the first time and provided an innovative chance leading successful market extension of portable electronic instruments. After that, LiB was used explosively increasingly. Particularly, LiB has satisfied a need for electric energy related directly with continuous innovation of electric devices for daily uses, such as cellular phones, music players, speakers, drones, vehicles and microsensors. Many researchers and scientists have studies novel and advanced energy materials, chemistry and physics about fixed or mobile energy storage systems satisfying an increasing need for energy.

Recently, development of commercial LiB technology has reached a saturated state in which gradual improvement of electrochemical properties of LiB has been reported merely. Thus, it is essentially required to research and develop a novel energy storage material and system having a different form and composition. Therefore, secondary batteries, such as lithium-sulfur and lithium-air batteries, including lithium metal as a negative electrode and a convertible positive electrode have high energy density, and thus have been given many attentions as next-generation batteries. Sulfur and a carbon-based air positive electrode have a theoretical energy density of about 2,600 Wh/kg and about 11,400 Wh/kg, respectively, and show a high energy density value corresponding to approximately 10 times of the energy density (about 360 Wh/kg, C/LiCoO$_2$) of the conventional LiB. Lithium metal, one of the negative electrode materials, has a high theoretical energy density of about 3,860 Wh/kg in combination with a significantly low redox potential (−3.04V vs. S.H.E.) and a density of 0.59 g/cm$^3$, while a graphite negative electrode material has a theoretical density of about 372 mAh/g, a slightly high redox potential and density. Therefore, when a lithium negative electrode substitutes for a graphite negative electrode, it is possible to increase the energy density per unit weight of LiB significantly. When lithium-sulfur and lithium-air batteries are commercialized in the future, a lithium metal negative electrode and a convertible positive electrode material can suggest a hopeful guideline in the industrial field requiring a need for high energy density.

Although the battery using lithium metal as a negative electrode has the above-mentioned advantages, it still has a problem to be solved for its commercialization. First of all, it is required to ensure reversibility between deposition and dissolution of lithium ions. High reactivity and non-uniform deposition of lithium causes some problems, such as thermal runaway, electrolyte decomposition and lithium loss. Non-uniform deposition of lithium ions occurring during a charging process causes growth of dendrite having a shape of branches, which leads to problems, such as growth of a solid electrolyte interface (SEI) film, low Coulomb efficiency caused by a side reaction between an electrolyte and a lithium negative electrode, and rapid degradation of electrochemical properties of a lithium surface. In addition, a short-circuit caused by the growth of lithium dendrite generates a large amount of heat and flame, resulting in a serious safety problem causing ignition of a combustible organic material, electrolyte. Therefore, it is necessary to form a stable SEI on a lithium negative electrode in order to inhibit formation of dendrite and severe side reaction with an electrolyte and thus to improve safety. This can be solved by combining salts used for the electrolyte suitably to modify the ingredients forming the SEI film. It is important to form a thin and rigid SEI film having high lithium ion conductivity on the surface of a lithium negative electrode. In addition, development of an electrolyte system which allows a positive electrode to retain desired properties is a key point in development of lithium metal batteries.

REFERENCES

Patent Documents (Patent Document 1) Korean Patent No. 10-1586139
(Patent Document 2) Korean Patent Publication No. 10-2016-0078334
(Patent Document 3) Korean Patent No. 10-1471793
(Patent Document 4) Korean Patent No. 10-1538079
(Patent Document 5) Korean Patent No. 10-1074783
(Patent Document 6) Korean Patent Publication No. 10-2015-0004179
(Patent Document 7) US Patent Publication No. 2014/0127577

SUMMARY

During electrochemical cycles, a highly active and soft lithium surface tends to form dendrite during a charging process due to a local difference in current density on the non-uniform surface. When formation of dendrite growing like resin is extended, the surface area of a lithium negative electrode increases rapidly, resulting in continuous formation of a solid electrolyte interface (SEI) film on the lithium negative electrode surface. In addition, due to such continuous formation of a thick SEI film, exhaustion of an electrolyte and degradation of lithium ion conductivity of the lithium negative electrolyte may be generated undesirably. To inhibit formation of unstable SEI caused by formation of lithium dendrite, an embodiment of the present disclosure provides an electrolyte using a salt, such as lithium tribis (fluorosulfony)imide (LiTFSI), lithium bis(fluorosulfonyl) imide (LiFSi), lithium bis(oxalate)borate (LiBOB), lithium hexafluorophosphate (LiPF$_6$) or lithium fluoride (LiF), dissolved in a solvent, such as ethylene carbonate (EC), dimethyl carbonate (DMC) or 1,2-dimethoxyethane (DME), in combination with fluoroethylene carbonate (FEC) or vinylene carbonate (VC). The electrolyte may be used interchangeably with various positive electrode materials for lithium metal batteries. As a result, it was possible to form a thin, rigid and stable SEI on the surface of a lithium negative electrolyte and to inhibit a side reaction with an electrolyte by using the electrolyte system disclosed herein, thereby improving the cycle life and capacity maintenance of a battery based on a lithium metal negative electrode.

In one aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including LiPF$_6$; and (d) a solvent including a mixture of EC with DMC, and further includes (e) at least one solvent-like additive selected from FEC and VC, wherein the solvent-like additive is at least one selected from 0.4-1.5 wt % of FEC and 0.01-3.5 wt % of VC based on the total weight of the electrolyte.

In another aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including LiPF$_6$; and (d) a solvent including a mixture of EC with DMC, and further includes (e) a first solvent-like additive selected from FEC and VC, and (f) tetrafluoroethylene carbonate (TFEC) as a second solvent-like additive, wherein the first solvent-like additive is at least one selected from 0.4-1.5 wt % of FEC and 0.01-3.5 wt % of VC based on the total weight of the electrolyte, and the second solvent-like additive is used in an amount of 2.5-4.5 wt % based on the total weight of the electrolyte.

In still another aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including LiPF$_6$; and (d) a solvent including a mixture of EC with DMC, and further includes (e) a first solvent-like additive selected from FEC and VC, and (f) LiBF$_4$ as a fourth salt, optionally with (g) TFEC as a second solvent-like additive, wherein the first solvent-like additive is at least one selected from 0.4-1.5 wt % of FEC and 0.01-3.5 wt % of VC based on the total weight of the electrolyte, the fourth salt has a concentration of 0.02-0.06M, and when the second solvent-like additive is used, the second solvent-like additive is present in an amount of 0.8-1.2 wt % based on the total weight of the electrolyte.

In still another aspect, there is provided a lithium metal secondary battery including the electrolyte for a lithium metal secondary battery disclosed herein.

In yet another aspect, there is provided an electric device including the electrolyte for a lithium metal secondary battery disclosed herein.

The present disclosure is directed to providing an electrolyte system which allows maintenance of the energy density of a secondary battery based on a lithium metal negative electrode and extension of the life thereof. Ultimately, the present disclosure relates to application of lithium metal in combination with various positive electrodes, such as a transition metal oxide, sulfur and a cathode, used for lithium metal batteries having high energy density in addition to conventional lithium ion batteries used for the future autonomous electric vehicles and electrical grid energy storage systems. Recently, it is expected that the present disclosure contributes to development of autonomous devices, such as drones spotlighted recently. It is also expected that global competitiveness of the related secondary battery and electrochemical capacitor industry is secured. Particularly, when treating materials having high-density energy, studies about safety have been given many attentions recently as one of the core studies. This is because when high energy density is to be realized in commercialization of the products, safety of the products is degraded. Recently, it is essentially required to ensure the safety of a high-energy density battery due to social and technical backlashes caused by ignition of cellular phones. Particularly, since the approaching next-generation batteries have an energy density at least 2 times and at most 8 times higher than the energy density of the existing lithium ion batteries, the batteries and systems treating the same should be subjected to research and examination about their safety. Therefore, the present disclosure provides an electrolyte for a lithium metal battery which forms a stable SEI film capable of inhibiting formation and extension of lithium dendrite so that the negative electrode of a lithium metal battery having a high possibility of battery ignition may be stabilized and an internal short-circuit may be prevented.

DETAILED DESCRIPTION OF EMBODIMENTS

Figure 1A:
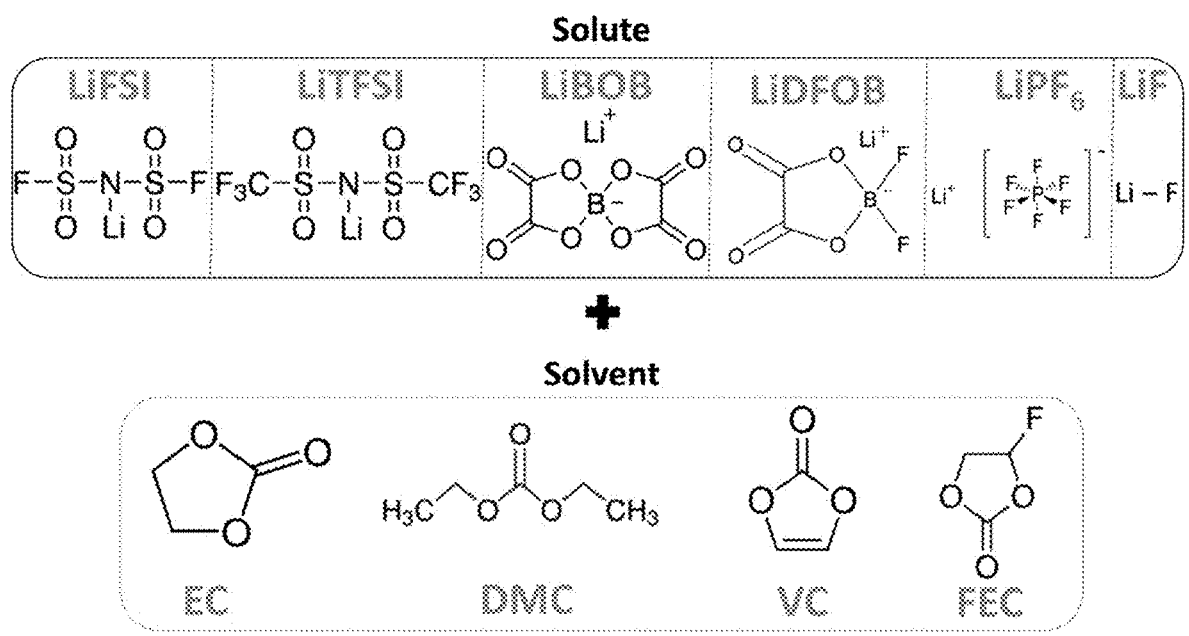
FIG. 1A to FIG. 1C illustrate the molecular structures of LiFSI, LiTFSI, LiBOB, LiDFOB, LiPF$_6$ and LiF salts and solvents, such as EC, DMC, VC and FEC forming the electrolyte disclosed herein.
Figure 1B:
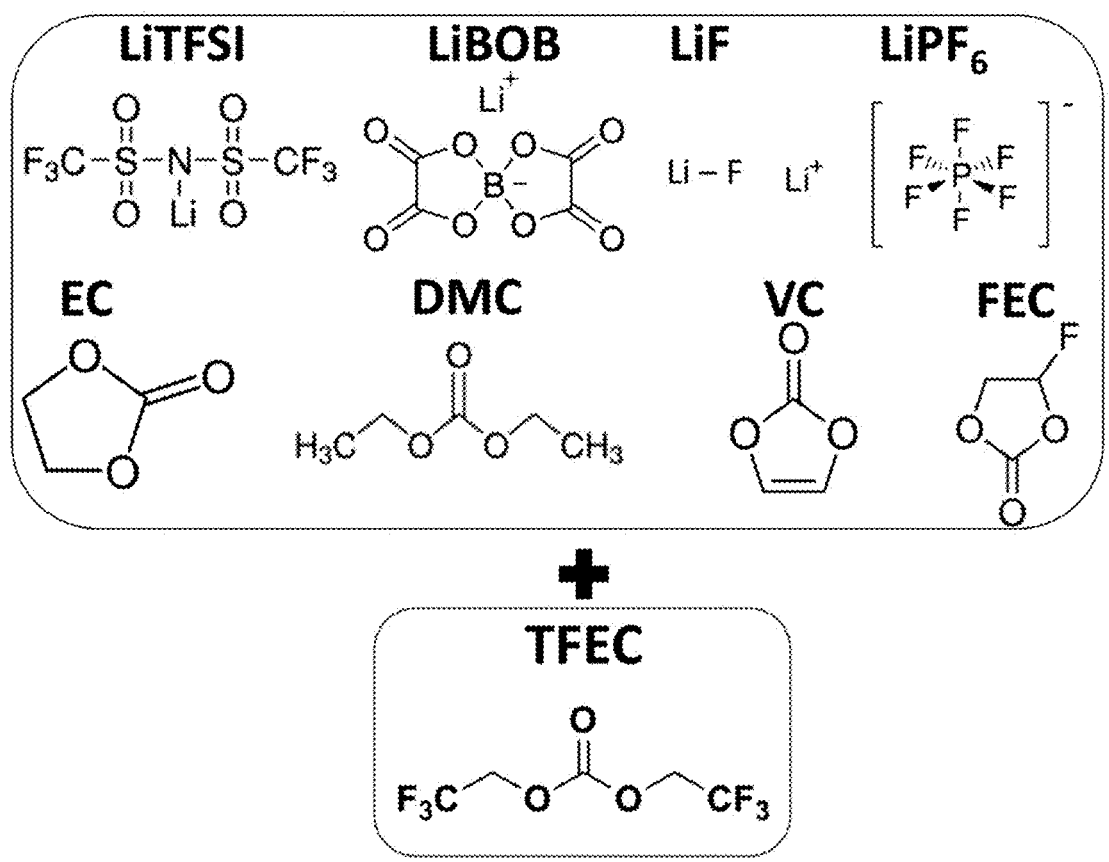
Figure 1C:
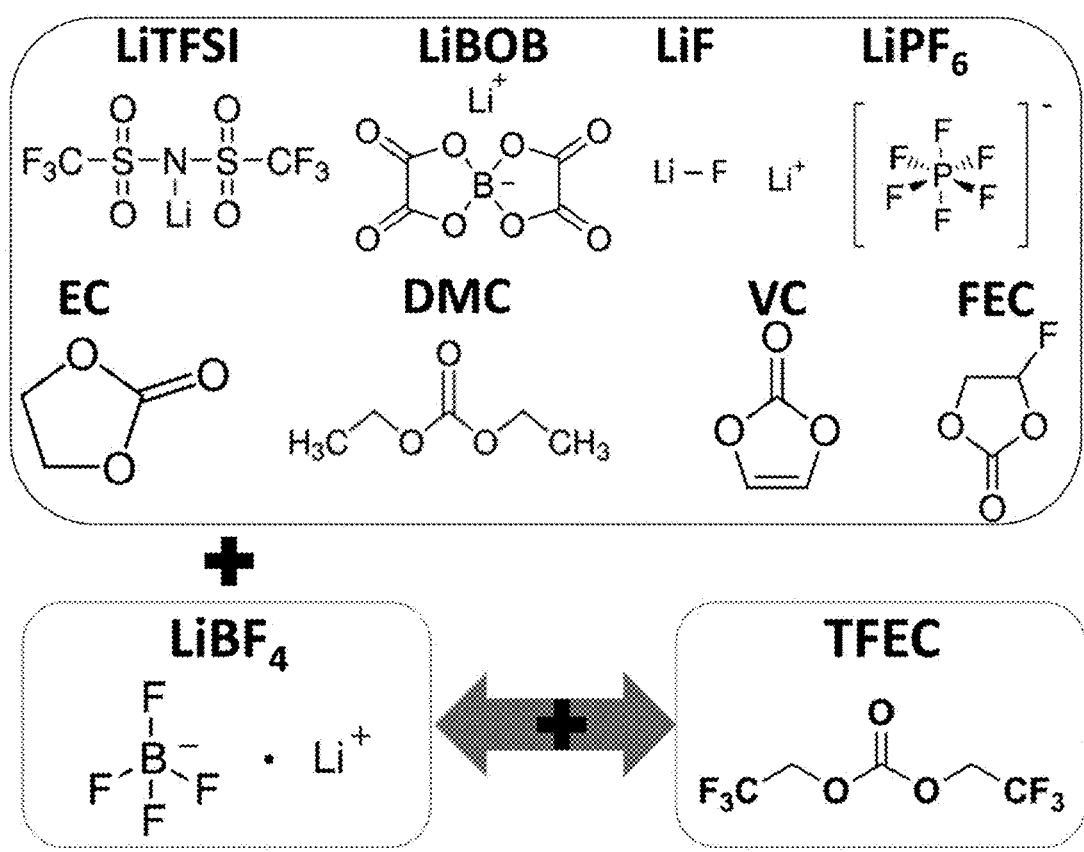

Hereinafter, various aspects and embodiments of the present disclosure will be explained in more detail.

In one aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including $LiPF_6$; and (d) a solvent including a mixture of EC with DMC, and further includes (e) at least one solvent-like additive selected from FEC and VC, wherein the solvent-like additive is at least one selected from 0.4-1.5 wt % of FEC and 0.01-3.5 wt % of VC based on the total weight of the electrolyte.

According to an embodiment, the first salt includes 0.2-0.4 M of LiFSI and 0.2-0.4 M of LiTFSI, or includes 0.3-1 M of LiTFSI alone, wherein the concentration of $LiPF_6$ is 0.03-0.07 M and the mixing ratio by weight of EC to DMC is 3-6:7-4.

According to another embodiment, the first salt includes 0.5-0.7 M of LiTFSI alone, the second salt includes 0.3-0.5 M of LiBOB alone and the third salt includes 0.4-0.5 M of LiF alone, wherein the concentration of $LiPF_6$ is 0.04-0.06 M and the mixing ratio by weight of EC to DMC is 3.75-5.25:6.25-4.75.

According to still another embodiment, the solvent-like additive is 0.5-1.3 wt % of FEC based on the total weight of the electrolyte and may optionally include 0.01-3.5 wt % of VC.

According to still another embodiment, the electrolyte for a lithium metal secondary battery further includes LiF salt.

According to still another embodiment, the LiF salt has a concentration of 0.3-0.5 M.

According to still another embodiment, the solvent-like additive is 0.7-1.3 wt % of FEC based on the total weight of the electrolyte.

According to the most preferred embodiment, in the electrolyte for a lithium metal secondary battery including: (a) a first salt selected from LiFSI, LiTFSI and a combination thereof; (b) a second salt selected from LiBOB, LiDFOB and a combination thereof; and (c) a solvent including a mixture of EC with DMC, and further includes (d) at least one solvent-like additive selected from FEC and VC, wherein the solvent-like additive is at least one selected from 0.4-1.5 wt % of FEC and 0.01-3.5 wt % of VC based on the total weight of the electrolyte, the following six conditions are significantly important: ① the first salt includes 0.5-0.7 M of LiTFSI alone, ② the second salt includes 0.35-0.45 M of LiBOB alone, ③ the concentration of $LiPF_6$ is 0.04-0.06 M, ④ particularly, the mixing ratio by weight of EC to DMC is 3.75-5.25:6.25-4.75, ⑤ the electrolyte further includes 0.4-0.5 M of LiF salt, and ⑥ the solvent-like additive includes 0.8-1.2 wt % of FEC based on the total weight of the electrolyte and optionally includes 0.01-3.5 wt % of VC.

When the above-mentioned six conditions were satisfied, it was determined through XPS analysis, etc. that the amount of LiF and polycarbonate ($CO_3$) in the SEI was increased, binding points of vinyl carbonate were formed newly due to decomposition of FEC, and physical properties of the LiF-based SEI were varied. Then, it was also determined that electrochemical stability and maintenance characteristics of the SEI were improved and interfacial resistance was maintained consistently by converting a boron-containing SEI into an elastic SEI while maintaining one of the properties thereof, i.e. dense and rigid property.

It was shown that such improvement of the effects and realization of a novel effect were not observed, if any one of the six conditions was not satisfied. In addition, it was shown that such effects were provided only when the above-described electrolyte was applied to a lithium metal secondary battery using lithium metal itself as a negative electrode, or a lithium-sulfur secondary battery or lithium-air secondary battery using a carbonate-based electrolyte, but were not realized in a lithium ion secondary battery using a carbonaceous material or silicone as a negative electrode. This is because the SEI is formed directly on the surface of lithium metal. Thus, in an electrode for a lithium ion secondary battery having a mechanism of lithium ion intercalation/deintercalation, such as a material including graphite, silicon or metal oxide, the above-mentioned effects were not obtained.

Particularly, LiFSI and LiTFSI form a lithium fluoride (LiF)-enriched SEI film on the surface of lithium metal through corrosion to increase lithium ion conductivity. In addition, they are more electrochemically stable and have higher thermal stability as compared to $LiPF_6$. LiBOB also forms an SEI containing boron and $Li_2SO_4$ ingredients through corrosion to provide a thin rigid SEI film having high lithium ion conductivity. $LiPF_6$ salt allows incorporation of a polycarbonate ingredient to the SEI on the surface of a lithium negative electrode to control the formation and shape of lithium dendrite, thereby providing improved electrochemical stability to the lithium negative electrode. Therefore, it is possible to form a stable SEI film on the surface of the lithium negative electrode, and thus to provide the life and energy density maintenance of a lithium metal battery.

Figure 9A:
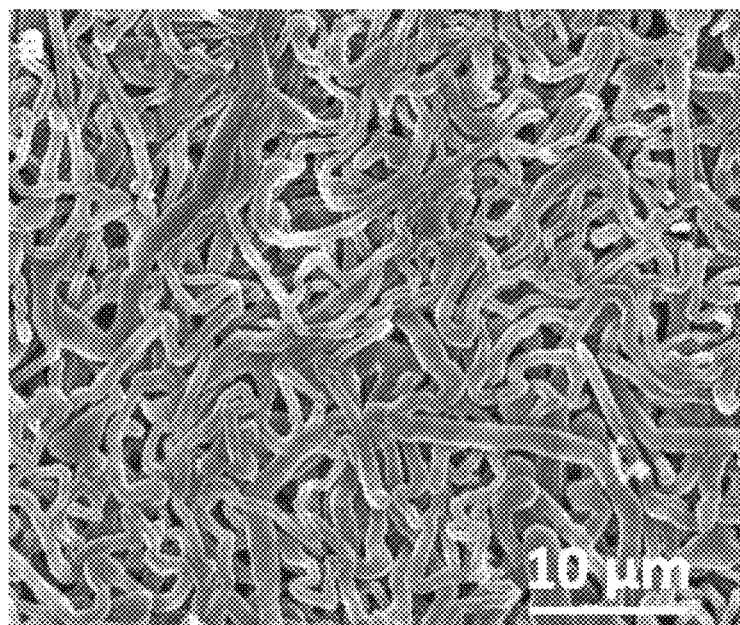
FIGS. 9A and 9B show images of lithium surfaces taken by scanning electron microscopy (SEM) after carrying out cycles by using electrolytes including LiTFSI, LiBOB and LiPF$_6$ salts and EC:DMC to which additive solvents are added or not.
Figure 9B:
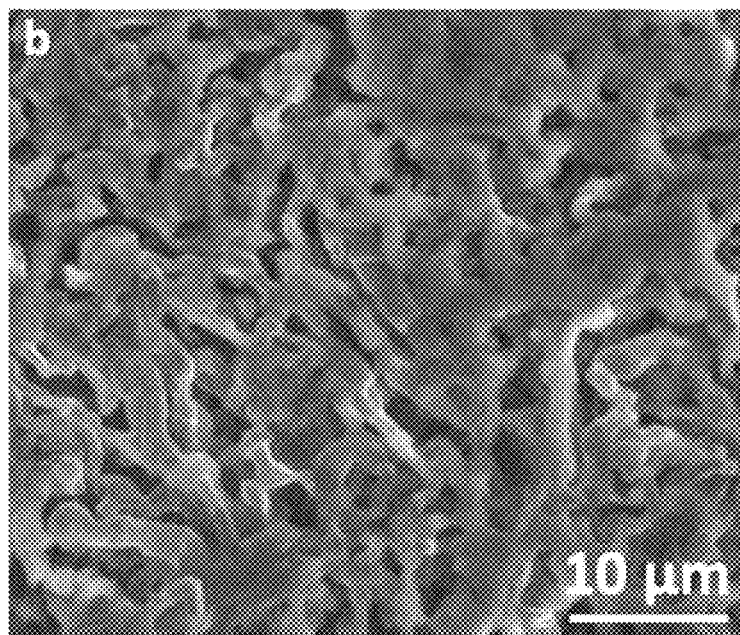

When a mixed solvent of EC with DMC is used as a solvent and the concentration of each salt and the weight ratio of the mixed solvent satisfy the above-mentioned conditions, corrosion of aluminum as a positive electrode current collector caused by LiFSI and LiTFSI is interrupted (FIG. 10), while a structure of stable and elastic SEI in which continuous formation of dendrite is inhibited can be determined (FIGS. 9A and 9B). Thus, not only a heterogeneous effect but also a homogeneous effect is improved significantly. As a result, when a mixed solvent of EC with DMC is used as a solvent and the concentration of each of the added solvents and salts and the weight ratio of the mixed solvent satisfy the above-mentioned conditions, the most stable SEI is formed on the lithium-electrolyte interface to provide excellent lithium metal battery characteristics.

On the contrary, when any one of the above-mentioned ranges is not satisfied, an improper amount of LiF is incorporated to the SEI due to a varied composition of LiFSI, LiTFSI, $LiPF_6$ salts and FEC, VC added solvents to cause degradation of the mechanical and electrochemical properties of the SEI, which causes an increase in interfacial resistance in a lithium metal negative electrode. Moreover, when the concentration of main salts (LiTFSI, LiBOB) is beyond the above-defined range, low LiBOB solubility is provided to cause instability of electrolyte precipitating in the dissolved lithium salt. The above-suggested composition functions to improve not only the electrochemical properties of a lithium metal battery but also the stability of an electrolyte. Particularly, even if a small amount of the other salt, such as LiDFOB, is incorporated and the added solvents, FEC and VC, are added at a ratio beyond the above-defined range, it is shown that the SEI shows poor stability, the life of a battery is degraded and the resistance of the negative electrode is increased.

In another aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including $LiPF_6$; and (d) a solvent including a mixture of EC with DMC, and further includes (e) a first solvent-like additive selected from FEC and VC, and (f) TFEC as a second solvent-like additive, wherein the first solvent-like additive is at least one selected from 0.4-1.5 wt % of FEC and 0.01-3.5 wt % of VC based on the total weight of the electrolyte, and the second solvent-like additive is used in an amount of 2.5-4.5 wt % based on the total weight of the electrolyte.

According to an embodiment, the first salt includes 0.2-0.4 M of LiFSI and 0.2-0.4 M of LiTFSI, or includes 0.3-1 M of LiTFSI alone, wherein the concentration of $LiPF_6$ is 0.03-0.07 M and the mixing ratio by weight of EC to DMC is 3-6:7-4.

According to another embodiment, the first salt includes 0.5-0.7 M of LiTFSI alone and the second salt includes 0.3-0.5 M of LiBOB alone, wherein the concentration of $LiPF_6$ is 0.04-0.06 M and the mixing ratio by weight of EC to DMC is 3.75-5.25:6.25-4.75.

According to still another embodiment, the first solvent-like additive is 0.5-1.3 wt % of FEC based on the total weight of the electrolyte and may optionally include 0.01-3.5 wt % of VC.

According to still another embodiment, the electrolyte for a lithium metal secondary battery further includes LiF salt.

According to still another embodiment, the LiF salt has a concentration of 0.3-0.5 M.

According to still another embodiment, the first solvent-like additive is 0.7-1.3 wt % of FEC based on the total weight of the electrolyte.

According to the most preferred embodiment, in the electrolyte for a lithium metal secondary battery including: (a) a first salt selected from LiFSI, LiTFSI and a combination thereof; (b) a second salt selected from LiBOB, LiDFOB and a combination thereof; (c) a solvent including a mixture of EC with DMC, and further includes (d) a first solvent-like additive selected from FEC and VC, and (f) TFEC as a second solvent-like additive, wherein the solvent-like additive is at least one selected from 0.4-1.5 wt % of FEC and 0.01-3.5 wt % of VC based on the total weight of the electrolyte, the following seven conditions are significantly important: ① the first salt includes 0.5-0.7 M of LiTFSI alone, ② the second salt includes 0.35-0.45 M of LiBOB alone, ③ the concentration of $LiPF_6$ is 0.04-0.06 M, ④ particularly, the mixing ratio by weight of EC to DMC is 3.75-5.25:6.25-4.75, ⑤ the electrolyte further includes 0.3-0.5 M of LiF salt, the first solvent-like additive includes 0.8-1.2 wt % of FEC based on the total weight of the electrolyte and optionally includes 0.01-3.5 wt % of VC, and ⑦ the concentration of the second solvent-like additive is 2.5-3.5 wt % based on the total weight of the electrolyte.

When the above-mentioned seven conditions were satisfied, it was determined through XPS analysis, etc. that peaks of —$CF_2$—$CF_2$ and —$CF_2$—$CH_2$ were formed newly due to decomposition of TFEC, and physical properties of the LiF-based SEI were varied. Then, it was also determined that electrochemical stability and maintenance characteristics of the SEI were improved and interfacial resistance was maintained consistently by converting a boron-containing SEI into a more elastic SEI (FIGS. 9A and 9B) through the new binding points of —$CF_2$—$CF_2$ and $CF_2$—$CH_2$, while maintaining one of the properties thereof, i.e. dense and rigid property.

It was shown that such improvement of the effects and realization of a novel effect were not observed if any one of the seven conditions was not satisfied. In addition, it was shown that such effects were provided only when the above-described electrolyte was applied to a lithium metal secondary battery using lithium metal itself as a negative electrode, or a lithium-sulfur secondary battery or lithium-air secondary battery using a carbonate-based electrolyte, but were not realized in a lithium ion secondary battery using a carbonaceous material or silicone as a negative electrode. This is because the SEI is formed directly on the surface of lithium metal. Thus, in an electrode for a lithium ion secondary battery having a mechanism of lithium ion intercalation/deintercalation, such as a material including graphite, silicon or metal oxide, the above-mentioned effects were not obtained.

Particularly, LiFSI, LiTFSI and TFEC form a lithium fluoride (LiF)-enriched SEI film having —$CF_2$—$CF_2$ and $CF_2$—$CH_2$ on the surface of lithium metal through corrosion to increase lithium ion conductivity. In addition, they are more electrochemically stable and have higher thermal stability as compared to $LiPF_6$. LiBOB also forms an SEI containing boron and $Li_2SO_4$ ingredients through corrosion to provide a thin rigid SEI film having high lithium ion conductivity. $LiPF_6$ salt allows incorporation of polycarbonate ingredient to the SEI on the surface of a lithium negative electrode to control the formation and shape of lithium dendrite, thereby providing improved electrochemical stability to the lithium negative electrode. Therefore, it is possible to form a stable SEI film on the surface of the lithium negative electrode, and thus to provide the life and energy density maintenance of a lithium metal battery.

When a mixed solvent of EC with DMC is used as a solvent and the concentration of each salt and the weight ratio of the mixed solvent satisfy the above-mentioned conditions, corrosion of aluminum as a positive electrode current collector caused by LiFSI and LiTFSI is interrupted (FIG. 10), while a structure of stable and elastic SEI in which continuous formation of dendrite is inhibited can be determined (FIGS. 9A and 9B). Thus, not only a heterogeneous effect but also a homogeneous effect is improved significantly. As a result, when a mixed solvent of EC with DMC is used as a solvent and the concentration of each of the added solvents and salts and the weight ratio of the mixed solvent satisfy the above-mentioned conditions, the most stable SEI is formed on the lithium-electrolyte interface to provide excellent lithium metal battery characteristics.

On the contrary, when any one of the above-mentioned ranges is not satisfied, an improper amount of —F binding forms are incorporated to the SEI due to a varied composition of LiFSI, LiTFSI, $LiPF_6$ salts and FEC, VC, TFEC added solvents to cause degradation of the mechanical and electrochemical properties of the SEI, which causes an increase in interfacial resistance in a lithium metal negative electrode. Moreover, when the concentration of main salts (LiTFSI, LiBOB) is beyond the above-defined range, low LiBOB solubility is provided to cause instability of electrolyte precipitating in the dissolved lithium salt. The above-suggested composition functions to improve not only the electrochemical properties of a lithium metal battery but also the stability of an electrolyte. Particularly, even if a small amount of the other salt, such as LiDFOB, is incorporated and the added solvents, FEC and VC, are added at a ratio beyond the above-defined range, it is shown that the SEI shows poor stability, the life of a battery is degraded and the resistance of the negative electrode is increased.

In still another aspect, there is provided an electrolyte for a lithium metal secondary battery which includes: (a) a first salt selected from LiFSI, LiTFSI and a combination thereof; (b) a second salt selected from LiBOB, LiDFOB and a combination thereof; (c) a third salt including $LiPF_6$; and (d) a solvent including a mixture of EC with DMC, and further includes (e) a first solvent-like additive selected from FEC and VC, and (f) $LiBF_4$ as a fourth salt, optionally with (g) TFEC as a second solvent-like additive, wherein the first solvent-like additive is at least one selected from 0.4-1.5 wt % of FEC and 0.01-3.5 wt % of VC based on the total weight of the electrolyte, the fourth salt has a concentration of 0.02-0.06M, and when the second solvent-like additive is used, the second solvent-like additive is present in an amount of 0.8-1.2 wt % based on the total weight of the electrolyte.

According to an embodiment, the first salt includes 0.2-0.4 M of LiFSI and 0.2-0.4 M of LiTFSI, or includes 0.3-1 M of LiTFSI alone, wherein the concentration of $LiPF_6$ is 0.03-0.07 M and the mixing ratio by weight of EC to DMC is 3-6:7-4.

According to another embodiment, the first salt includes 0.5-0.7 M of LiTFSI alone and the second salt includes 0.3-0.5 M of LiBOB alone, wherein the concentration of $LiPF_6$ is 0.04-0.06 M and the mixing ratio by weight of EC to DMC is 3.75-5.25:6.25-4.75.

According to still another embodiment, the first solvent-like additive is 0.5-1.3 wt % of FEC based on the total weight of the electrolyte and may optionally include 0.01-3.5 wt % of VC.

According to still another embodiment, the electrolyte for a lithium metal secondary battery further includes LiF salt.

According to still another embodiment, the LiF salt has a concentration of 0.3-0.5 M.

According to still another embodiment, the first solvent-like additive is 0.7-1.3 wt % of FEC based on the total weight of the electrolyte.

According to a preferred embodiment, in the electrolyte for a lithium metal secondary battery including: (a) a first salt selected from LiFSI, LiTFSI and a combination thereof; (b) a second salt selected from LiBOB, LiDFOB and a combination thereof; (c) a solvent including a mixture of EC with DMC, and further includes (d) a first solvent-like additive selected from FEC and VC, and (f) $LiBF_4$ as a fourth salt, wherein the solvent-like additive is at least one selected from 0.4-1.5 wt % of FEC and 0.01-3.5 wt % of VC based on the total weight of the electrolyte, the following nine conditions are significantly important: ① the first salt includes 0.5-0.7 M of LiTFSI alone, ② the second salt includes 0.35-0.45 M of LiBOB alone, ③ the concentration of $LiPF_6$ is 0.04-0.06 M, ④ particularly, the mixing ratio by weight of EC to DMC is 3.75-5.25:6.25-4.75, ⑤ the electrolyte further includes 0.3-0.5 M of LiF salt, ⑥ the first solvent-like additive includes 0.8-1.2 wt % of FEC based on the total weight of the electrolyte and optionally includes 0.01-3.5 wt % of VC, ⑦ the concentration of the second solvent-like additive is 0.8-1.2 wt % based on the total weight of the electrolyte, ⑧ the electrolyte further includes $LiBF_4$ as a fourth salt at a concentration of 0.04-0.06 M, and ⑨ the electrolyte optionally further includes TFEC as a second solvent-like additive, and when the second solvent-like additive is used, the second solvent-like additive is present at a concentration of 0.8-1.2 wt % based on the total weight of the electrolyte.

According to the most preferred embodiment, in the electrolyte for a lithium metal secondary battery including: (a) a first salt selected from LiFSI, LiTFSI and a combination thereof; (b) a second salt selected from LiBOB, LiDFOB and a combination thereof; (c) a third salt including $LiPF_6$; and (d) a solvent including a mixture of EC with DMC, and further includes (e) a first solvent-like additive selected from FEC and VC and (f) $LiBF_4$ as a fourth salt, optionally with (g) TFEC as a second solvent-like additive, wherein the first solvent-like additive is at least one selected from 0.4-1.5 wt % of FEC and 0.01-3.5 wt % of VC based on the total weight of the electrolyte, the following twelve conditions are significantly important: ① the first salt includes 0.5-0.7 M of LiTFSI alone, ② the second salt includes 0.35-0.45 M of LiBOB alone, ③ the concentration of $LiPF_6$ is 0.04-0.06 M, ④ the mixing ratio by weight of EC to DMC is 3.75-5.25:6.25-4.75, ⑤ the electrolyte further includes 0.3-0.5 M of LiF salt, ⑥ the first solvent-like additive includes 0.8-1.2 wt % of FEC based on the total weight of the electrolyte and optionally includes 0.01-3.5 wt % of VC, ⑦ the third salt includes $LiPF_6$ alone, and the concentration of $LiPF_6$ is 0.04-0.06 M, ⑧ the fourth salt has a concentration of 0.02-0.04 M, ⑨ the electrolyte further includes 0.05-0.1 M of $LiNO_3$ salt, ⑩ the mixing ratio by weight of EC to DMC is 0.6-0.8:0.2-0.4, ⑪ the first solvent-like additive includes 0.8-1.2 wt % of FEC and 0.01-3.5 wt % of VC based on the total weight of the electrolyte, and ⑫ the electrolyte includes the second solvent-like additive in an amount of 2.5-3.5 wt % based on the total weight of the electrolyte.

When the above-mentioned nine conditions or the next twelve conditions were satisfied, it was determined through XPS analysis, etc. that the amount of LiF and polycarbonate, C—F, C═O, C—O and C(O)F ingredients in the SEI is increased and new binding sites of $CF_2$, $—CF_3$ are shown due to decomposition of $LiBF_4$ (FIG. 25), and physical properties of the LiF-based SEI were varied. It was determined that the SEI composition in the electrolyte containing 0.05M $LiBF_4$ added thereto provided significantly improved stability/maintenance of a lithium negative electrode and lithium ion conductivity.

If any one of the above-mentioned nine conditions or twelve conditions is not satisfied, it was shown that such improvement of the effects and realization of a novel effect were not observed. In addition, it was shown that such effects were provided only when the above-described electrolyte was applied to a lithium metal secondary battery using lithium metal itself as a negative electrode, or a lithium-sulfur secondary battery or lithium-air secondary battery using a carbonate-based electrolyte, but were not realized in a lithium ion secondary battery using a carbonaceous material or silicone as a negative electrode. This is because the SEI is formed directly on the surface of lithium metal. Thus, in an electrode for a lithium ion secondary battery having a mechanism of lithium ion intercalation/deintercalation, such as a material including graphite, silicon or metal oxide, the above-mentioned effects were not obtained.

Particularly, LiFSI and LiTFSI form a lithium fluoride (LiF)-enriched SEI film on the surface of lithium metal through corrosion to increase lithium ion conductivity. In addition, they are more electrochemically stable and have higher thermal stability as compared to $LiPF_6$. LiBOB also forms an SEI containing boron and $Li_2SO_4$ ingredients through corrosion to provide a thin rigid SEI film having high lithium ion conductivity. $LiPF_6$ salt allows incorporation of poly($CO_3$) ingredient to the SEI on the surface of a lithium negative electrode to control the formation and shape of lithium dendrite, thereby providing improved electrochemical stability to the lithium negative electrode. Therefore, it is possible to form a stable SEI film on the surface of the lithium negative electrode, and thus to provide the life and energy density maintenance of a lithium metal battery.

When a mixed solvent of EC with DMC is used as a solvent and the concentration of each salt and the weight ratio of the mixed solvent satisfy the above-mentioned conditions, corrosion of aluminum as a positive electrode current collector caused by LiFSI and LiTFSI is interrupted (FIG. 10), while a structure of stable and elastic SEI in which continuous formation of dendrite is inhibited can be determined (FIGS. 9A and 9B). Thus, not only a heterogeneous effect but also a homogeneous effect is improved significantly. As a result, when a mixed solvent of EC with DMC is used as a solvent and the concentration of each of the added solvents and salts and the weight ratio of the mixed solvent satisfy the above-mentioned conditions, the most stable SEI is formed on the lithium-electrolyte interface to provide excellent lithium metal battery characteristics.

On the contrary, when any one of the above-mentioned ranges is not satisfied, an improper amount of LiF is incorporated to the SEI due to a varied composition of LiFSI, LiTFSI, LiPF$_6$, LiF, LiBF$_4$ salts and FEC, VC, TFEC added solvents to cause degradation of the mechanical and electrochemical properties of the SEI, which causes an increase in interfacial resistance in a lithium metal negative electrode. Moreover, when the concentration of main salts (LiTFSI, LiBOB) is beyond the above-defined range, low LiBOB solubility is provided to cause instability of electrolyte precipitating in the dissolved lithium salt. The above-suggested composition functions to improve not only the electrochemical properties of a lithium metal battery but also the stability of an electrolyte. Particularly, even if a small amount of the other salt, such as LiDFOB, is incorporated and the added solvents, FEC and VC, are added at a ratio beyond the above-defined range, it is shown that the SEI shows poor stability, the life of a battery is degraded and the resistance of the negative electrode is increased.

In still another aspect, there is provided a lithium metal secondary battery including the electrolyte for a lithium metal secondary battery according to an embodiment of the present disclosure.

According to an embodiment, the positive electrode in the lithium metal secondary battery includes at least one selected from lithium nickel cobalt manganese oxide, lithium cobalt oxide, lithium manganese oxide, lithium nickel cobalt oxide and lithium iron phosphate.

According to another embodiment, the positive electrode includes lithium nickel cobalt manganese oxide.

In yet another aspect, there is provided an electric device including the electrolyte for a lithium metal secondary battery according to an embodiment of the present disclosure.

According to an embodiment, the electric device is at least one selected from a communication device, transport device, energy storage device and an acoustic device.

Particular examples of the electric device may include a cellular phone, music player, speaker, drone, vehicle or sensor, but are not limited thereto.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples, and the changes and modifications are also within the scope of the present disclosure as defined in the following claims.

In addition, the following test results merely include typical test examples of examples and comparative examples, and the effects of various embodiments not specified in the following description are described in the corresponding part.

Hereinafter, examples, comparative examples and test examples will be described in three divided parts to help understanding of the present disclosure.

(1) FIRST GROUP OF EXAMPLES, COMPARATIVE EXAMPLES AND TEST EXAMPLES

Comparative Example 1: Preparation of Electrolyte Using LiFSI, LiTFSI, LiBOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M LiPF$_6$) in EC:DMC (4:6 w/w) was used for a lithium metal battery.

Comparative Example 2: Preparation of Electrolyte Using LiTFSI, LiBOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M LiPF$_6$) in EC:DMC (4:6 w/w) was used for a lithium metal battery.

Comparative Example 3: Preparation of Electrolyte Using LiFSI, LiDFOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiDFOB salt was dissolved in the mixed solvent to a concentration of 0.4 M under moisture-free environment for 3-6 hours, while carrying out agitation continuously. Then, LiPF$_6$ salt was dissolved therein for 6-12 hours to a concentration of 0.05 M. Additionally, LiFSI salt was dissolved therein to a concentration of 0.6 M.

The obtained electrolyte (0.6 M LiFSI+0.4 M LiDFOB+0.05 M LiPF$_6$) in EC:DMC (4:6 w/w) was used for a lithium metal battery.

Comparative Example 4: Preparation of Electrolyte Using LiFSI, LiTFSI, LiBOB, LiPF$_6$ Salts and FEC:DMC Solvent First, FEC was agitated and mixed with DMC at a weight ratio of 3:7 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M LiPF$_6$) in FEC:DMC (3:7 w/w) was used for a lithium metal battery.

Comparative Example 5a: Preparation of Electrolyte Using LiTFSI, LiBOB, LiPF$_6$ Salts and FEC:DMC or VC:DMC Solvent First, FEC was agitated and mixed with DMC, or VC was agitated and mixed with DMC at a weight ratio of 3:7 in each case under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M LiPF$_6$) in FEC:DMC (3:7 w/w) or VC:DMC (3:7 w/w) was used for a lithium metal battery.

Comparative Example 6: Preparation of Electrolyte Using LiPF$_6$ Salt and EC:DMC Solvent First, EC was dissolved at 60° C., and then was agitated and mixed with DMC at a weight ratio of 4:6 under moisture-free environment for 15-30 minutes to obtain a mixed solvent. Next, LiPF$_6$ salt was dissolved to the mixed solvent for 12-24 hours to a concentration of 1 M, while carrying out agitation continuously.

The obtained electrolyte (1 M LiPF$_6$) in EC:DMC (4:6 w/w) was used for a lithium metal battery.

Comparative Examples 7a to 7e: Preparation of Electrolyte Using LiTFSI, LIBOB, LiPF$_6$, LiF Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LiTFSI salt was dissolved therein to a concentration of 0.6 M. Further, LiF was dissolved therein to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in EC:DMC (4:6 w/w) was used for a lithium metal battery.

Examples 1a and 1b: Preparation of Electrolyte Containing FEC Solvent Added Thereto To the electrolyte obtained from Comparative Example 1, FEC was added in an amount of 0.5 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 or 5 wt % FEC) was used for a lithium metal battery.

Examples 2a to 2e: Preparation of Electrolyte Containing VC Solvent Added Thereto To the electrolyte obtained from Comparative Example 1, VC was added in an amount of 0.5 wt %, 1 wt %, 2 wt %, 3 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5-2 wt % VC) was used for a lithium metal battery.

Example 3: Preparation of Electrolyte Containing FEC+VC Solvent Added Thereto

To the electrolyte obtained from Comparative Example 1, 0.5 wt % of FEC and 2 wt % of VC were added based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 wt % FEC+2 wt % VC) was used for a lithium metal battery.

Examples 4a to 4i: Preparation of Electrolyte Containing FEC Solvent Added Thereto To the electrolyte obtained from Comparative Example 2, FEC was added in an amount of 0.3 wt %, 0.5 wt %, 0.7 wt %, 1 wt %, 3 wt %, 5 wt %, 7 wt %, 10 wt % or 20 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+0.3-20 wt % FEC) was used for a lithium metal battery.

Example 5: Preparation of Electrolyte Containing VC Solvent Added Thereto

To the electrolyte obtained from Comparative Example 2, VC was added in an amount of 2 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+2 wt % VC) was used for a lithium metal battery.

Example 6: Preparation of Electrolyte Containing FEC+VC Solvent Added Thereto

To the electrolyte obtained from Comparative Example 2, 0.5 wt % of FEC and 2 wt % of VC were added based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+0.5 wt % FEC+2 wt % VC) was used for a lithium metal battery.

Examples 7a to 7e: Preparation of Electrolyte Using LiTFSI, LIBOB, LiPF$_6$, LiF Salts and EC:DMC Solvent To the electrolyte obtained from Example 4d, LiF salt was further dissolved to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in (EC:DMC (4:6 w/w)+1 wt % FEC) was used for a lithium metal battery.

Electrochemical Analysis of Lithium Metal Battery Using Modified Electrolyte

Each of the above-described electrolytes was used to determine the electrochemical characteristics of lithium metal batteries through charging/discharging in a constant current mode. In the coin cell test, lithium metal (diameter 1.5 cm, thickness 150 µm), a PP separator having a thickness of 11 µm (diameter 1.8 cm), NCM (6/2/2) and NCM (8/1/1) positive electrodes (diameter 1.2 cm) and the electrolytes (30 µL) were used to determine the electrochemical characteristics. Herein, the voltage range applied to the coin cell was 3-4.2 V. When the voltage reached 4.2 V, a constant voltage mode was used to carry out charging to a current value of 0.05 C. At the first formation cycle of each cell, 1 cycle was carried out at 0.1 C, and then charging/discharging was carried out continuously at 1 C.

Hereinafter, the analysis results will be described in detail with reference to the accompanying drawings.

Figure 2:
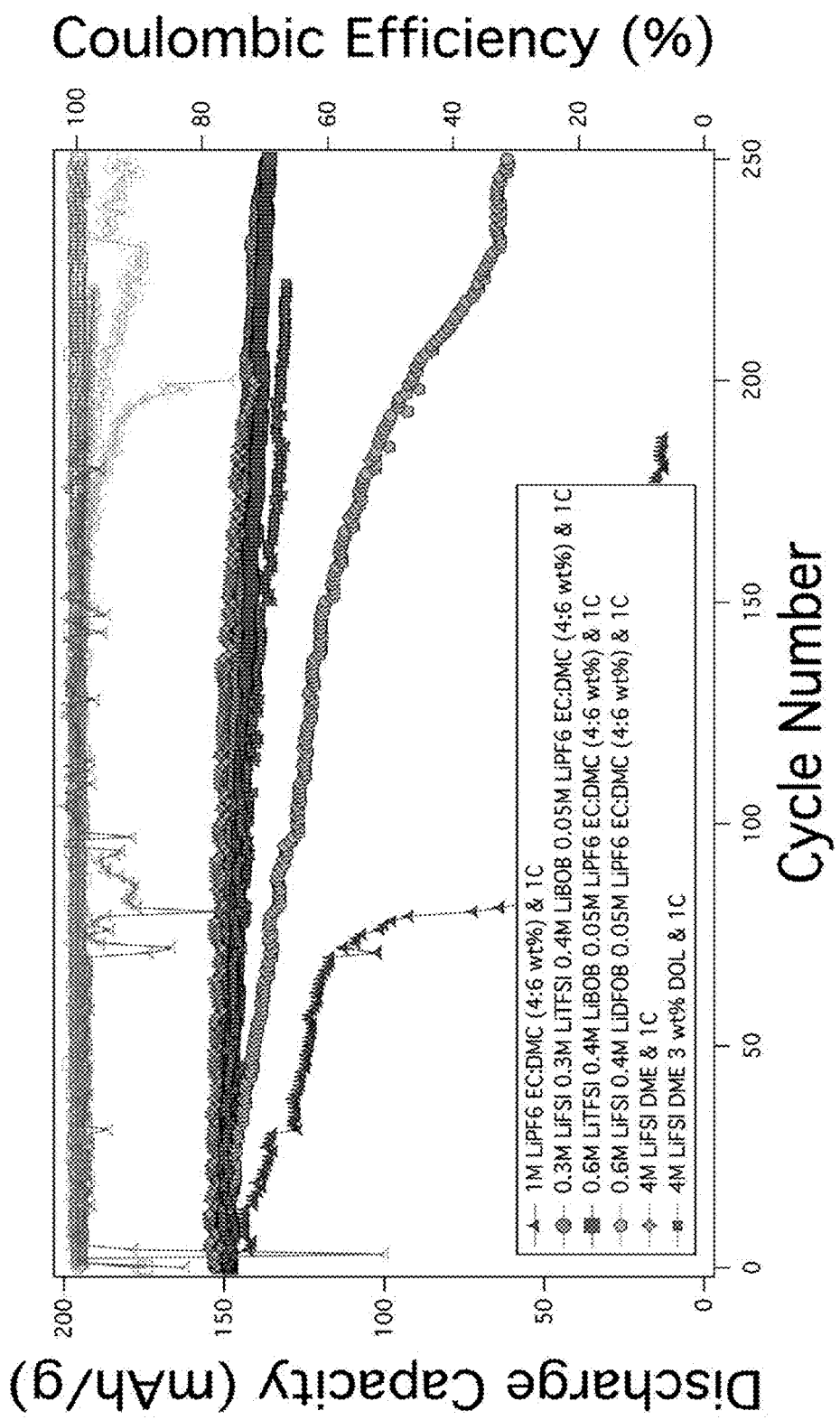
FIG. 2 illustrates the characteristics of lithium metal batteries including coin-type NCM (6/2/2) positive electrodes using EC:DMC (weight ratio 4:6) and DME electrolytes combined with LiFSI, LiTFSI, LiBOB, LiDFOB and LiPF$_6$ salts.

FIG. 2 illustrates the characteristics of coin-type lithium metal batteries using EC:DMC (weight ratio 4:6) electrolytes combined with LiFSI, LiTFSI, LiBOB, LiDFOB and LiPF$_6$ salts. 1 M LiPF$_6$ EC:DMC (weight ratio 4:6) 1C shows comparative data and the battery life is terminated at the 80$^{th}$ cycle, while 0.3 M LiFSI, 0.3 M LiTFSI, 0.4 M LiBOB, 0.05 M LiPF$_6$ EC:DMC (weight ratio 4:6) 1C and 0.6 M LiTFSI, 0.4 M LiBOB, 0.05 M LiPF$_6$ EC:DMC (weight ratio 4:6) electrolyte systems show slightly stable capacity maintenance and life characteristics. However, it can be seen that the results are significantly worse as compared to the electrolyte systems of the examples according to the present disclosure. The positive electrode used herein is NCM (6/2/2).

Figure 3:
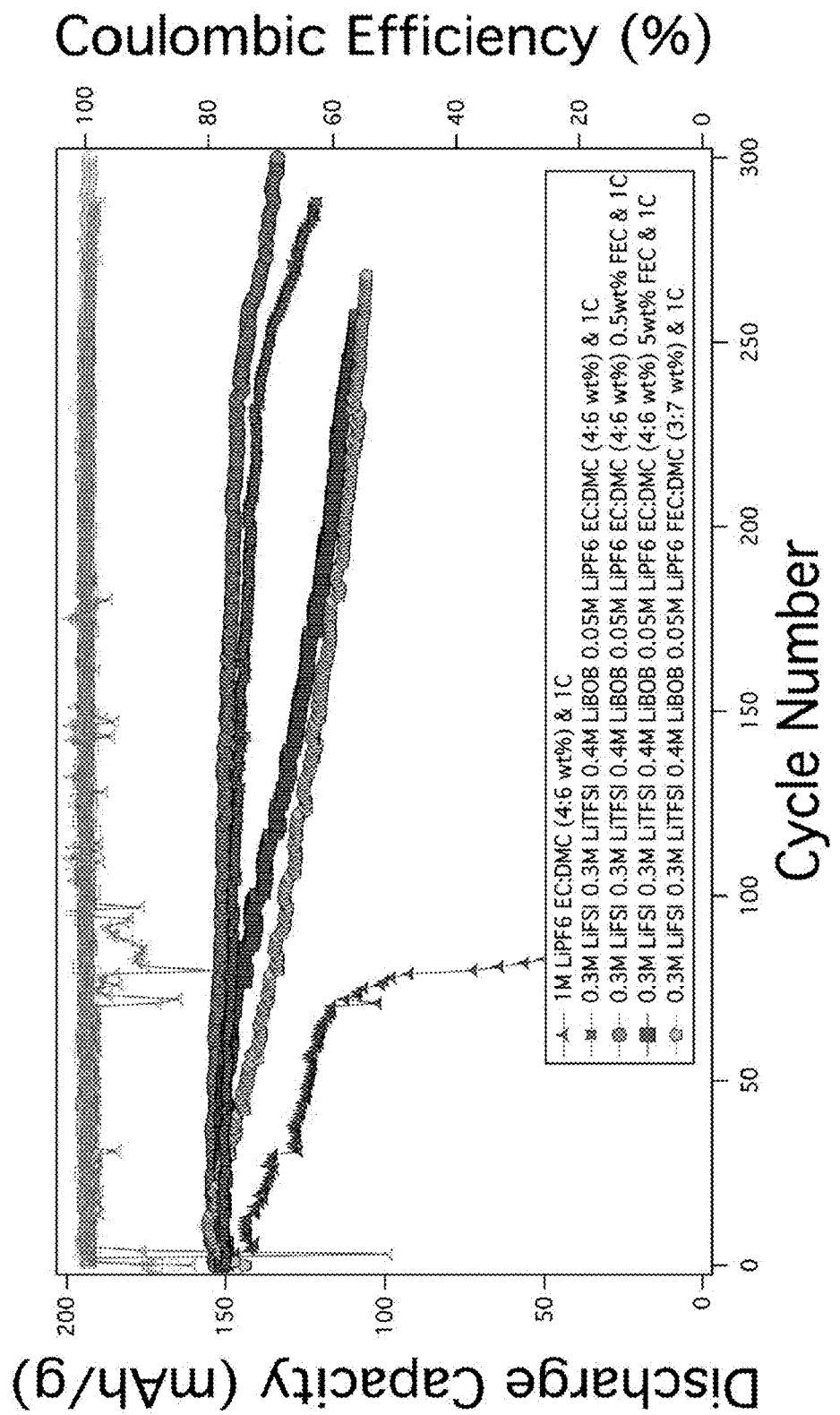
FIG. 3 illustrates the characteristics of lithium metal coin cell batteries using NCM (6/2/2) positive electrodes as a function of addition of FEC in the electrolyte systems including 0.3 M LiFSI, 0.3 M LiTFSI, 0.4 M LiBOB, 0.05 M LiPF$_6$ in EC:DMC (weight ratio 4:6).

FIG. 3 illustrates the characteristics of lithium metal coin cell batteries as a function of addition of FEC in the electrolyte system including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the 1C coin cell using 0.3 M LiFSI, 0.3 M LiTFSI, 0.4 M LiBOB, 0.05 M LiPF$_6$ EC:DMC (weight ratio 4:6) to which FEC is added shows slightly improved life characteristics. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 4:
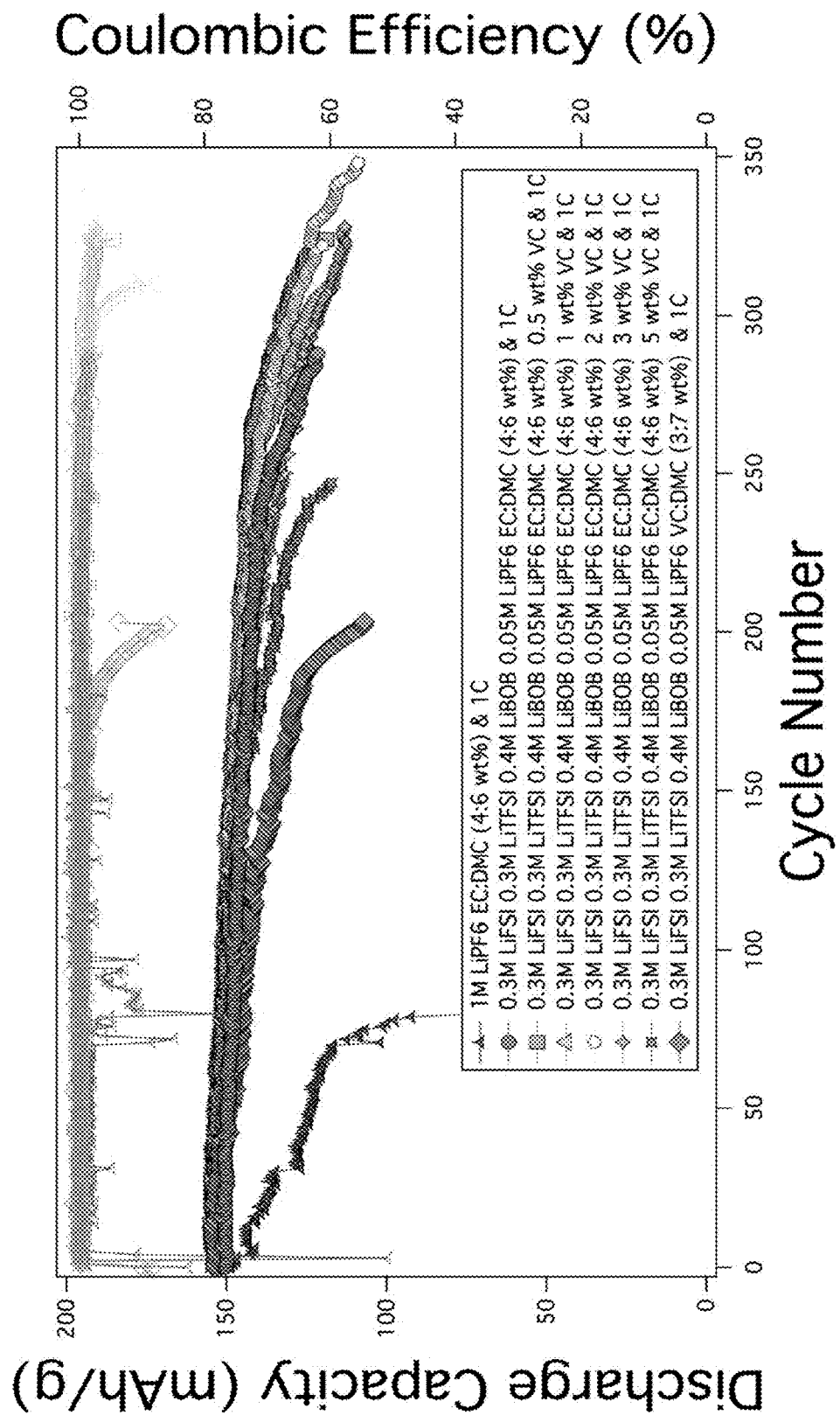
FIG. 4 illustrates the characteristics of lithium metal coin cell batteries using NCM (6/2/2) positive electrodes as a function of addition of VC in the electrolyte systems including 0.3 M LiFSI, 0.3 M LiTFSI, 0.4 M LiBOB, 0.05 M LiPF$_6$ in EC:DMC (weight ratio 4:6).

FIG. 4 illustrates the characteristics of lithium metal coin cell batteries as a function of addition of VC in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.3 M LiFSI, 0.3 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 0.5 wt % or 2 wt %, the most stable capacity maintenance is provided. This is because the SEI formed from VC in the lithium negative electrode and NCM positive electrode inhibits a side reaction with the electrolyte and causes electrochemical surface stabilization. The positive electrode used herein is NCM (6/2/2).

Figure 5:
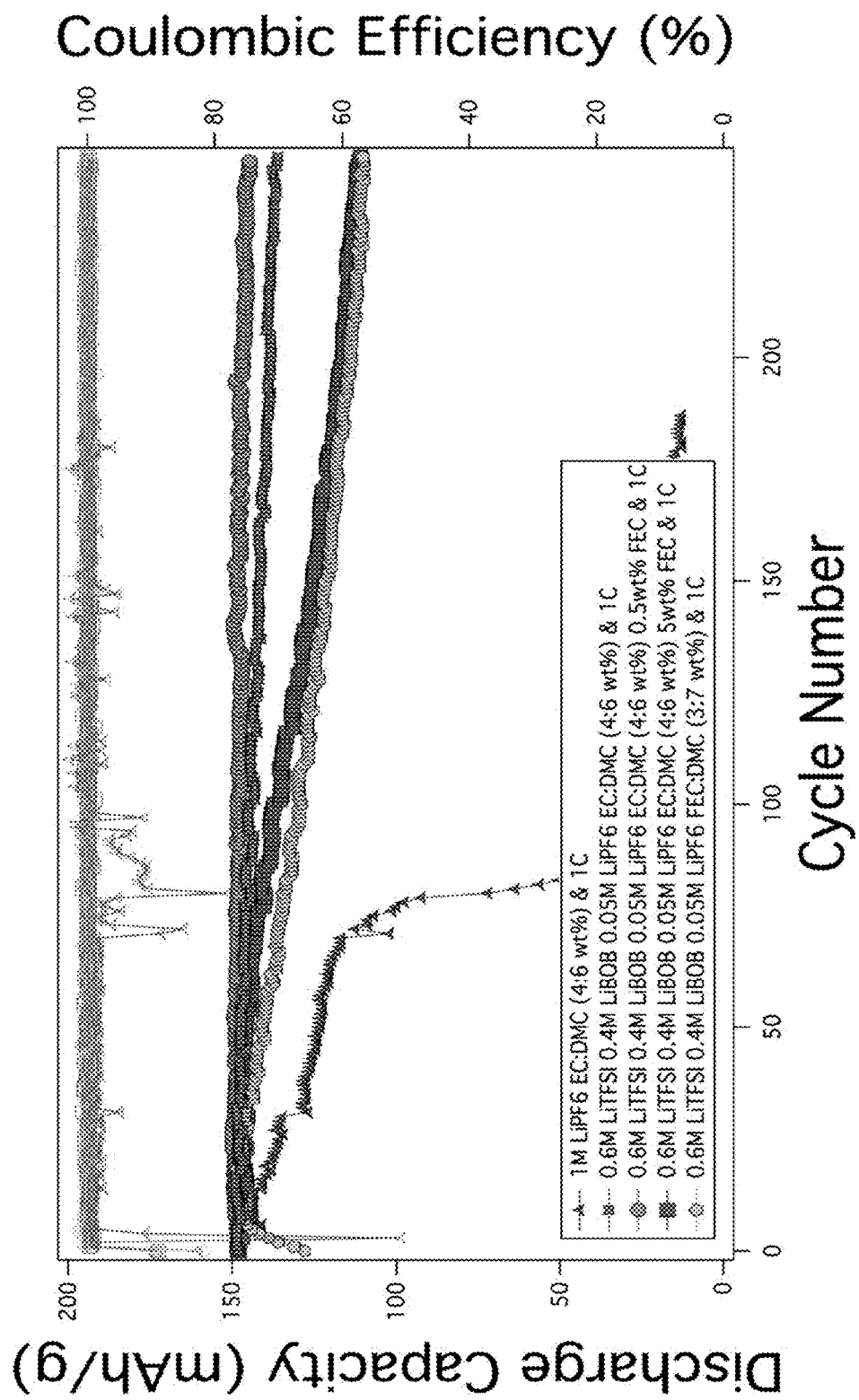
FIG. 5 illustrates the characteristics of lithium metal coin cell batteries using NCM (6/2/2) positive electrodes as a function of addition of FEC in the electrolyte systems including 0.6 M LiTFSI, 0.4 M LiBOB, 0.05 M LiPF$_6$ in EC:DMC (weight ratio 4:6) of FIG. 3.

FIG. 5 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6) of FIG. 3. 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which FEC is added show slightly improved life characteristics under the condition of charging/discharging at 1C. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 6:
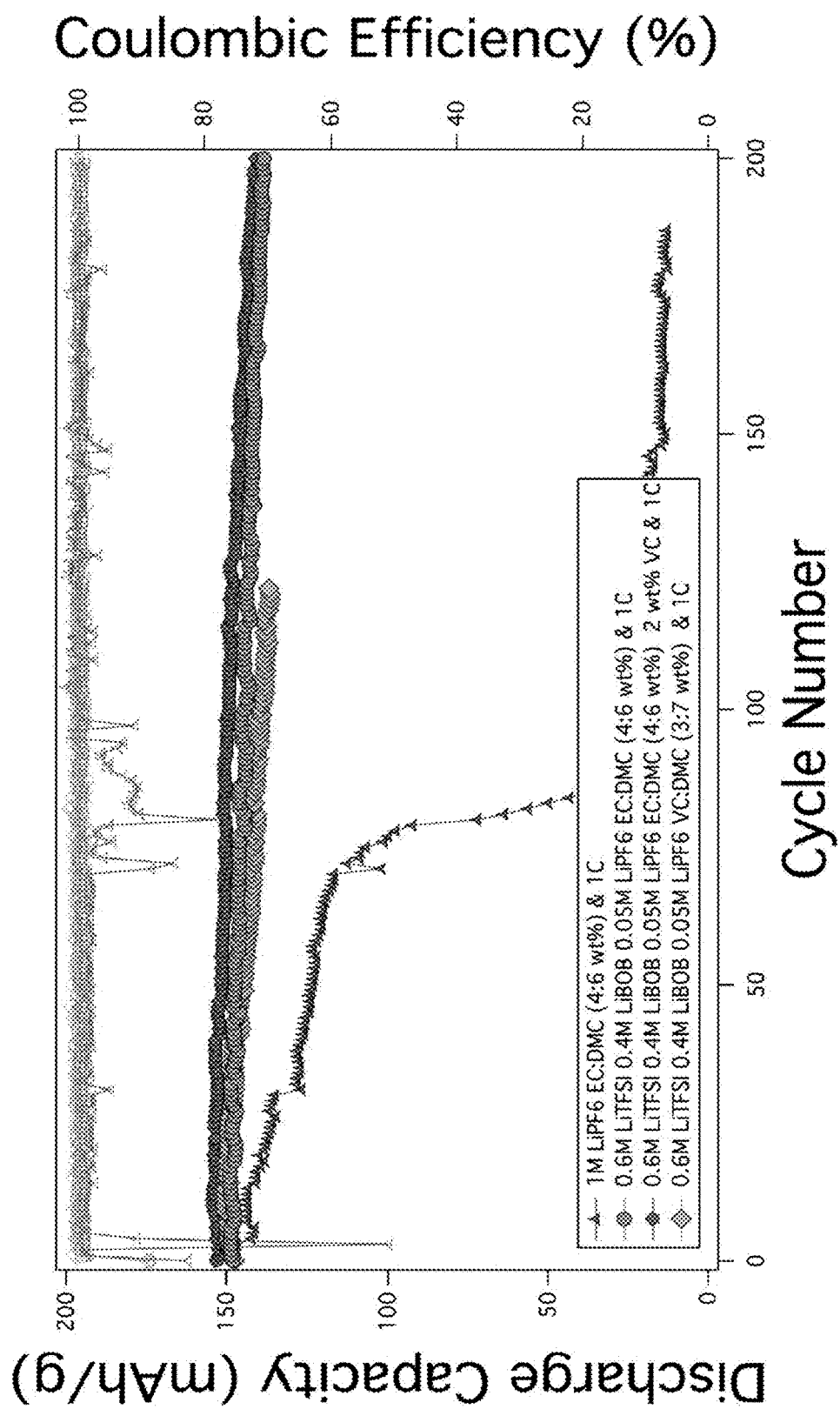
FIG. 6 illustrates the characteristics of lithium metal coin cell batteries using NCM (6/2/2) positive electrodes as a function of addition of VC in the electrolyte systems including 0.6 M LiTFSI, 0.4 M LiBOB, 0.05 M LiPF$_6$ in EC:DMC (weight ratio 4:6).

FIG. 6 illustrates the characteristics of lithium metal coin cell batteries as a function of addition of VC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 2 wt %, the most stable capacity maintenance is provided. This is because the SEI formed from VC in the lithium negative electrode and NCM positive electrode inhibits a side reaction with the electrolyte and causes electrochemical surface stabilization. The positive electrode used herein is NCM (6/2/2).

Figure 7:
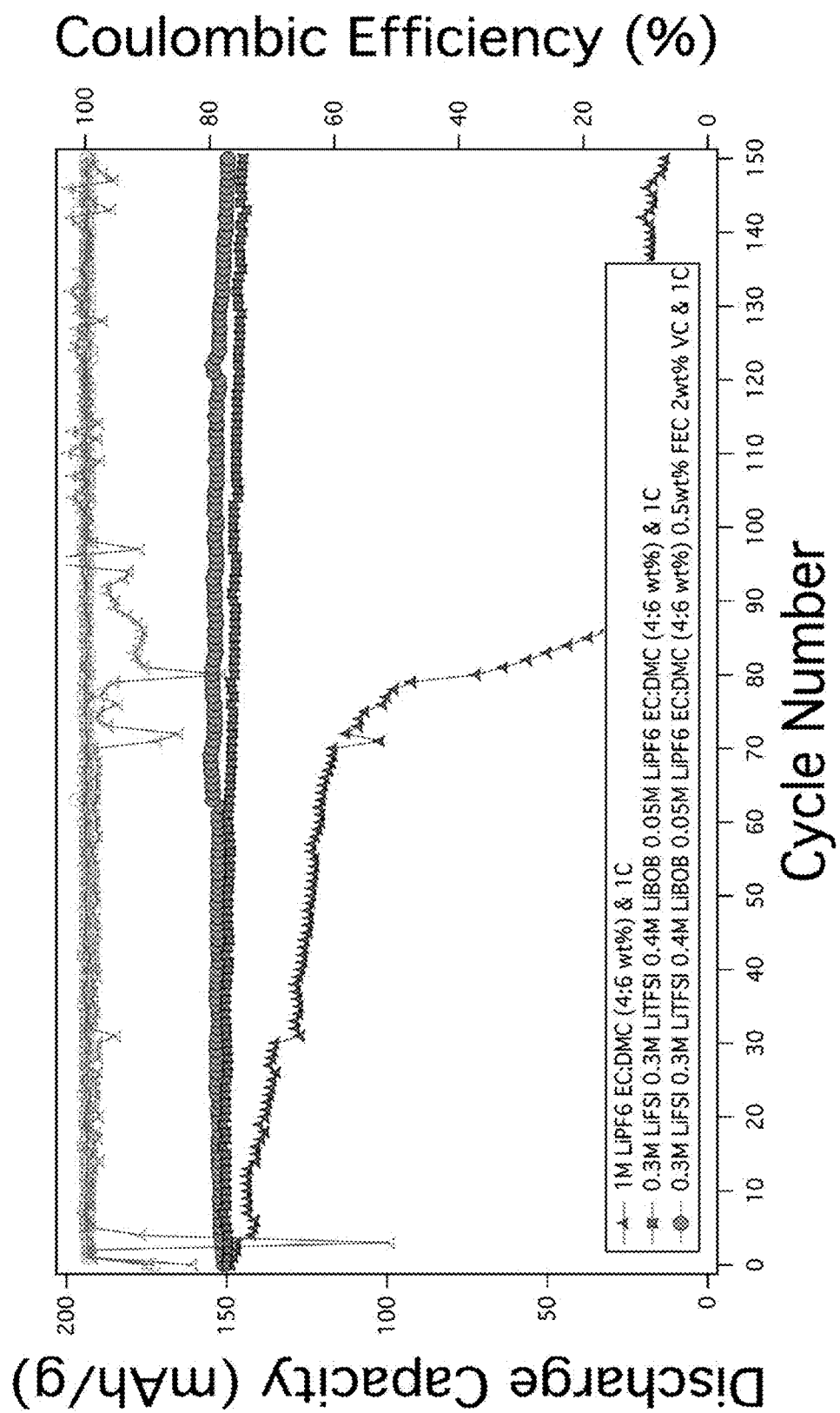
FIG. 7 illustrates the characteristics of lithium metal coin cell batteries using NCM (6/2/2) positive electrodes to which FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6).

FIG. 7 illustrates the characteristics of lithium metal coin cell batteries to which optimized FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cell using 0.3 M LiFSI, 0.3 M LiTFSI, 0.4 M LiBOB, 0.05 M LiPF$_6$ EC:DMC (weight ratio 4:6) in combination with optimized 0.5 wt % of FEC and 2 wt % of VC additive solvents shows the most stable life characteristics under the condition of charging/discharging at 1 C and more stable life characteristics as compared to the electrolyte system using no additive solvent. The positive electrode used herein is NCM (6/2/2).

Figure 8:
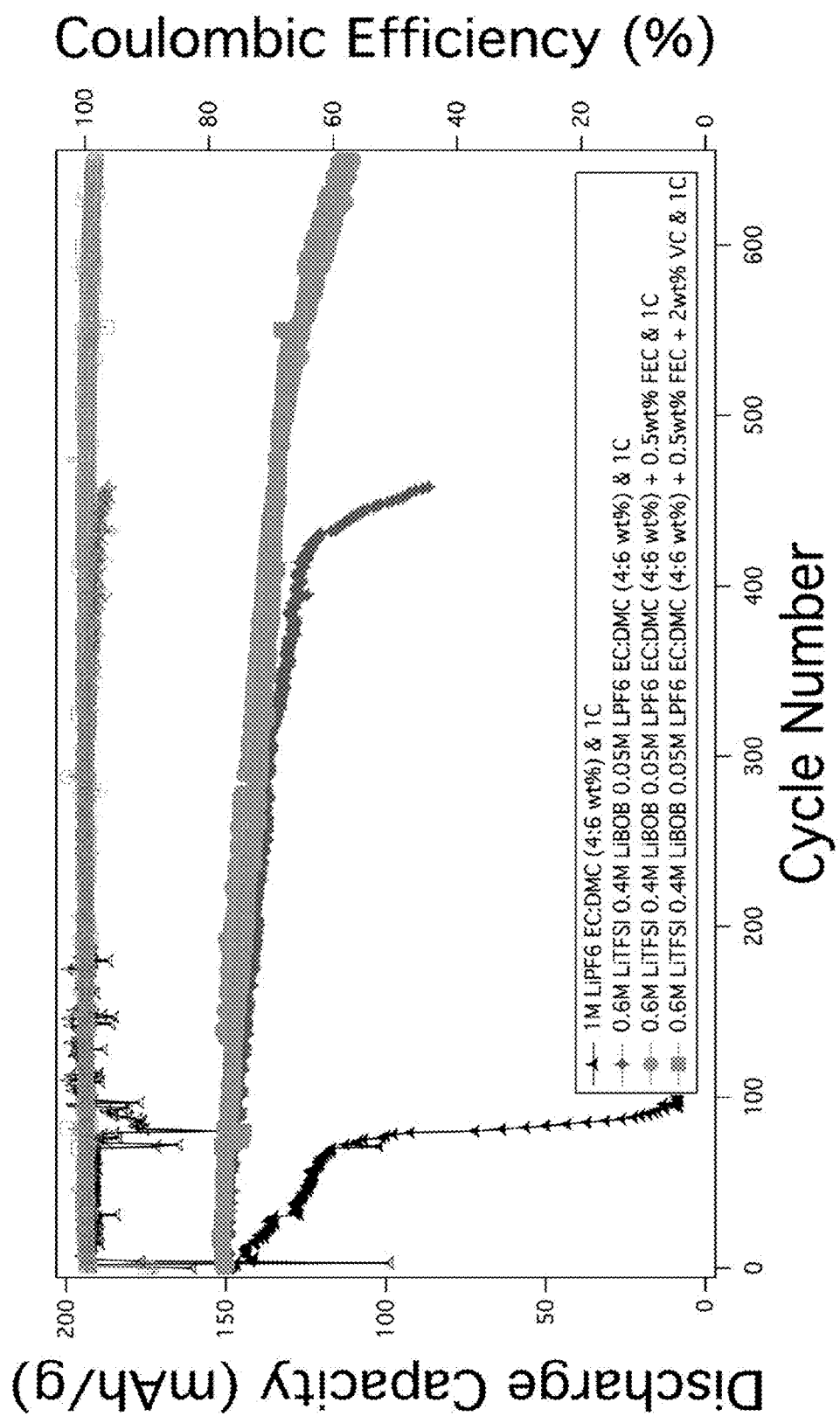
FIG. 8 illustrates the characteristics of lithium metal coin cell batteries using NCM (6/2/2) positive electrodes to which 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6).

FIG. 8 illustrates the characteristics of lithium metal coin cell batteries to which optimized 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data including termination of the battery life at the 80$^{th}$ cycle and the electrolyte containing no additive solvent causes termination of the battery life at the 400$^{th}$ cycle, while the coin cells using 0.6 M LiTFSI, 0.4 M LiBOB, 0.05 M LiPF$_6$ EC:DMC (weight ratio 4:6) in combination with optimized 0.5 wt % of FEC alone or 0.5 wt % of FEC and 2 wt % of VC additive solvents show the most stable life characteristics under the condition of charging/discharging at 1 C and more stable life characteristics as compared to the electrolyte system using no additive solvent.

FIGS. 9A and 9B show images of lithium surfaces taken by scanning electron microscopy (SEM) after carrying out cycles by using electrolytes including LiTFSI, LiBOB and LiPF$_6$ salts and EC:DMC to which additive solvents are added or not. After subjecting the cells to 200 charging/discharging cycles at 1 C, the cell (a) using the electrolyte including LiTFSI, LiBOB and LiPF$_6$ salts and EC:DMC with no additive solvent shows a larger amount of formation of high-surface area lithium dendrite and higher surface roughness, as compared to the electrolyte (b) containing an additive solvent. This is because such an adequate combination of the salt with additive solvents allows formation of more stable and elastic SEI on the surface of the lithium negative electrode.

Figure 10:
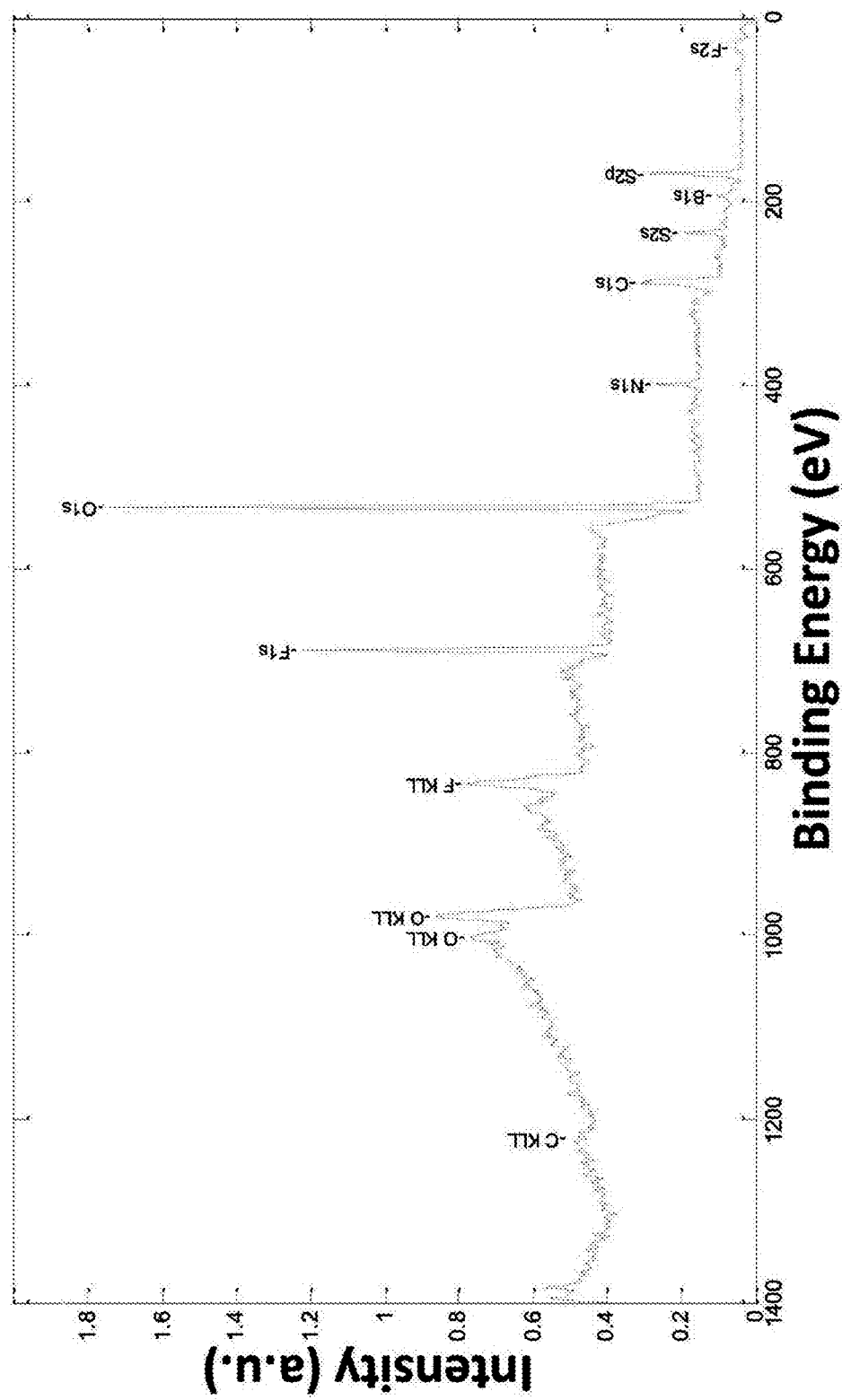
FIG. 10 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C.

FIG. 10 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C. After carrying out cycles for a long time by using the electrolyte system including LiTFSI, LiBOB and LiPF$_6$ salts and additive solvents, no Al is detected, and Li (13.99%), B (3.16%), C (26.81%), N (3.41%), O (34%), F (12.41%) and S (5.41%) are detected in the SEI formed from the composition of main salts. This suggests that such an adequate combination of salts inhibits corrosion of Al.

Figure 11:
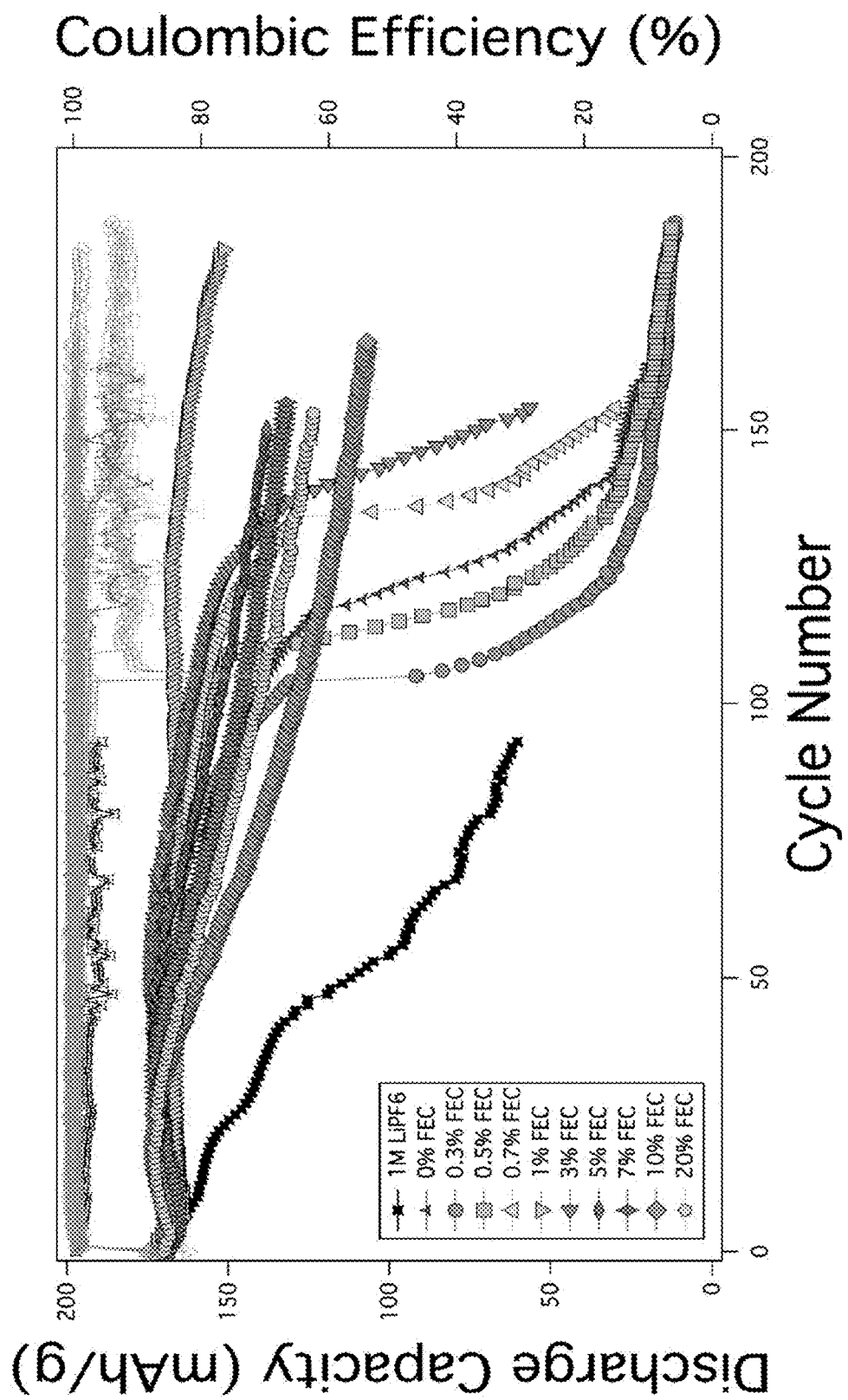
FIG. 11 illustrates the characteristics of lithium metal coin cell batteries using NCM (8/1/1) positive electrodes as a function of addition of FEC in the electrolyte systems including 0.6 M LiTFSI, 0.4 M LiBOB, 0.05 M LiPF$_6$ in EC:DMC (weight ratio 4:6).

FIG. 11 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 30$^{th}$ cycle, while the coin cell using 0.6 M LiTFSI, 0.4 M LiBOB, 0.05 M LiPF$_6$ EC:DMC (weight ratio 4:6) in combination with optimized 1 wt % of FEC additive solvent shows the most stable life characteristics under the condition of charging/discharging at 1 C and more stable life characteristics as compared to the electrolyte system using no additive solvent. The positive electrode used herein is NCM (8/1/1). This is a test for finding an optimized FEC addition ratio when using a high-energy density NCM positive electrode different from the above-mentioned positive electrode.

Figure 12:
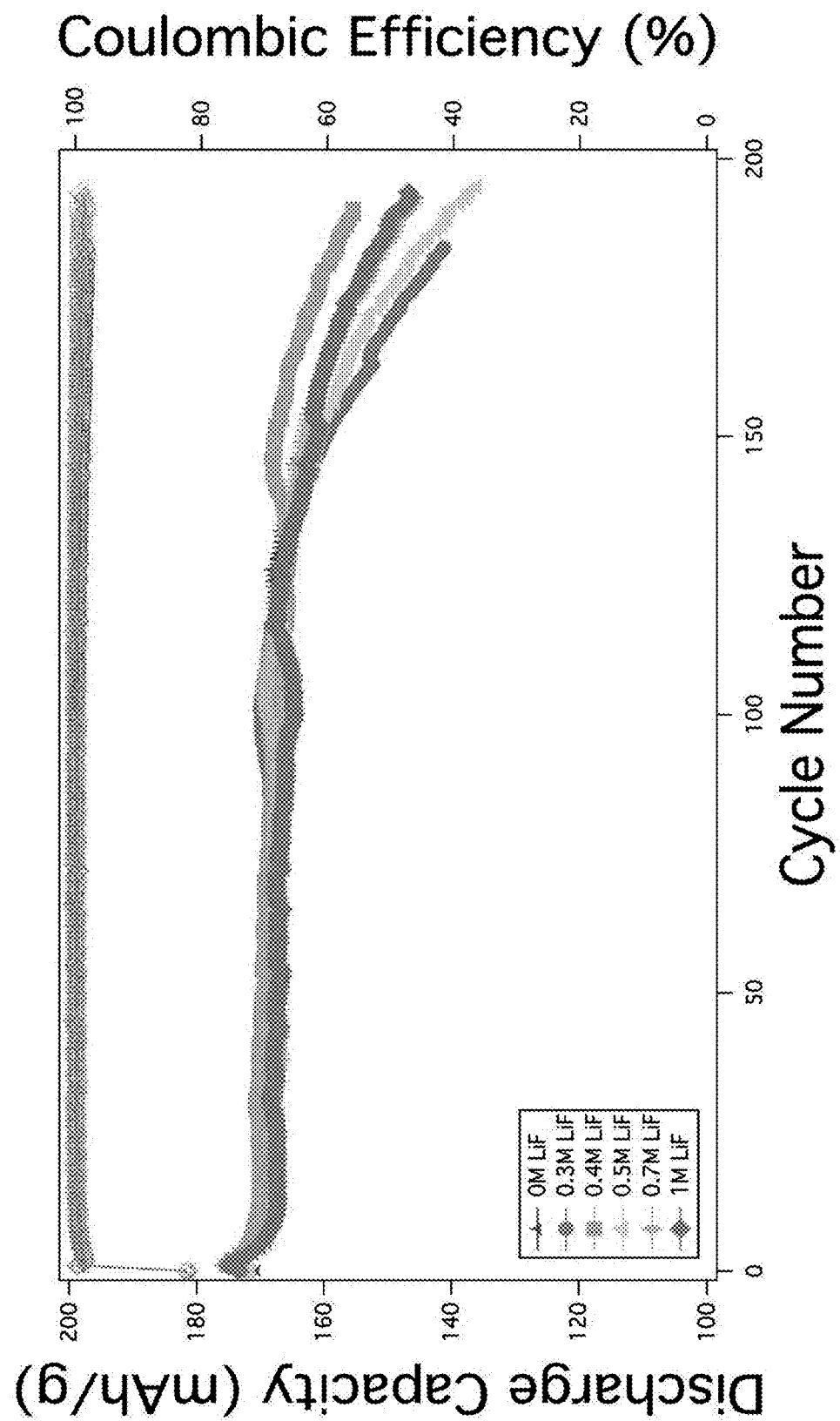
FIG. 12 illustrates the characteristics of lithium metal coin cell batteries using NCM (8/1/1) positive electrodes as a function of addition of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio).

FIG. 12 illustrates the characteristics of lithium metal coin cell batteries as a function of concentration of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio). The optimized LiF concentration is 0.4 M in the electrolyte system of 0.6 M LiTFSI, 0.4 M LiBOB, 0.05 M LiPF$_6$ in EC:DMC (weight ratio 4:6) and 1 wt % FEC (weight ratio). The coin cell using the solvent to which the optimized LiF salt is added shows the most stable life characteristics under the condition of charging/discharging at 1 C. The positive electrode used herein is NCM (8/1/1). This is a test for finding an optimized FEC addition ratio when using a high-energy density NCM positive electrode different from the above-mentioned positive electrode.

(2) SECOND GROUP OF EXAMPLES, COMPARATIVE EXAMPLES AND TEST EXAMPLES

Comparative Example 1: Preparation of Electrolyte Using LiFSI, LiTFSI, LiBOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M LiPF$_6$) in EC:DMC (4:6 w/w) was used for a lithium metal battery.

Comparative Example 2: Preparation of Electrolyte Using LiTFSI, LiBOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M LiPF$_6$) in EC:DMC (4:6 w/w) was used for a lithium metal battery.

Comparative Example 3: Preparation of Electrolyte Using LiFSI, LiDFOB, LiPF$_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiDFOB salt was dissolved in the mixed solvent to a concentration of 0.4 M under moisture-free environment for 3-6 hours, while carrying out agitation continuously. Then, LiPF$_6$ salt was dissolved therein for 6-12 hours to a concentration of 0.05 M. Additionally, LiFSI salt was dissolved therein to a concentration of 0.6 M.

The obtained electrolyte (0.6 M LiFSI+0.4 M LiDFOB+0.05 M LiPF$_6$) in EC:DMC (4:6 w/w) was used for a lithium metal battery.

Comparative Example 4: Preparation of Electrolyte Using LiFSI, LiTFSI, LiBOB, LiPF$_6$ Salts and FEC:DMC Solvent First, FEC was agitated and mixed with DMC at a weight ratio of 3:7 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M LiPF$_6$) in FEC:DMC (3:7 w/w) was used for a lithium metal battery.

Comparative Examples 5a and 5b: Preparation of Electrolyte Using LiTFSI, LiBOB, LiPF$_6$ Salts and FEC:DMC or VC:DMC Solvent First, FEC was agitated and mixed with DMC, or VC was agitated and mixed with DMC at a weight ratio of 3:7 in each case under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M LiPF$_6$) in FEC:DMC (3:7 w/w) or VC:DMC (3:7 w/w) was used for a lithium metal battery.

Comparative Example 6: Preparation of Electrolyte Using LiPF$_6$ Salt and EC:DMC Solvent First, EC was dissolved at 60° C., and then was agitated and mixed with DMC at a weight ratio of 4:6 under moisture-free environment for 15-30 minutes to obtain a mixed solvent. Next, LiPF$_6$ salt was dissolved to the mixed solvent for 12-24 hours to a concentration of 1 M, while carrying out agitation continuously.

The obtained electrolyte (1 M LiPF$_6$) in EC:DMC (4:6 w/w) was used for a lithium metal battery.

Comparative Examples 7a to 7e: Preparation of Electrolyte Using LiTFSI, LIBOB, LiPF$_6$, LiF Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LiTFSI salt was dissolved therein to a concentration of 0.6 M. Further, LiF was dissolved therein to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in EC:DMC (4:6 w/w) was used for a lithium metal battery.

Examples 1a and 1b: Preparation of Electrolyte Containing FEC Solvent Added Thereto To the electrolyte obtained from Comparative Example 1, FEC was added in an amount of 0.5 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 or 5 wt % FEC) was used for a lithium metal battery.

Examples 2a to 2e: Preparation of Electrolyte Containing VC Solvent Added Thereto To the electrolyte obtained from Comparative Example 1, VC was added in an amount of 0.5 wt %, 1 wt %, 2 wt %, 3 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5-2 wt % VC) was used for a lithium metal battery.

Example 3: Preparation of Electrolyte Containing FEC+VC Solvent Added Thereto

To the electrolyte obtained from Comparative Example 1, 0.5 wt % of FEC and 2 wt % of VC were added based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 wt % FEC+2 wt % VC) was used for a lithium metal battery.

Examples 4a to 4i: Preparation of Electrolyte Containing FEC Solvent Added Thereto To the electrolyte obtained from Comparative Example 2, FEC was added in an amount of 0.3 wt %, 0.5 wt %, 0.7 wt %, 1 wt %, 3 wt %, 5 wt %, 7 wt %, 10 wt % or 20 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+0.3-20 wt % FEC) was used for a lithium metal battery.

Example 5: Preparation of Electrolyte Containing VC Solvent Added Thereto

To the electrolyte obtained from Comparative Example 2, VC was added in an amount of 2 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+2 wt % VC) was used for a lithium metal battery.

Example 6: Preparation of Electrolyte Containing FEC+VC Solvent Added Thereto

To the electrolyte obtained from Comparative Example 2, 0.5 wt % of FEC and 2 wt % of VC were added based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+0.5 wt % FEC+2 wt % VC) was used for a lithium metal battery.

Examples 7a to 7e: Preparation of Electrolyte Using LiTFSI, LIBOB, LiPF$_6$, LiF Salts and EC:DMC Solvent To the electrolyte obtained from Example 4d, LiF salt was further dissolved to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in (EC:DMC (4:6 w/w)+1 wt % FEC) was used for a lithium metal battery.

Example 2-1: Preparation of Electrolyte Using LiTFSI, LIBOB, LiPF$_6$, LiF Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LiTFSI salt was dissolved therein to a concentration of 0.6 M. Further, LiF was dissolved therein to a concentration of 0.4 M. Then, 1 wt % of EFC and 3 wt % of VC were added thereto based on the total weight of the electrolyte and the resultant mixture was agitated for 1 hour under moisture-free environment.

The obtained electrolyte (0.6 M LiTFSI+0.4 M LiBOB+0.05 M LiPF$_6$+0.3-1 M LiF) in (EC:DMC (4:6 w/w)+1 wt % FEC+3 wt % VC) was used for a lithium metal battery.

Examples 2-2a to 2-2i: Preparation of Electrolyte Using LiTFSI, LIBOB, LiF, LiPF$_6$ Salts and EC:DMC Solvent To the electrolyte obtained from Example 2-1, TFEC was added in an amount of 0.5 wt %, 1 wt %, 3 wt %, 5 wt %, 7 wt %, 10 wt %, 15 wt %, 20 wt % or 30 wt % based on the total weight of the electrolyte and the resultant mixture was agitated for 2 hours under moisture-free environment.

The obtained electrolyte (0.6 M LiTFSI+0.4 M LiBOB+0.05 M LiPF$_6$+0.4 M LiF) in (EC:DMC (4:6 w/w)+1 wt % FEC+3 wt % VC+0.5-30 wt % TFEC) was used for a lithium metal battery.

Electrochemical Analysis of Lithium Metal Battery Using Modified Electrolyte

Each of the coin cells of lithium metal secondary batteries using the above-described electrolytes was used to determine the electrochemical characteristics thereof by carrying out a constant-current charging/discharging test. To provide the coin cells, lithium metal (disc with a diameter of 1.5 cm and a thickness of 150 µm), a PP separator having a thickness of 11 µm (diameter 1.8 cm), NCM (8/1/1 composition, 3.8 mAh/cm$^2$ loading, diameter 1.2 cm) positive electrode and the electrolytes (30 µL) were used. The coin cells were used to determine the electrochemical characteristics. Herein, the voltage range applied to the coin cells was 3-4.2 V. When the voltage reached 4.2 V, a constant voltage mode was used to carry out charging to a current value of 0.05 C. The first charge/discharge cycle of each cell was a formation cycle and was carried out at 0.1 C, and then charging/discharging was carried out continuously at 1 C.

Hereinafter, the analysis results will be described in detail with reference to the accompanying drawings.

Figure 13:
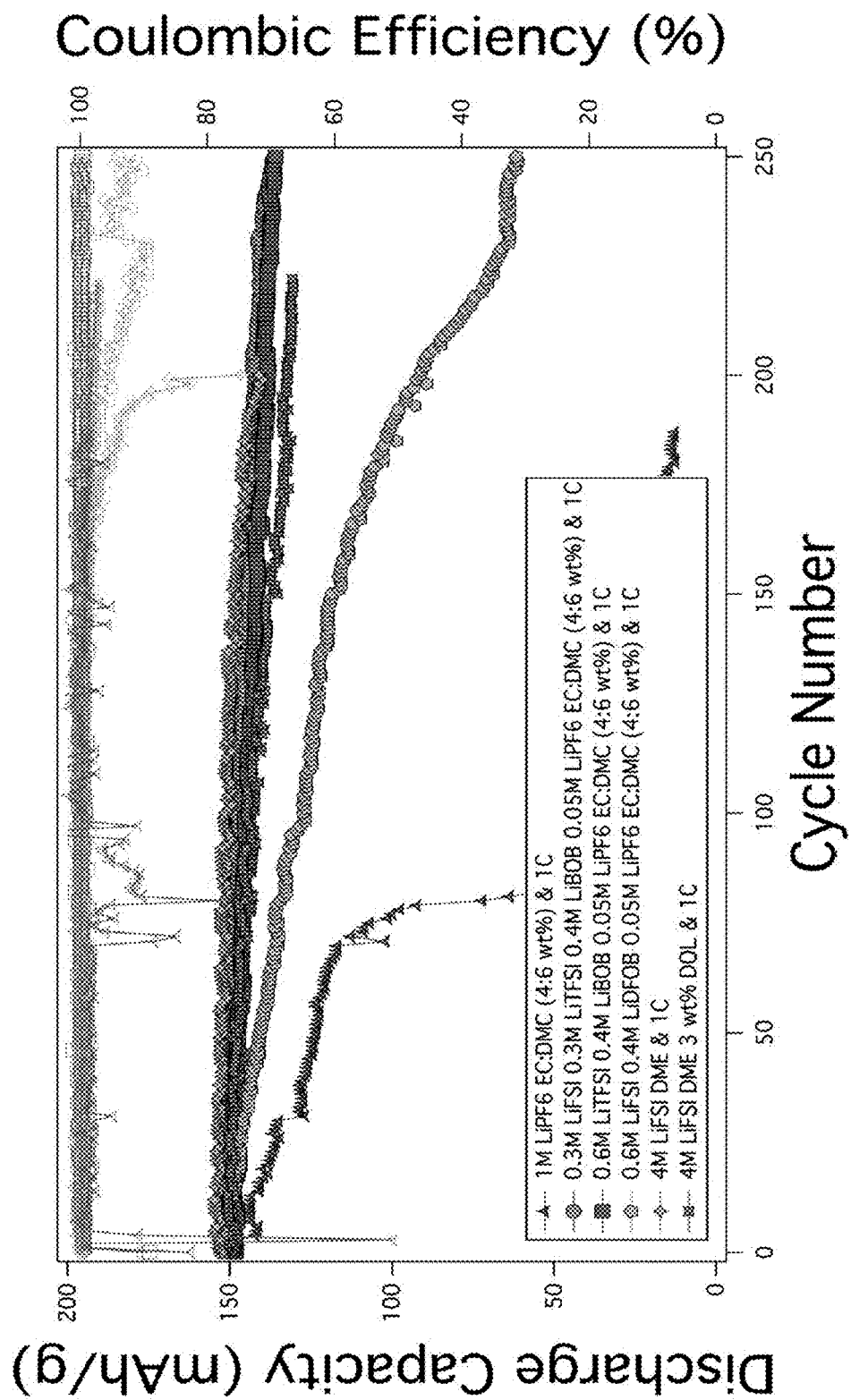
FIG. 13 illustrates the characteristics of lithium metal batteries including coin-type NCM (6/2/2) positive electrodes using EC:DMC (weight ratio 4:6) and DME electrolytes combined with LiFSI, LiTFSI, LiBOB, LiDFOB and LiPF$_6$ salts.

FIG. 13 illustrates the characteristics of coin-type lithium metal batteries using EC:DMC (weight ratio 4:6) electrolytes combined with LiFSI, LiTFSI, LiBOB, LiDFOB and LiPF$_6$ salts. 1 M LiPF$_6$ EC:DMC (weight ratio 4:6) 1C shows comparative data and the battery life is terminated at the 80$^{th}$ cycle, while 0.3 M LiFSI, 0.3 M LiTFSI, 0.4 M LiBOB, 0.05 M LiPF$_6$ EC:DMC (weight ratio 4:6) 1C and 0.6M LiTFSI, 0.4 M LiBOB, 0.05 M LiPF$_6$ EC:DMC (weight ratio 4:6) electrolyte systems show slightly stable capacity maintenance and life characteristics. However, it can be seen that the results are significantly worse as compared to the electrolyte systems of the examples according to the present disclosure. The positive electrode used herein is NCM (6/2/2).

Figure 14:
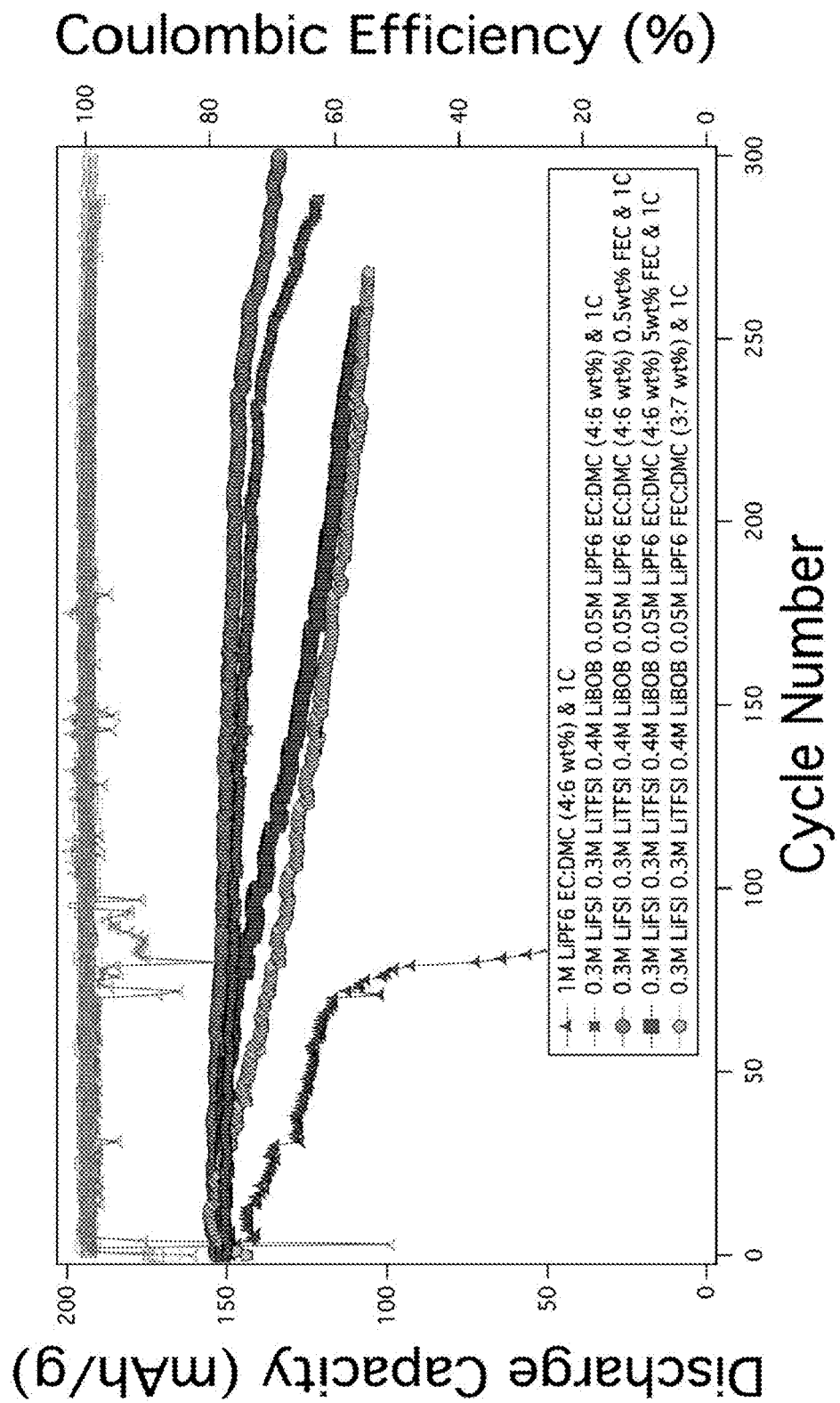
FIG. 14 illustrates the characteristics of lithium metal coin cell batteries using NCM (6/2/2) positive electrodes as a function of addition of FEC in the electrolyte systems including 0.3 M LiFSI, 0.3 M LiTFSI, 0.4 M LiBOB, 0.05 M LiPF$_6$ in EC:DMC (weight ratio 4:6).

FIG. 14 illustrates the characteristics of lithium metal coin cell batteries as a function of addition of FEC in the electrolyte system including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the 1C coin cells using 0.3 M LiFSI, 0.3 M LiTFSI, 0.4 M LiBOB, 0.05 M LiPF$_6$ EC:DMC (weight ratio 4:6) to which FEC is added show slightly improved life characteristics. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 15:
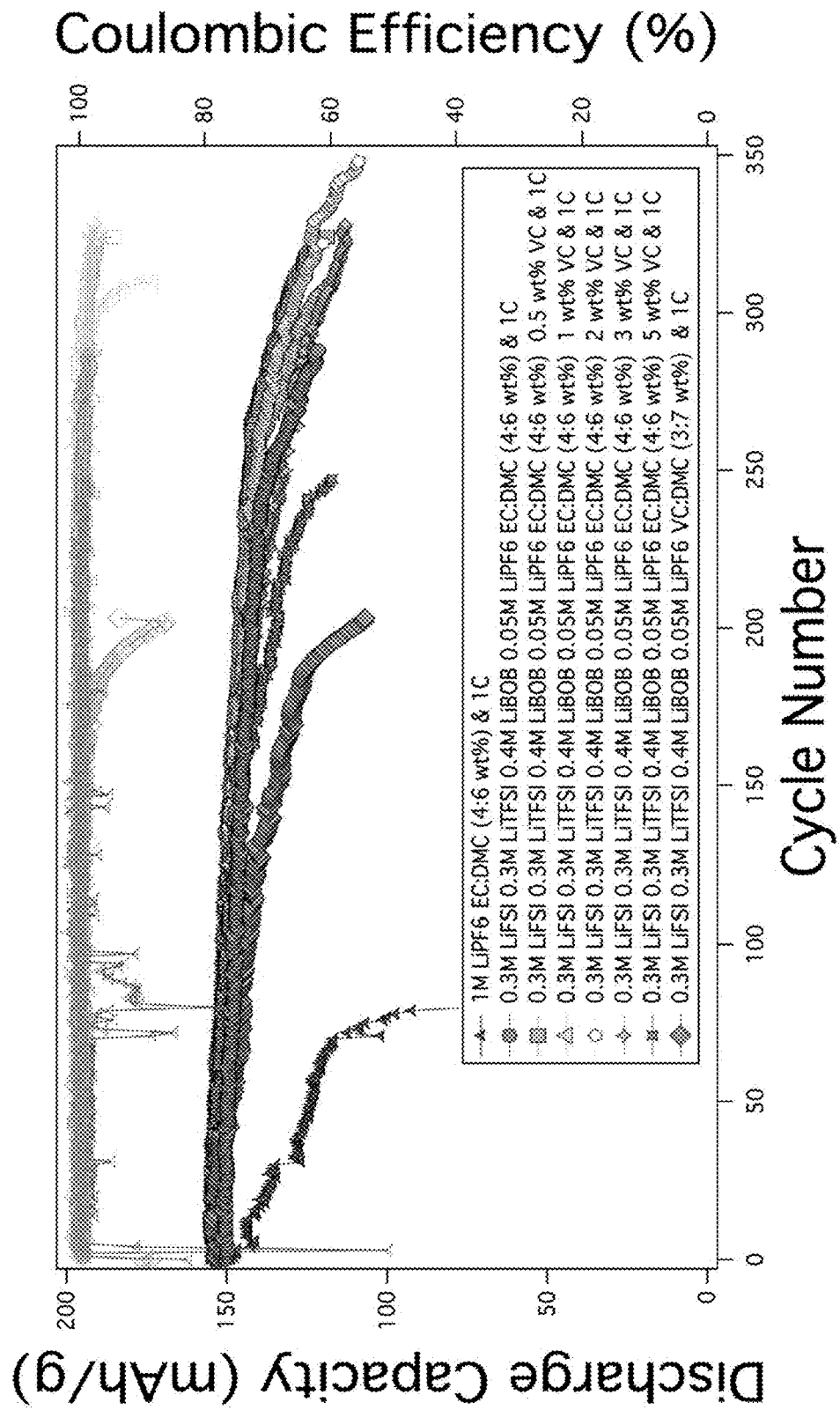
FIG. 15 illustrates the characteristics of lithium metal coin cell batteries using NCM (6/2/2) positive electrodes as a function of addition of VC in the electrolyte systems including 0.3 M LiFSI, 0.3 M LiTFSI, 0.4 M LiBOB, 0.05 M LiPF$_6$ in EC:DMC (weight ratio 4:6).

FIG. 15 illustrates the characteristics of lithium metal coin cell batteries as a function of addition of VC in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.3 M LiFSI, 0.3 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 0.5 wt % or 2 wt %, the most stable capacity maintenance is provided. This is because the SEI formed from VC in the lithium negative electrode and NCM positive electrode inhibits a side reaction with the electrolyte and causes electrochemical surface stabilization. The positive electrode used herein is NCM (6/2/2).

Figure 16:
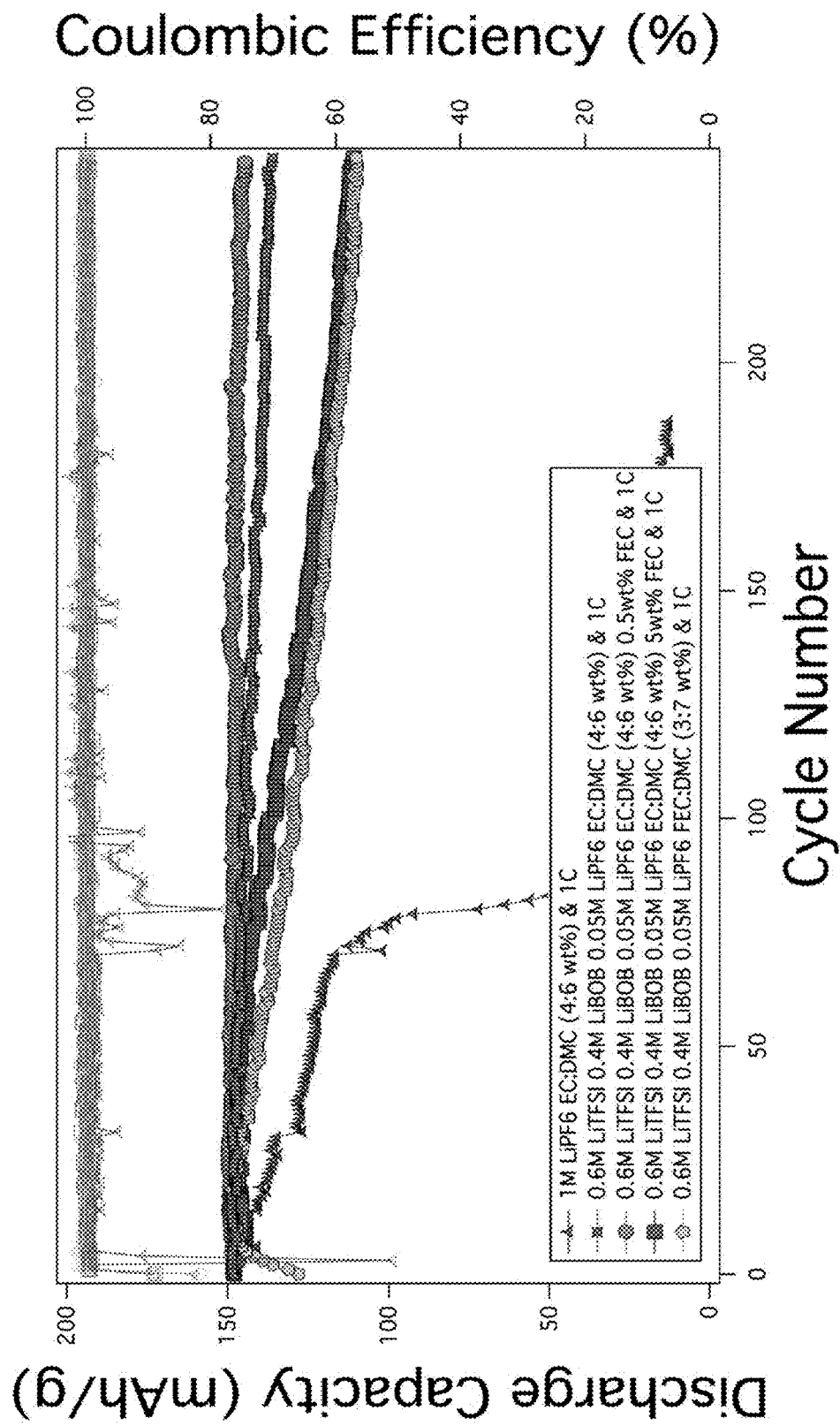
FIG. 16 illustrates the characteristics of lithium metal coin cell batteries using NCM (6/2/2) positive electrodes as a function of addition of FEC in the electrolyte systems including 0.6 M LiTFSI, 0.4 M LiBOB, 0.05 M LiPF$_6$ in EC:DMC (weight ratio 4:6) of FIG. 3.

FIG. 16 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6) of FIG. 14. 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which FEC is added show slightly improved life characteristics under the condition of charging/discharging at 1C. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 17:
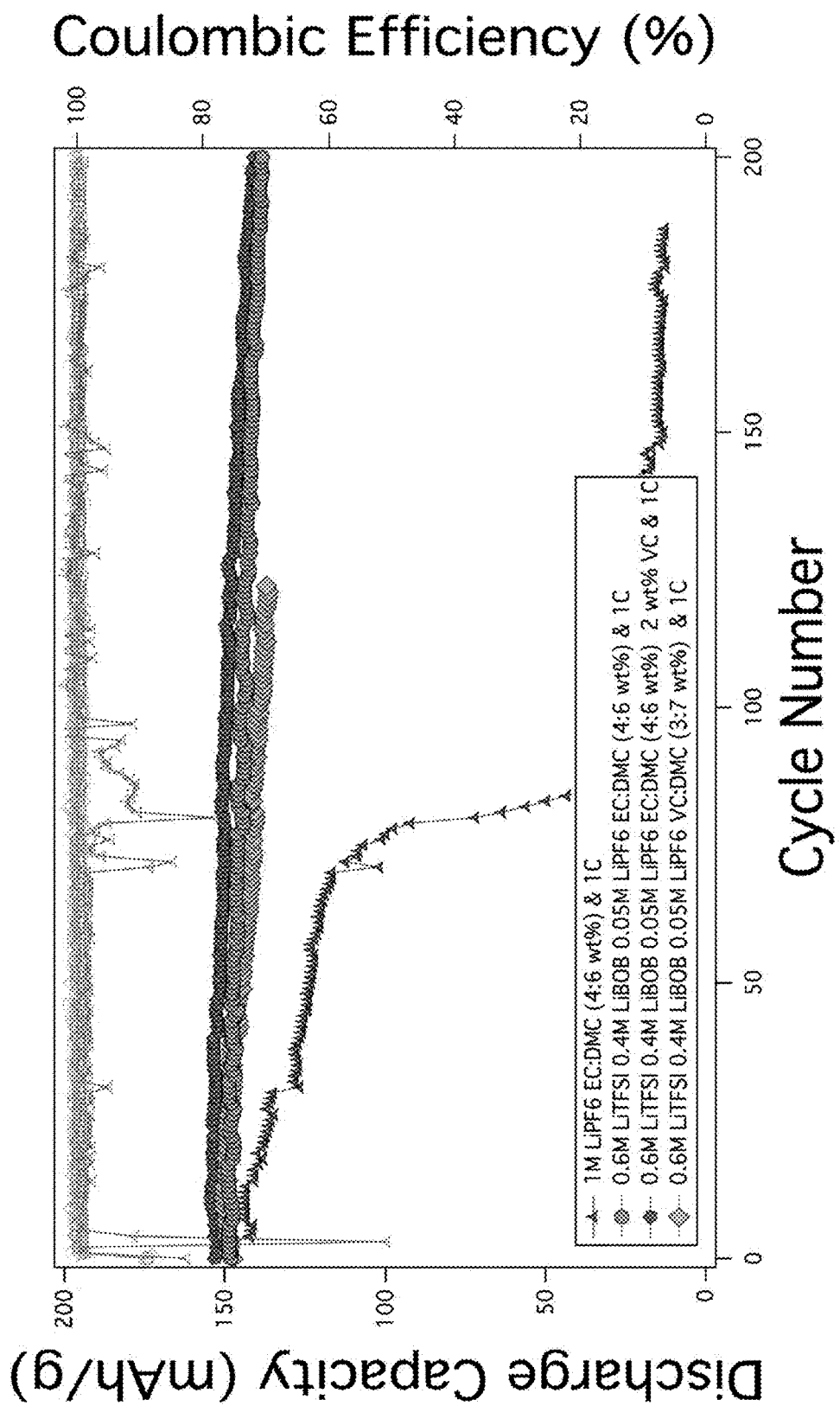
FIG. 17 illustrates the characteristics of lithium metal coin cell batteries using NCM (6/2/2) positive electrodes as a function of addition of VC in the electrolyte systems including 0.6 M LiTFSI, 0.4 M LiBOB, 0.05 M LiPF$_6$ in EC:DMC (weight ratio 4:6).

FIG. 17 illustrates the characteristics of lithium metal coin cell batteries as a function of addition of VC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 2 wt %, the most stable capacity maintenance is provided. This is because the SEI formed from VC in the lithium negative electrode and NCM positive electrode inhibits a side reaction with the electrolyte and causes electrochemical surface stabilization. The positive electrode used herein is NCM (6/2/2).

Figure 18:
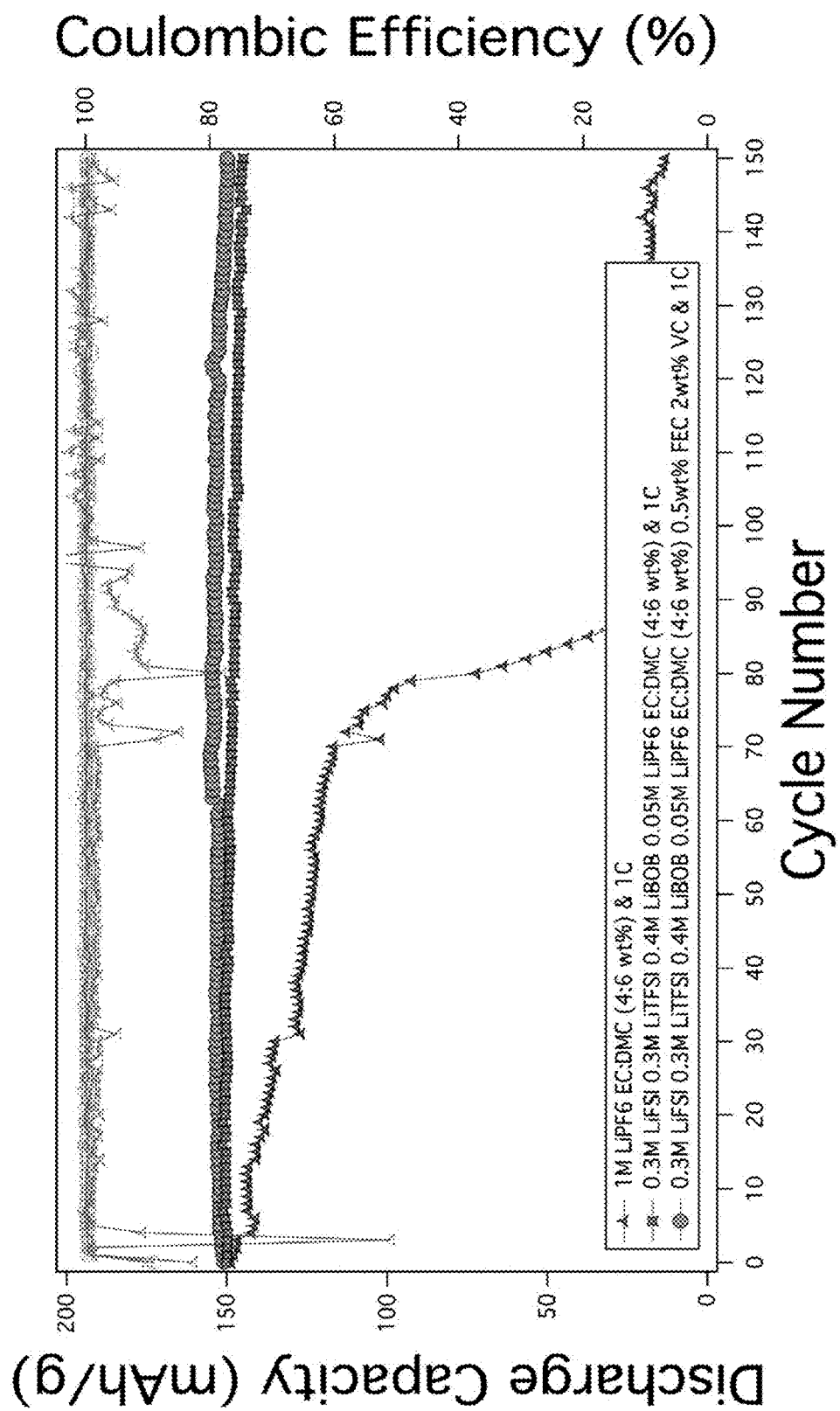
FIG. 18 illustrates the characteristics of lithium metal coin cell batteries using NCM (6/2/2) positive electrodes to which FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6).

FIG. 18 illustrates the characteristics of lithium metal coin cell batteries to which optimized FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cell using 0.3 M LiFSI, 0.3 M LiTFSI, 0.4 M LiBOB, 0.05 M LiPF$_6$ EC:DMC (weight ratio 4:6) in combination with optimized 0.5 wt % of FEC and 2 wt % of VC additive solvents shows the most stable life characteristics under the condition of charging/discharging at 1 C and more stable life characteristics as compared to the electrolyte system using no additive solvent. The positive electrode used herein is NCM (6/2/2).

Figure 19:
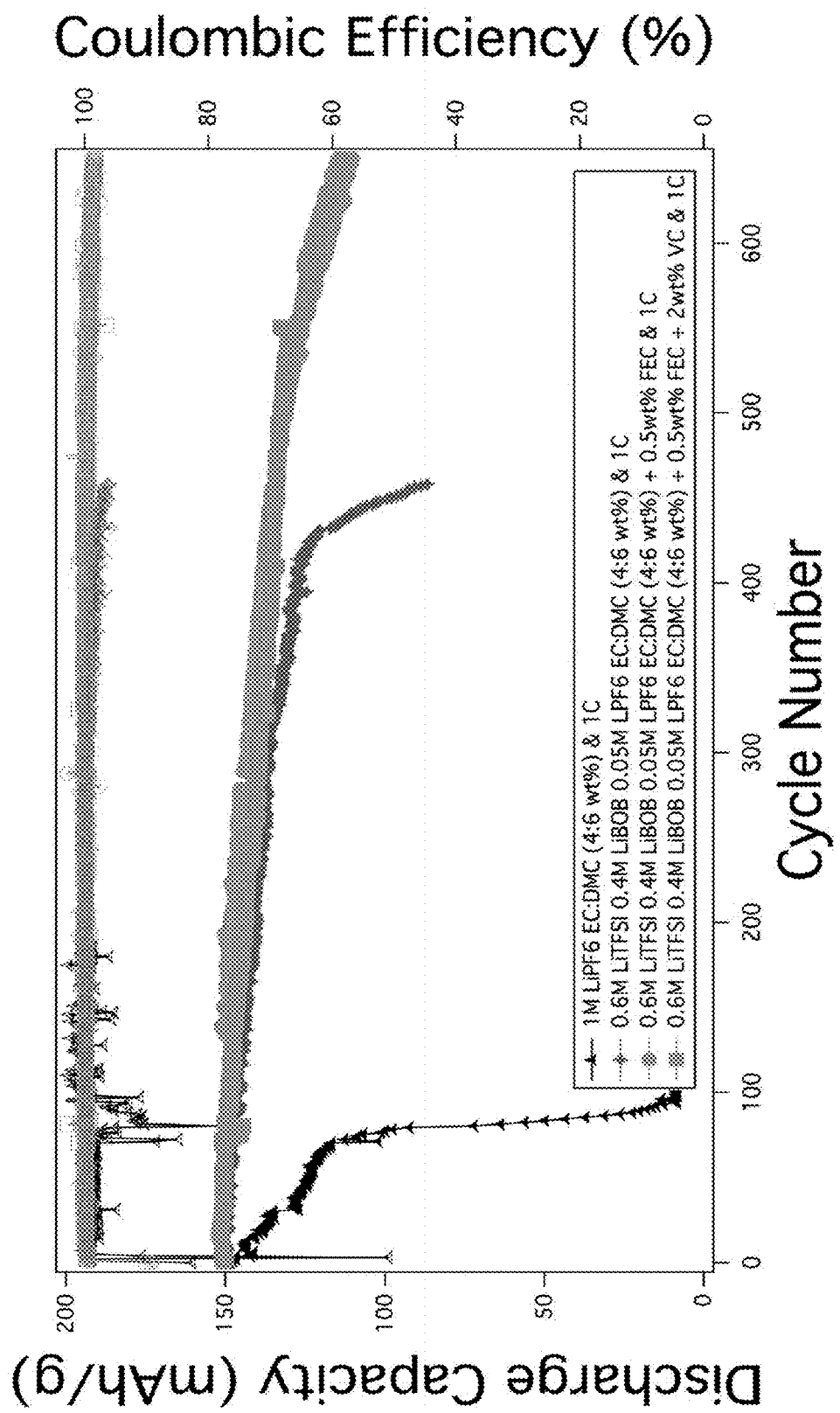
FIG. 19 illustrates the characteristics of lithium metal coin cell batteries using NCM (6/2/2) positive electrodes to which 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6).

FIG. 19 illustrates the characteristics of lithium metal coin cell batteries to which optimized 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data including termination of the battery life at the 80$^{th}$ cycle and the electrolyte containing no additive solvent causes termination of the battery life at the 400$^{th}$ cycle, while the coin cell using 0.6 M LiTFSI, 0.4 M LiBOB, 0.05 M LiPF$_6$ EC:DMC (weight ratio 4:6) in combination with optimized 0.5 wt % of FEC alone or 0.5 wt % of FEC and 2 wt % of VC additive solvents shows the most stable life characteristics under the condition of charging/discharging at 1 C and more stable life characteristics as compared to the electrolyte system using no additive solvent.

Figure 20A:
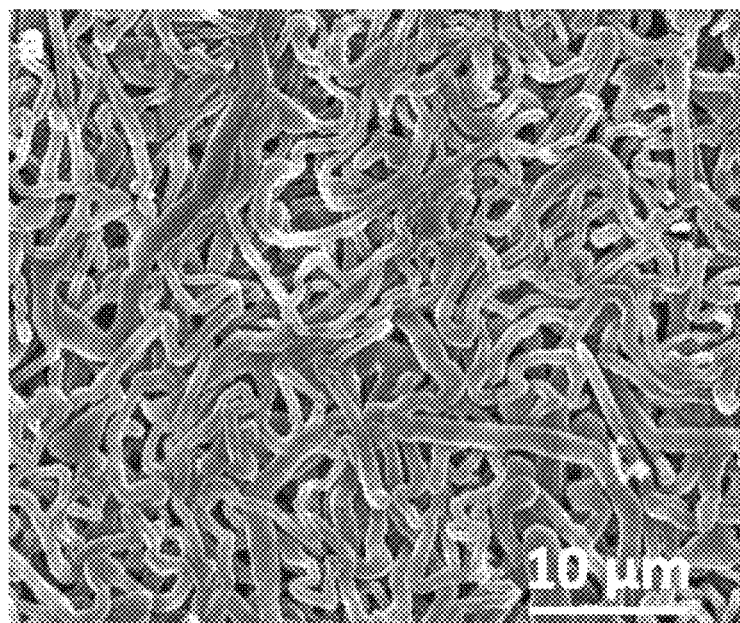
FIGS. 20A and 20B show images of lithium surfaces taken by scanning electron microscopy (SEM) after carrying out cycles by using electrolytes including LiTFSI, LiBOB and LiPF$_6$ salts and EC:DMC to which additive solvents are added or not.
Figure 20B:
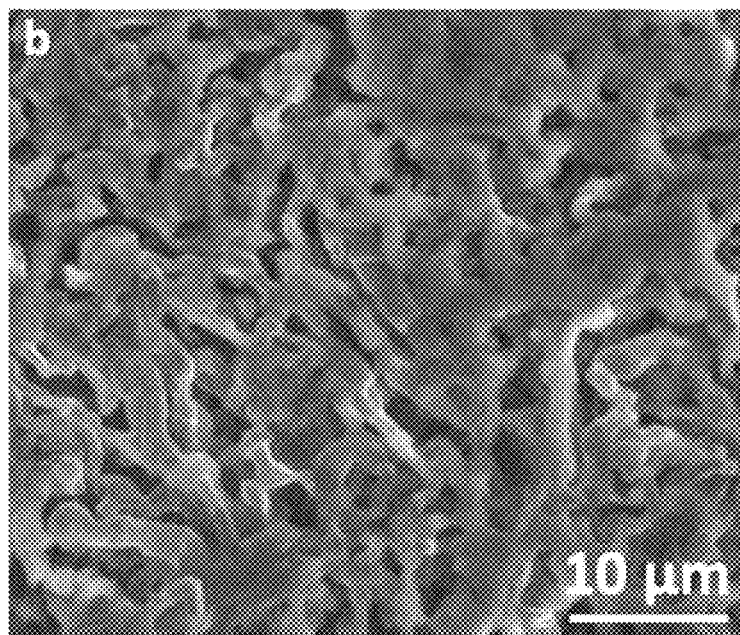

FIGS. 20A and 20B show images of lithium surfaces taken by scanning electron microscopy (SEM) after carrying out cycles by using electrolytes including LiTFSI, LiBOB and LiPF$_6$ salts and EC:DMC to which additive solvents are added or not. After subjecting the cells to 200 charging/discharging cycles at 1 C, the cell (a) using the electrolyte including LiTFSI, LiBOB and LiPF$_6$ salts and EC:DMC with no additive solvent shows a larger amount of formation of high-surface area lithium dendrite and higher surface roughness, as compared to the electrolyte (b) containing an additive solvent. This is because such an adequate combination of the salt with additive solvents allows formation of more stable and elastic SEI on the surface of the lithium negative electrode.

Figure 21:
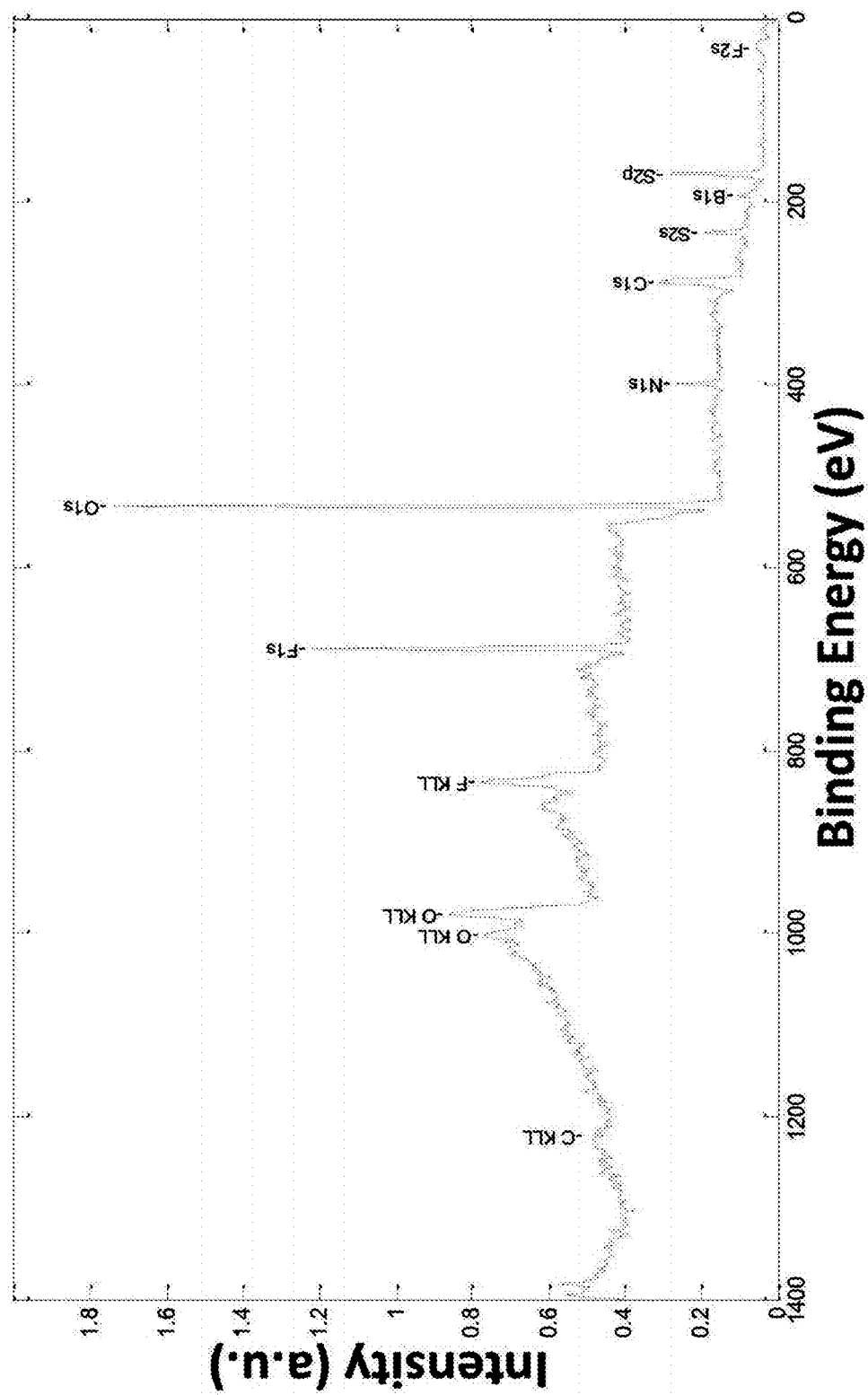
FIG. 21 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C.

FIG. 21 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C. After carrying out cycles for a long time by using the electrolyte system including LiTFSI, LiBOB and LiPF$_6$ salts and additive solvents, no Al is detected, and Li (13.99%), B (3.16%), C (26.81%), N (3.41%), O (34%), F (12.41%) and S (5.41%) are detected in the SEI formed from the composition of main salts. This suggests that such an adequate combination of salts inhibits corrosion of Al.

Figure 22:
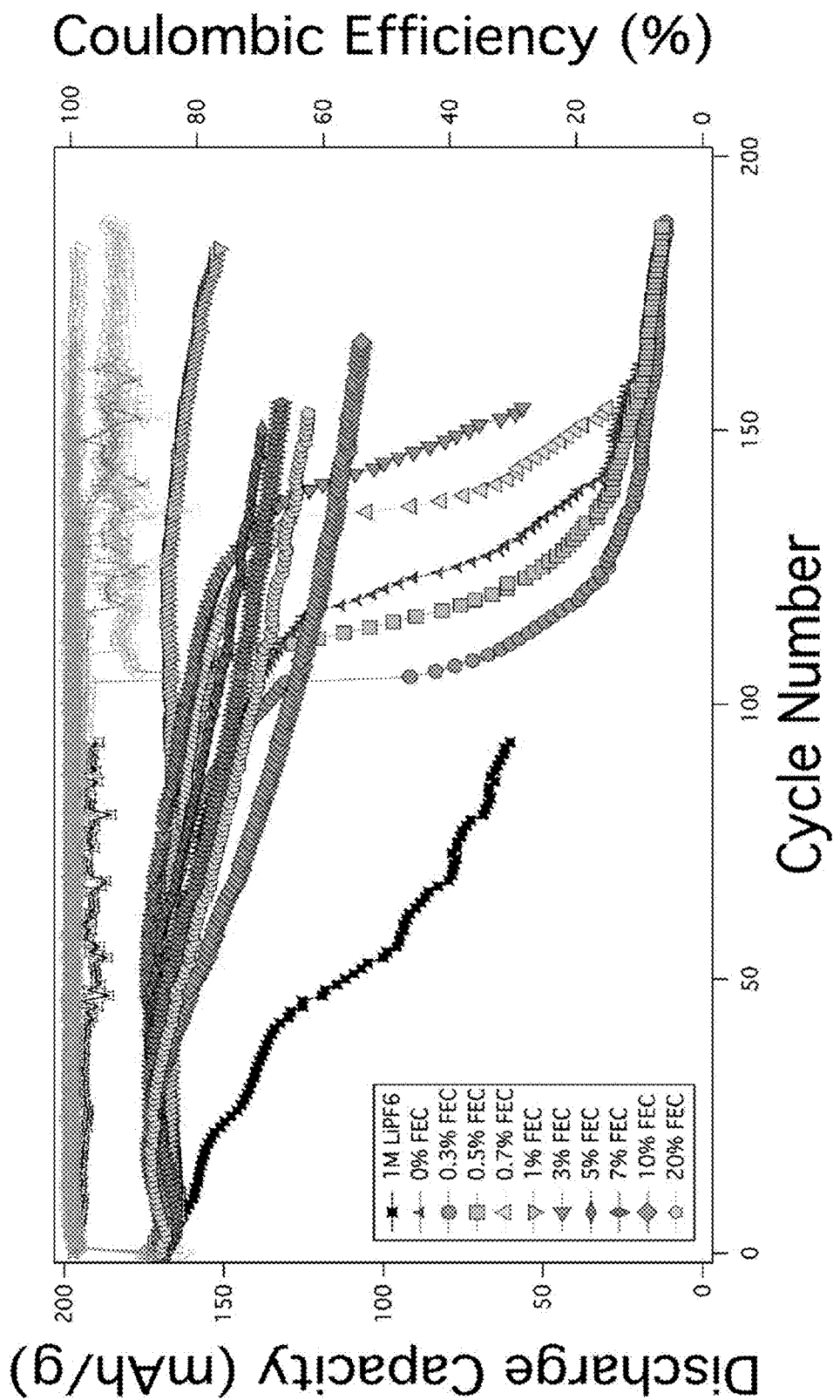
FIG. 22 illustrates the characteristics of lithium metal coin cell batteries using NCM (8/1/1) positive electrodes as a function of addition of FEC in the electrolyte systems including 0.6 M LiTFSI, 0.4 M LiBOB, 0.05 M LiPF$_6$ in EC:DMC (weight ratio 4:6).

FIG. 22 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 30$^{th}$ cycle, while the coin cell using 0.6 M LiTFSI, 0.4 M LiBOB, 0.05 M LiPF$_6$ EC:DMC (weight ratio 4:6) in combination with optimized 1 wt % of FEC additive solvent shows the most stable life characteristics under the condition of charging/discharging at 1 C and more stable life characteristics as compared to the electrolyte system using no additive solvent. The positive electrode used herein is NCM (8/1/1). This is a test for finding an optimized FEC addition ratio when using a high-energy density NCM positive electrode different from the above-mentioned positive electrode.

Figure 23:
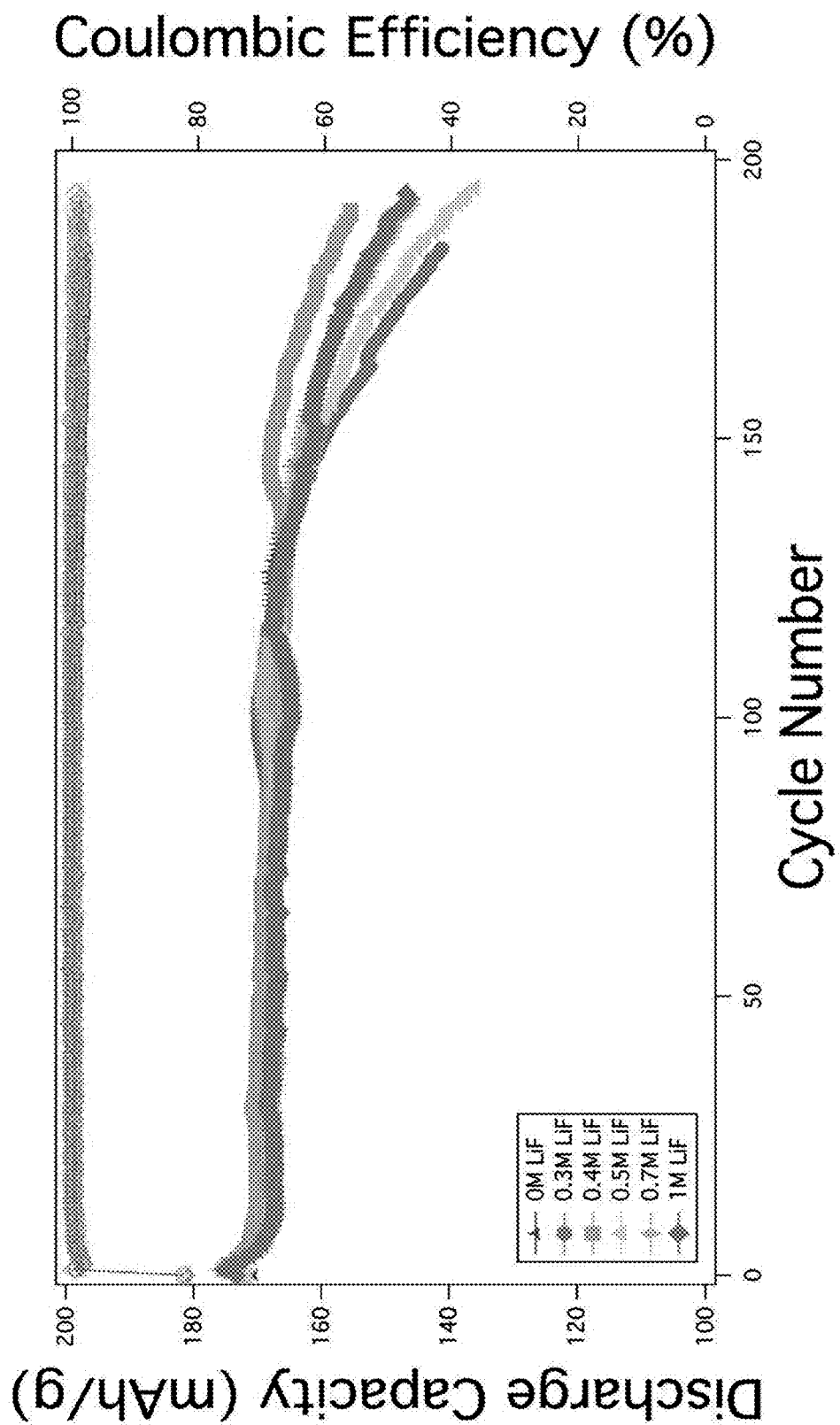
FIG. 23 illustrates the characteristics of lithium metal coin cell batteries using NCM (8/1/1) positive electrodes as a function of concentration of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio).

FIG. 23 illustrates the characteristics of lithium metal coin cell batteries as a function of concentration of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio). The optimized LiF concentration is 0.4 M in the electrolyte system of 0.6 M LiTFSI, 0.4 M LiBOB, 0.05 M LiPF$_6$ in EC:DMC (weight ratio 4:6) and 1 wt % FEC (weight ratio). The coin cell using the solvent to which the optimized LiF salt is added shows the most stable life characteristics under the condition of charging/discharging at 1 C. The positive electrode used herein is NCM (8/1/1). This is a test for finding an optimized FEC addition ratio when using a high-energy density NCM positive electrode different from the above-mentioned positive electrode.

Figure 24:
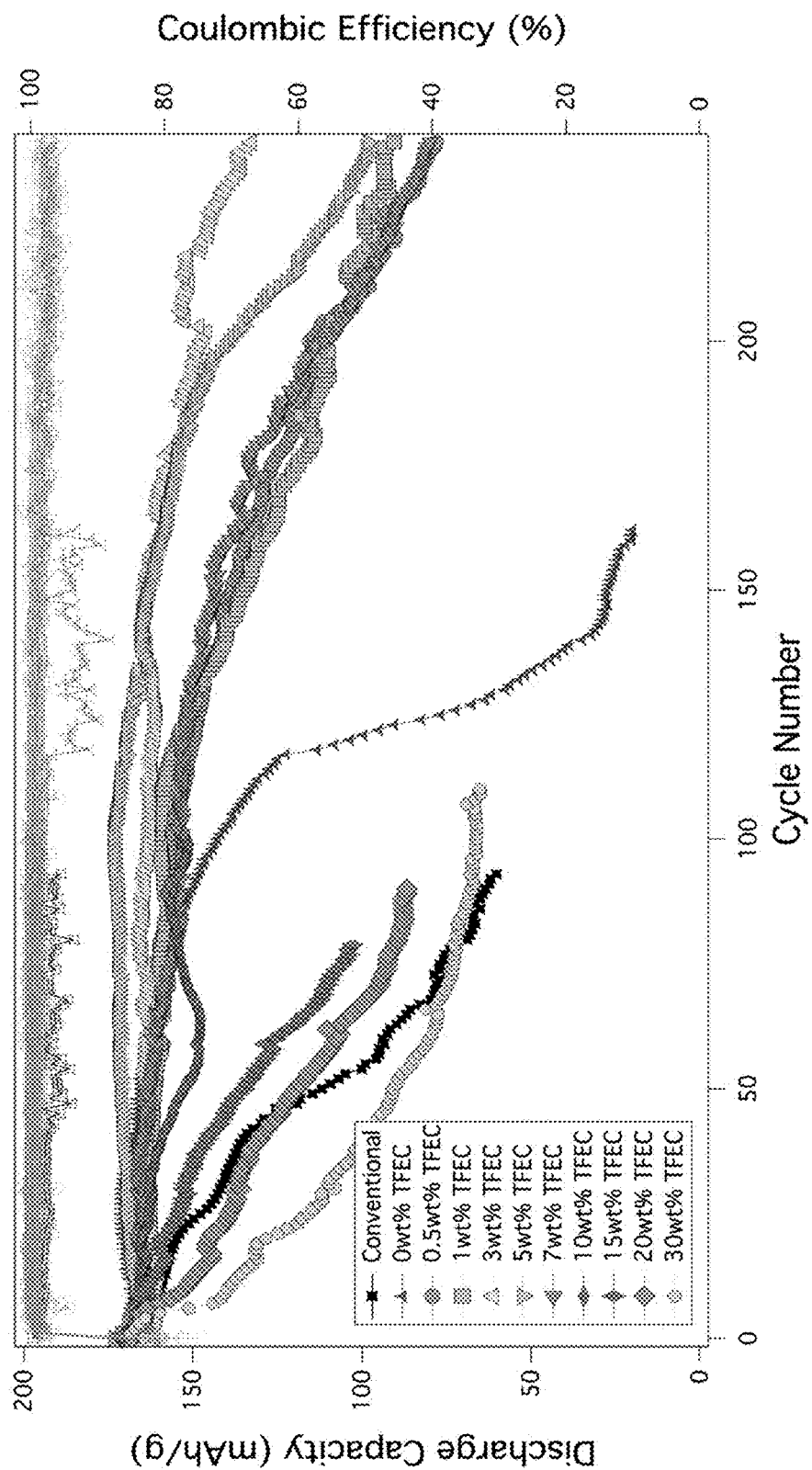
FIG. 24 illustrates the characteristics of lithium metal coin cell batteries using NCM (8/1/1) positive electrodes in the electrolytes including 0.6 M LiTFSI, 0.4 M LiBOB, 0.4M LiF and 0.05 M LiPF$_6$ salts combined with 1 wt % of FEC and 3 wt % of VC as solvents, wherein 0-30 wt % of TFEC additive solvent is added to the electrolytes.

FIG. 24 illustrates the cycle characteristics of lithium metal batteries using EC:DMC (weight ratio 4:6), 1 wt % of FEC, 3 wt % of VC solvent combined with 0.6 M LiTFSI, 0.4 M LiBOB, 0.4 M LiF, 0.05 M LiPF$_6$ salts and containing 0-30 wt % of TFEC as an additive solvent. 1 M LiPF$_6$ EC:DMC (weight ratio 4:6) [Conventional] 1C shows comparative data and the battery life is terminated at the 30$^{th}$ cycle, while the electrolyte system including 0.6 M LiTFSI, 0.4 M LiBOB, 0.4 M LiF, 0.05 M LiPF$_6$ in EC:DMC (weight ratio 4:6) combined with 1 wt % of FEC, 3 wt % of VC and 3 wt % TFEC shows significantly stable capacity maintenance and life characteristics. The positive electrode used herein is NCM (8/1/1). It is most preferred that 3 wt % of TFEC is added in the range of 0-30 wt % of TFEC.

Figure 25:
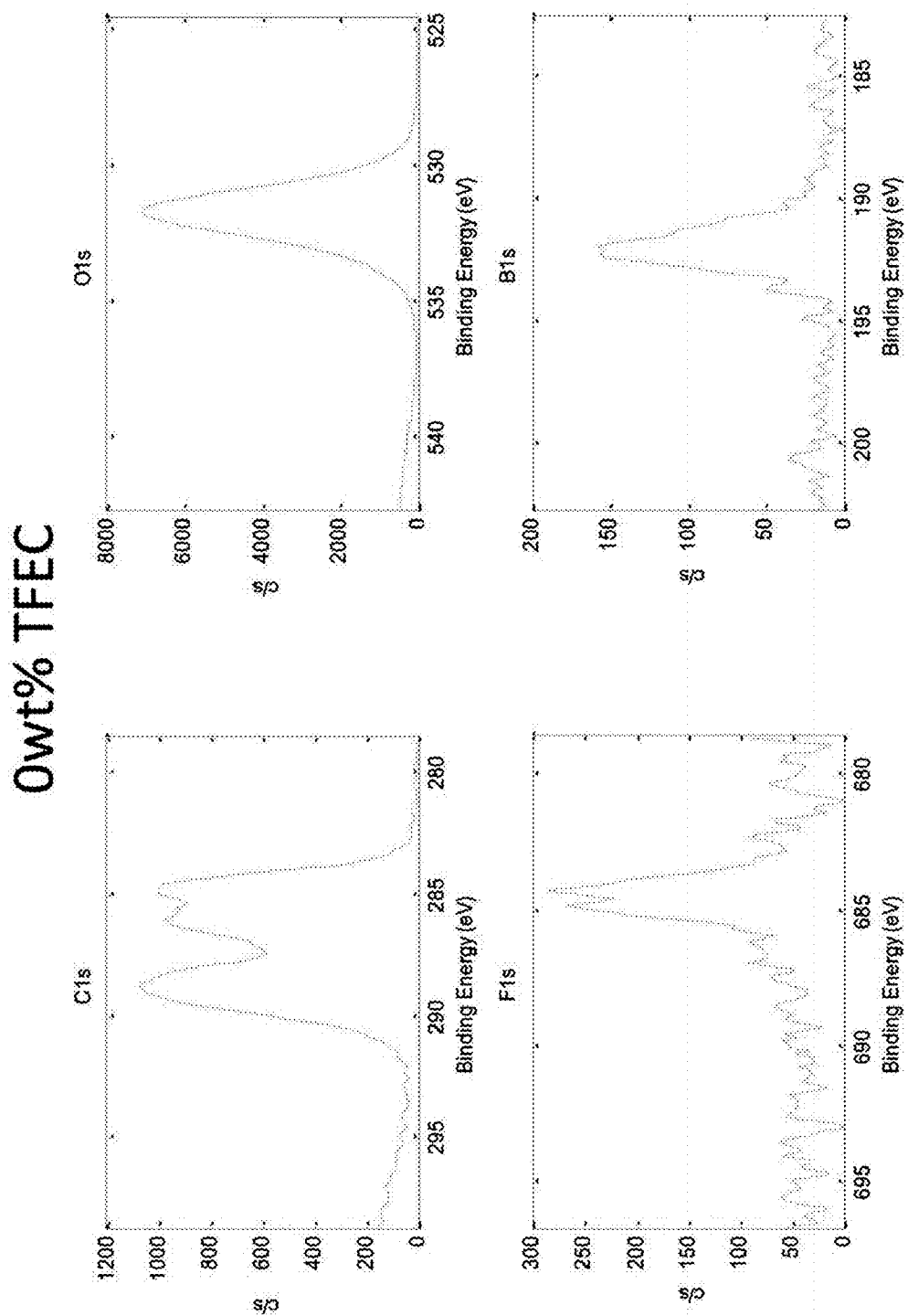
FIG. 25 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0 wt % TFEC.

FIG. 25 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0 wt % TFEC. The positive electrode used herein is NCM (8/1/1).

Figure 26:
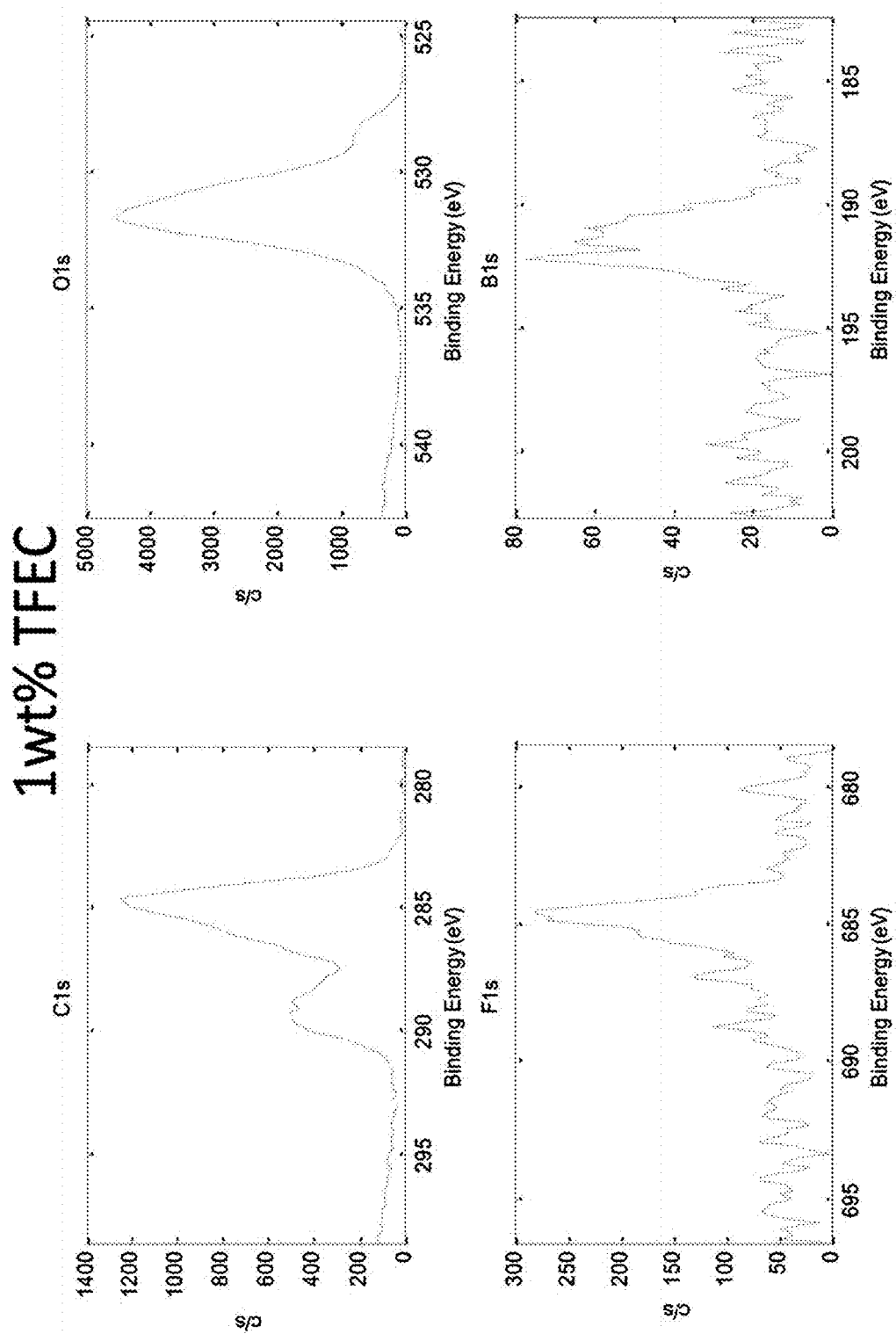
FIG. 26 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 1 wt % of TFEC.

FIG. 26 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 1 wt % TFEC. The positive electrode used herein is NCM (8/1/1).

Figure 27:
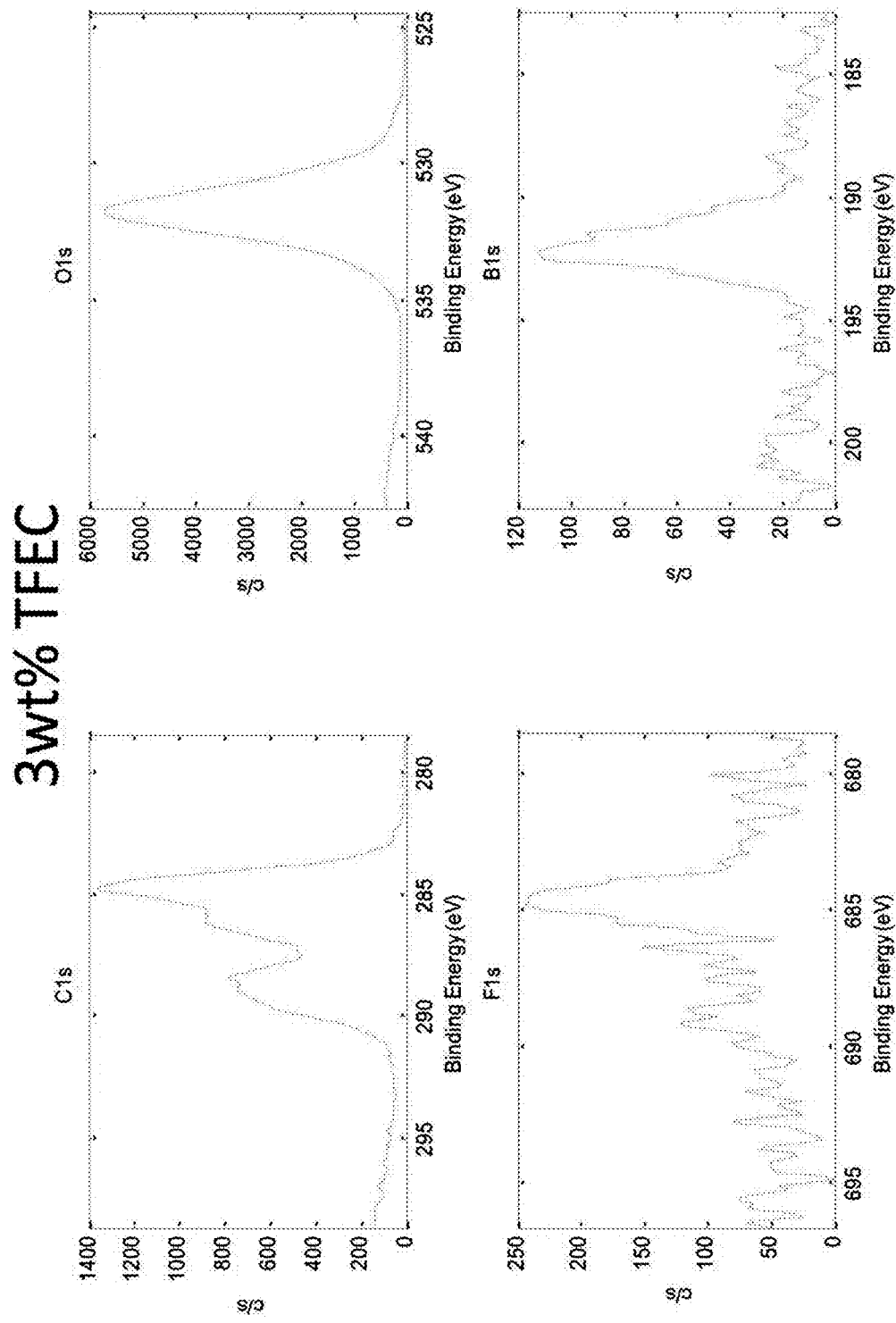
FIG. 27 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 3 wt % TFEC.

FIG. 27 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 3 wt % TFEC. The positive electrode used herein is NCM (8/1/1).

Figure 28:
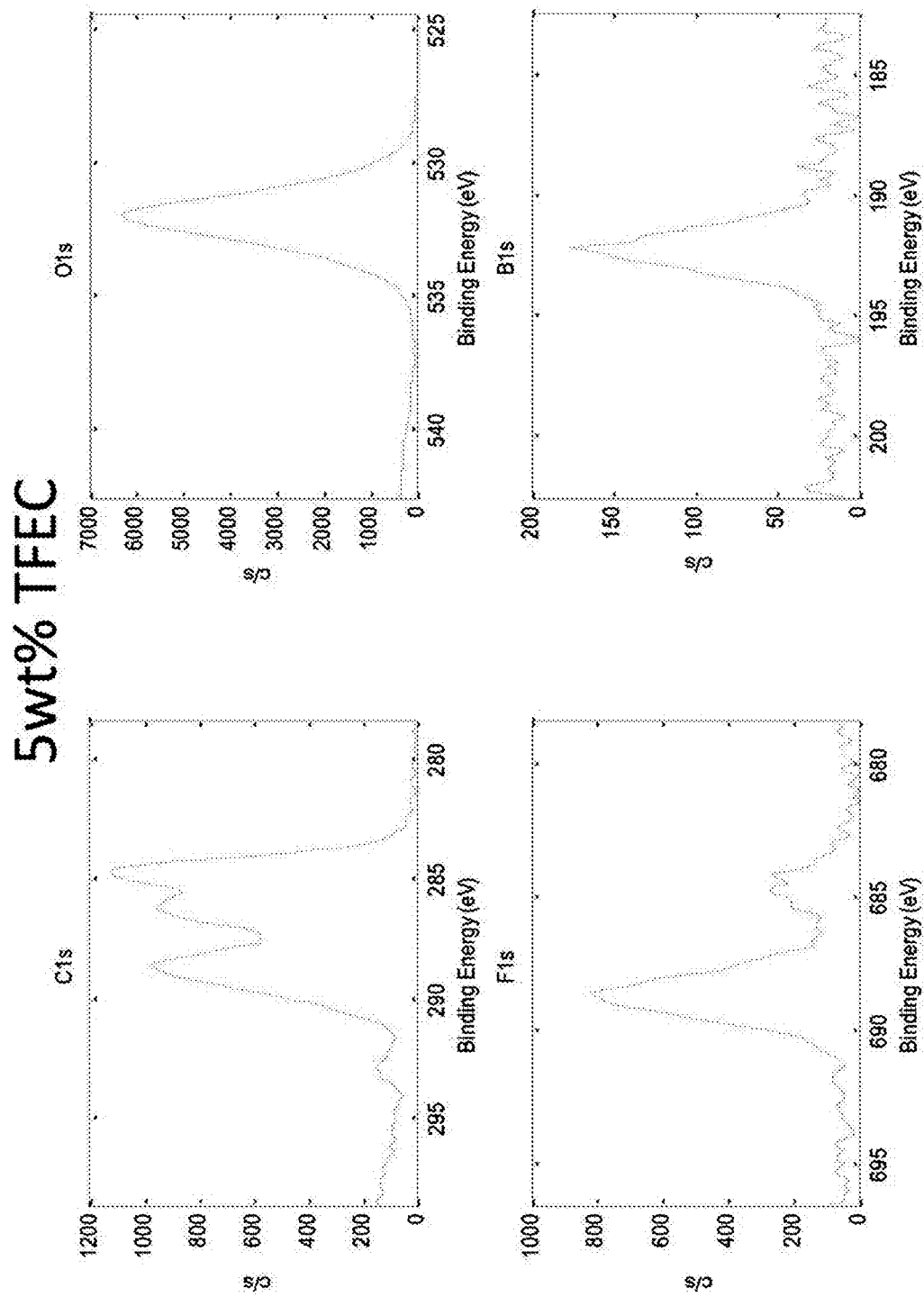
FIG. 28 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 5 wt % TFEC.

FIG. 28 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 5 wt % TFEC. The positive electrode used herein is NCM (8/1/1).

Figure 29:
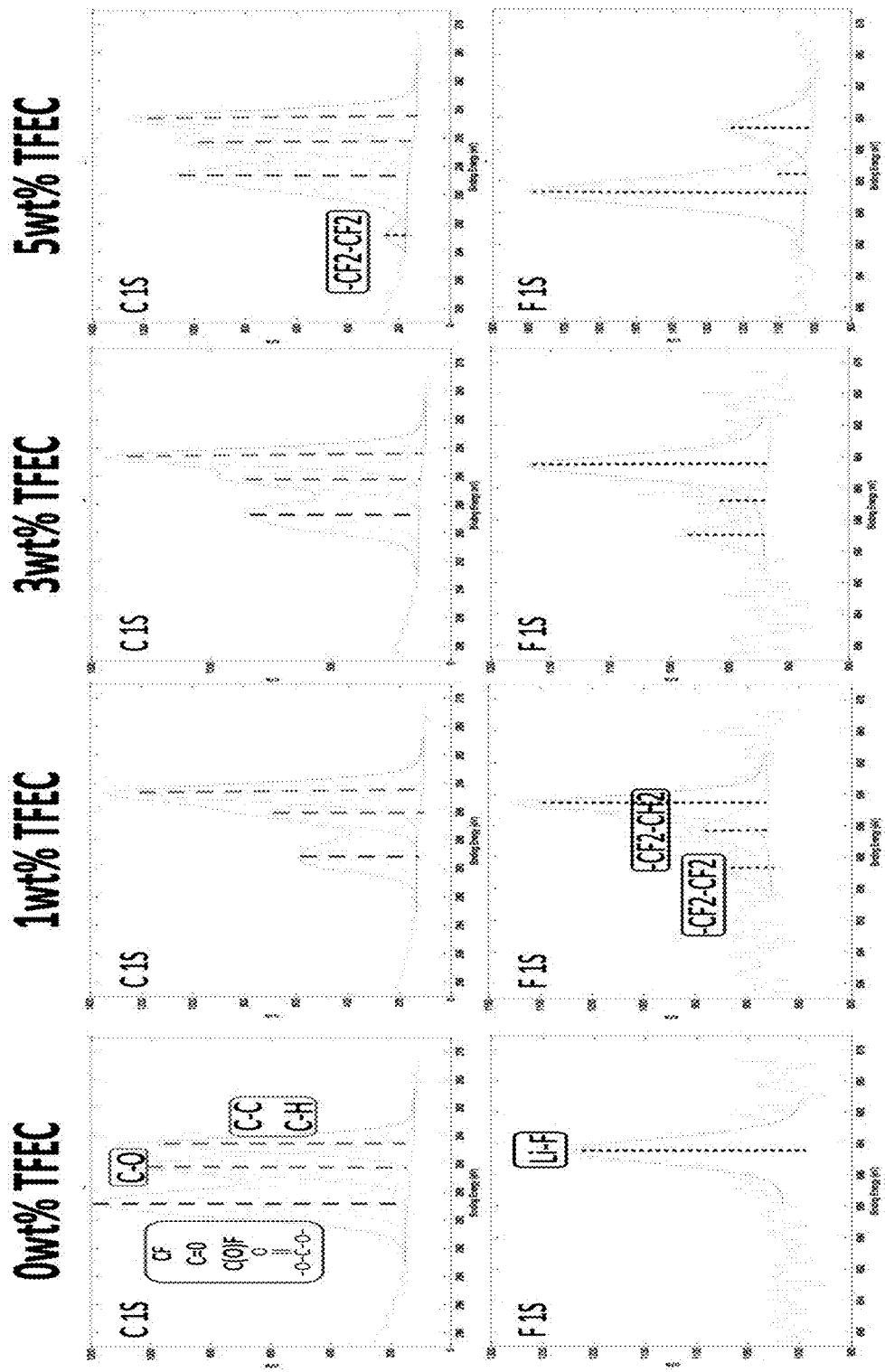
FIG. 29 illustrates narrow scan XPS spectra of C 1s and F 1s elements of FIG. 14 to FIG. 17 and shows a variation of each peak.

FIG. 29 illustrates narrow scan XPS spectra of C 1s and F 1s elements of FIG. 25 to FIG. 28 and shows a variation of each peak.

As the weight proportion of TFEC is increased, the peak ratio of LiF is varied, peaks of —$CF_2$—$CF_2$— and $CF_2$—$CH_2$— are newly formed, and the peak ratio of F 1s using 3 wt % of TFEC is most preferred. In addition, referring to C 1s peaks, a higher weight proportion of TFEC provides increased peaks of [C—F, C=O, C(O)F, $CO_3$], i.e., peaks of elements F bound with C. The peak ratio of F 1s using 3 wt % of TFEC is most preferred.

This is because an adequate amount of LiF forms a stable SEI layer but causes degradation of ion conductivity. Thus, when LiF is generated excessively, the SEI layer shows decreased ion conductivity and becomes excessively hard to cause degradation of physical properties.

Meanwhile, the SEI layer having an adequate amount of [C—F, C=O, C(O)F, $CO_3$] bonds has a certain degree of flexibility. Thus, formation of a SEI layer having an adequate ratio of bonds between C and F significantly contributes to improvement of the characteristics of a lithium metal secondary battery.

(3) THIRD GROUP OF EXAMPLES, COMPARATIVE EXAMPLES AND TEST EXAMPLES

Comparative Example 1: Preparation of Electrolyte Using LiFSI, LiTFSI, LiBOB, $LiPF_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, $LiPF_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M $LiPF_6$) in EC:DMC (4:6 w/w) was used for a lithium metal battery.

Comparative Example 2: Preparation of Electrolyte Using LiTFSI, LiBOB, $LiPF_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, $LiPF_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M $LiPF_6$) in EC:DMC (4:6 w/w) was used for a lithium metal battery.

Comparative Example 3: Preparation of Electrolyte Using LiFSI, LiDFOB, $LiPF_6$ Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiDFOB salt was dissolved in the mixed solvent to a concentration of 0.4 M under moisture-free environment for 3-6 hours, while carrying out agitation continuously. Then, $LiPF_6$ salt was dissolved therein for 6-12 hours to a concentration of 0.05 M. Additionally, LiFSI salt was dissolved therein to a concentration of 0.6 M.

The obtained electrolyte (0.6 M LiFSI+0.4 M LiDFOB+0.05 M $LiPF_6$) in EC:DMC (4:6 w/w) was used for a lithium metal battery.

Comparative Example 4: Preparation of Electrolyte Using LiFSI, LiTFSI, LiBOB, $LiPF_6$ Salts and FEC:DMC Solvent First, FEC was agitated and mixed with DMC at a weight ratio of 3:7 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, $LiPF_6$ salt was dissolved therein for 6-12 hours to a concentration of 0.05 M. Additionally, each of LiFSI and LITFSI salts was dissolved therein to a concentration of 0.3 M.

The obtained electrolyte (0.3 M LiFSI+0.3 M LiTFSI+0.4 M LiBOB+0.05 M $LiPF_6$) in FEC:DMC (3:7 w/w) was used for a lithium metal battery.

Comparative Examples 5a and 5b: Preparation of Electrolyte Using LiTFSI, LiBOB, $LiPF_6$ Salts and FEC:DMC or VC:DMC Solvent First, FEC was agitated and mixed with DMC, or VC was agitated and mixed with DMC at a weight ratio of 3:7 in each case under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, $LiPF_6$ salt was dissolved therein for 6-12 hours to a concentration of 0.05 M. Additionally, LITFSI salt was dissolved therein to a concentration of 0.6 M.

The obtained electrolyte (0.6 M LiTFSI+0.4 M LiBOB+0.05 M $LiPF_6$) in FEC:DMC (3:7 w/w) or VC:DMC (3:7 w/w) was used for a lithium metal battery.

Comparative Example 6: Preparation of Electrolyte Using $LiPF_6$ Salt and EC:DMC Solvent First, EC was dissolved at 60° C., and then was agitated and mixed with DMC at a weight ratio of 4:6 under moisture-free environment for 15-30 minutes to obtain a mixed solvent. Next, $LiPF_6$ salt was dissolved to the mixed solvent for 12-24 hours to a concentration of 1 M, while carrying out agitation continuously.

The obtained electrolyte (1 M $LiPF_6$) in EC:DMC (4:6 w/w) was used for a lithium metal battery.

Comparative Examples 7a to 7e: Preparation of Electrolyte Using LiTFSI, LIBOB, $LiPF_6$, LiF Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LiTFSI salt was dissolved therein to a concentration of 0.6 M. Further, LiF was dissolved therein to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in EC:DMC (4:6 w/w) was used for a lithium metal battery.

Examples 1a and 1b: Preparation of Electrolyte Containing FEC Solvent Added Thereto To the electrolyte obtained from Comparative Example 1, FEC was added in an amount of 0.5 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 or 5 wt % FEC) was used for a lithium metal battery.

Examples 2a to 2e: Preparation of Electrolyte Containing VC Solvent Added Thereto To the electrolyte obtained from Comparative Example 1, VC was added in an amount of 0.5 wt %, 1 wt %, 2 wt %, 3 wt % and 5 wt %, respectively, based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5-2 wt % VC) was used for a lithium metal battery.

Example 3: Preparation of Electrolyte Containing FEC+VC Solvent Added Thereto To the electrolyte obtained from Comparative Example 1, 0.5 wt % of FEC and 2 wt % of VC were added based on the total weight of the electrolyte and agitated for 1 hour under moisture-free environment.

The obtained electrolyte (0.3 M LiFSI+0.3 M LiTFSI+0.4 M LiBOB+0.05 M LiPF$_6$) in (EC:DMC (4:6 w/w)+0.5 wt % FEC+2 wt % VC) was used for a lithium metal battery.

Examples 4a to 4i: Preparation of Electrolyte Containing FEC Solvent Added Thereto To the electrolyte obtained from Comparative Example 2, FEC was added in an amount of 0.3 wt %, 0.5 wt %, 0.7 wt %, 1 wt %, 3 wt %, 5 wt %, 7 wt %, 10 wt % or 20 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+0.3-20 wt % FEC) was used for a lithium metal battery.

Example 5: Preparation of Electrolyte Containing VC Solvent Added Thereto

To the electrolyte obtained from Comparative Example 2, VC was added in an amount of 2 wt % based on the total weight of the electrolyte and agitated for 1 hour under moisture-free environment.

The obtained electrolyte (0.6 M LiTFSI+0.4 M LiBOB+0.05 M LiPF$_6$) in (EC:DMC (4:6 w/w)+2 wt % VC) was used for a lithium metal battery.

Example 6: Preparation of Electrolyte Containing FEC+VC Solvent Added Thereto To the electrolyte obtained from Comparative Example 2, 0.5 wt % of FEC and 2 wt % of VC were added based on the total weight of the electrolyte and agitated for 1 hour under moisture-free environment.

The thus obtained electrolyte (0.6 M LiTFSI+0.4 M LiBOB+0.05 M LiPF$_6$) in (EC:DMC (4:6 w/w)+0.5 wt % FEC+2 wt % VC) was used for a lithium metal battery.

Examples 7a to 7e: Preparation of Electrolyte Using LiTFSI, LIBOB, LiPF$_6$, LiF Salts and EC:DMC Solvent To the electrolyte obtained from Example 4d, LiF salt was further dissolved to a concentration of 0.3 M, 0.4 M, 0.5 M, 0.7 M or 1 M.

The obtained electrolyte (0.6 M LiTFSI+0.4 M LiBOB+0.05 M LiPF$_6$+0.3-1 M LiF) in (EC:DMC (4:6 w/w)+1 wt % FEC) was used for a lithium metal battery.

Example 2-1: Preparation of Electrolyte Using LiTFSI, LIBOB, LiPF$_6$, LiF Salts and EC:DMC Solvent First, EC was dissolved at 60° C., and then was agitated and mixed with DMC at a weight ratio of 4:6 under moisture-free environment for 15-30 minutes to obtain a mixed solvent. Next, LiBOB salt was dissolved in the mixed solvent to a concentration of 0.4 M under moisture-free environment for 12-24 hours, while carrying out agitation continuously. Then, LiPF$_6$ salt was dissolved therein for 6-12 hours to a concentration of 0.05 M. Additionally, LiTFSI salt was dissolved therein to a concentration of 0.6 M. Further, LiF was dissolved therein to a concentration of 0.4 M. Then, 1 wt % of EFC and 3 wt % of VC were added thereto based on the total weight of the electrolyte and the resultant mixture was agitated for 1 hour under moisture-free environment.

The obtained electrolyte (0.6 M LiTFSI+0.4 M LiBOB+0.05 M LiPF$_6$+0.3-1 M LiF) in (EC:DMC (4:6 w/w)+1 wt % FEC+3 wt % VC) was used for a lithium metal battery.

Examples 2-2a to 2-2i: Preparation of Electrolyte Using LiTFSI, LIBOB, LiF, LiPF$_6$ Salts and EC:DMC Solvent To the electrolyte obtained from Example 2-1, TFEC was added in an amount of 0.5 wt %, 1 wt %, 3 wt %, 5 wt %, 7 wt %, 10 wt %, 15 wt %, 20 wt % or 30 wt % based on the total weight of the electrolyte and the resultant mixture was agitated for 2 hours under moisture-free environment.

The obtained electrolyte (0.6 M LiTFSI+0.4 M LiBOB+0.05 M LiPF$_6$+0.4 M LiF) in (EC:DMC (4:6 w/w)+1 wt % FEC+3 wt % VC+0.5-30 wt % TFEC) was used for a lithium metal battery.

Examples 3-1a to 3-1d: Preparation of Electrolyte Using LiTFSI, LIBOB, LiF, LiPF$_6$ Salts and EC:DMC Solvent To the electrolyte (0.6 M LiTFSI+0.4 M LiBOB+0.05 M LiPF$_6$+0.4 M LiF) in (EC:DMC (4:6 w/w)+1 wt % FEC+3 wt % VC) obtained from Example 2-1, LiBF$_4$ salt was added to a concentration of 0.05 M, 0.1 M, 0.2 M or 0.3 M, and the resultant mixture was agitated for 1 hour under moisture-free environment.

The obtained electrolyte (0.6 M LiTFSI+0.4 M LiBOB+0.05 M LiPF$_6$+0.4 M LiF+0.05-0.3 M LiBF$_4$) in (EC:DMC (4:6 w/w)+1 wt % FEC+3 wt % VC) was used for a lithium metal battery.

Examples 3-2a to 3-2e: Preparation of Electrolyte Containing TFEC Additive Solvent To the electrolyte (0.6 M LiTFSI+0.4 M LiBOB+0.05 M LiPF$_6$+0.4 M LiF+0.05 M LiBF$_4$) in (EC:DMC (4:6 w/w)+1 wt % FEC+3 wt % VC) obtained from Example 3-1a, TFEC was added in an amount of 0.5 wt %, 1 wt %, 3 wt %, 5 wt % or 7 wt % based on the total weight of the electrolyte, and the resultant mixture was agitated for 2 hours under moisture-free environment.

The obtained electrolyte (0.6 M LiTFSI+0.4 M LiBOB+0.05 M LiPF$_6$+0.4 M LiF+0.05 M LiBF$_4$) in (EC:DMC (4:6 w/w)+1 wt % FEC+3 wt % VC+0.5-7 wt % TFEC) was used for a lithium metal battery.

Electrochemical Analysis of Lithium Metal Battery Using Modified Electrolyte

Each of the coin cells of lithium metal secondary batteries using the above-described electrolytes was used to determine the electrochemical characteristics thereof by carrying out a constant-current charging/discharging test. To provide the coin cells, lithium metal (disc with a diameter of 1.5 cm and a thickness of 150 μm), a PP separator having a thickness of 11 μm (diameter 1.8 cm), NCM (8/1/1 composition, 3.8 mAh/cm$^2$ loading, diameter 1.2 cm) positive electrode and the electrolytes (30 μL) were used. The coin cells were used to determine the electrochemical characteristics. Herein, the voltage range applied to the coin cells was 3-4.2 V. When the voltage reached 4.2 V, a constant voltage mode was used to carry out charging to a current value of 0.05 C. The first charge/discharge cycle of each cell was a formation cycle and was carried out at 0.1 C, and then charging/discharging was carried out continuously at 1 C.

Hereinafter, the analysis results will be described in detail with reference to the accompanying drawings.

Figure 30:
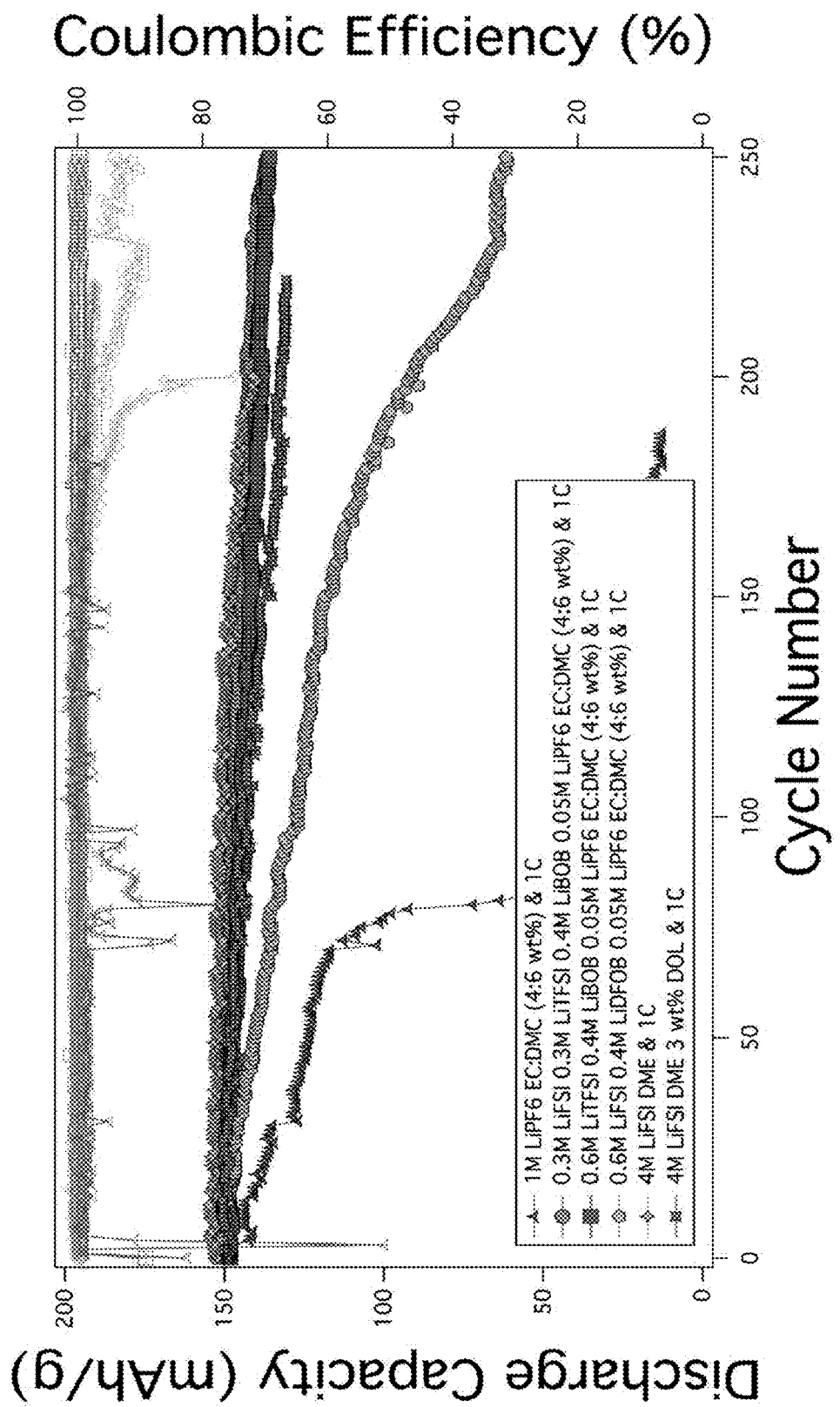
FIG. 30 illustrates the characteristics of lithium metal batteries including coin-type NCM (6/2/2) positive electrodes using EC:DMC (weight ratio 4:6) and DME electrolytes combined with LiFSI, LiTFSI, LiBOB, LiDFOB and LiPF$_6$ salts.

FIG. 30 illustrates the characteristics of coin-type lithium metal batteries using EC:DMC (weight ratio 4:6) electrolytes combined with LiFSI, LiTFSI, LiBOB, LiDFOB and LiPF$_6$ salts. 1 M LiPF$_6$ EC:DMC (weight ratio 4:6) 1C shows comparative data and the battery life is terminated at the 80$^{th}$ cycle, while 0.3 M LiFSI, 0.3 M LiTFSI, 0.4 M LiBOB, 0.05 M LiPF$_6$ EC:DMC (weight ratio 4:6) 1C and 0.6M LiTFSI, 0.4 M LiBOB, 0.05 M LiPF$_6$ EC:DMC (weight ratio 4:6) electrolyte systems show slightly stable capacity maintenance and life characteristics. However, it can be seen that the results are significantly worse as compared to the electrolyte systems of the examples according to the present disclosure. The positive electrode used herein is NCM (6/2/2).

Figure 31:
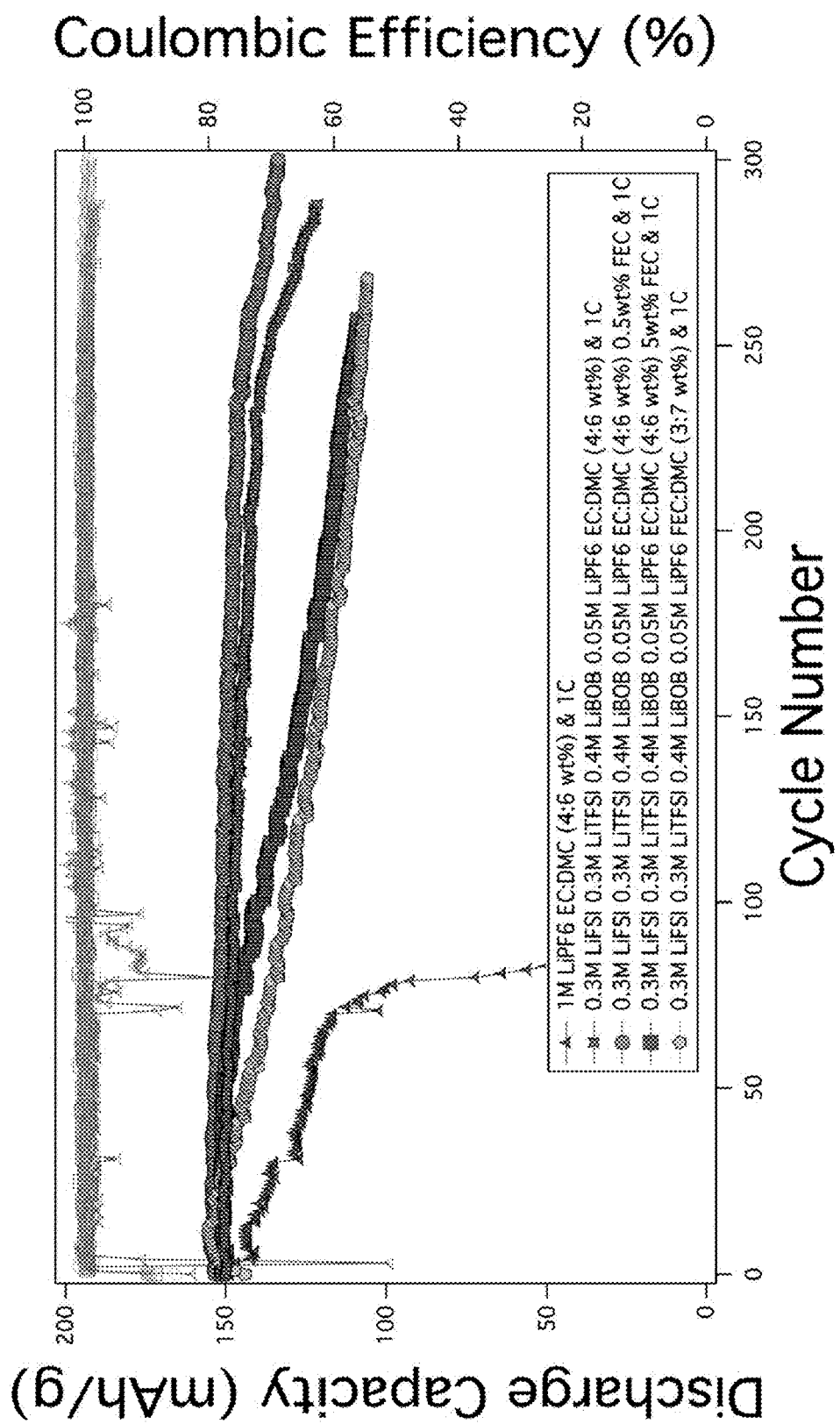
FIG. 31 illustrates the characteristics of lithium metal coin cell batteries using NCM (6/2/2) positive electrodes as a function of addition of FEC in the electrolyte systems including 0.3 M LiFSI, 0.3 M LiTFSI, 0.4 M LiBOB, 0.05 M LiPF$_6$ in EC:DMC (weight ratio 4:6).

FIG. 31 illustrates the characteristics of lithium metal coin cell batteries as a function of addition of FEC in the electrolyte system including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the 1C coin cells using 0.3 M LiFSI, 0.3 M LiTFSI, 0.4 M LiBOB, 0.05 M LiPF$_6$ EC:DMC (weight ratio 4:6) to which FEC is added show slightly improved life characteristics. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 32:
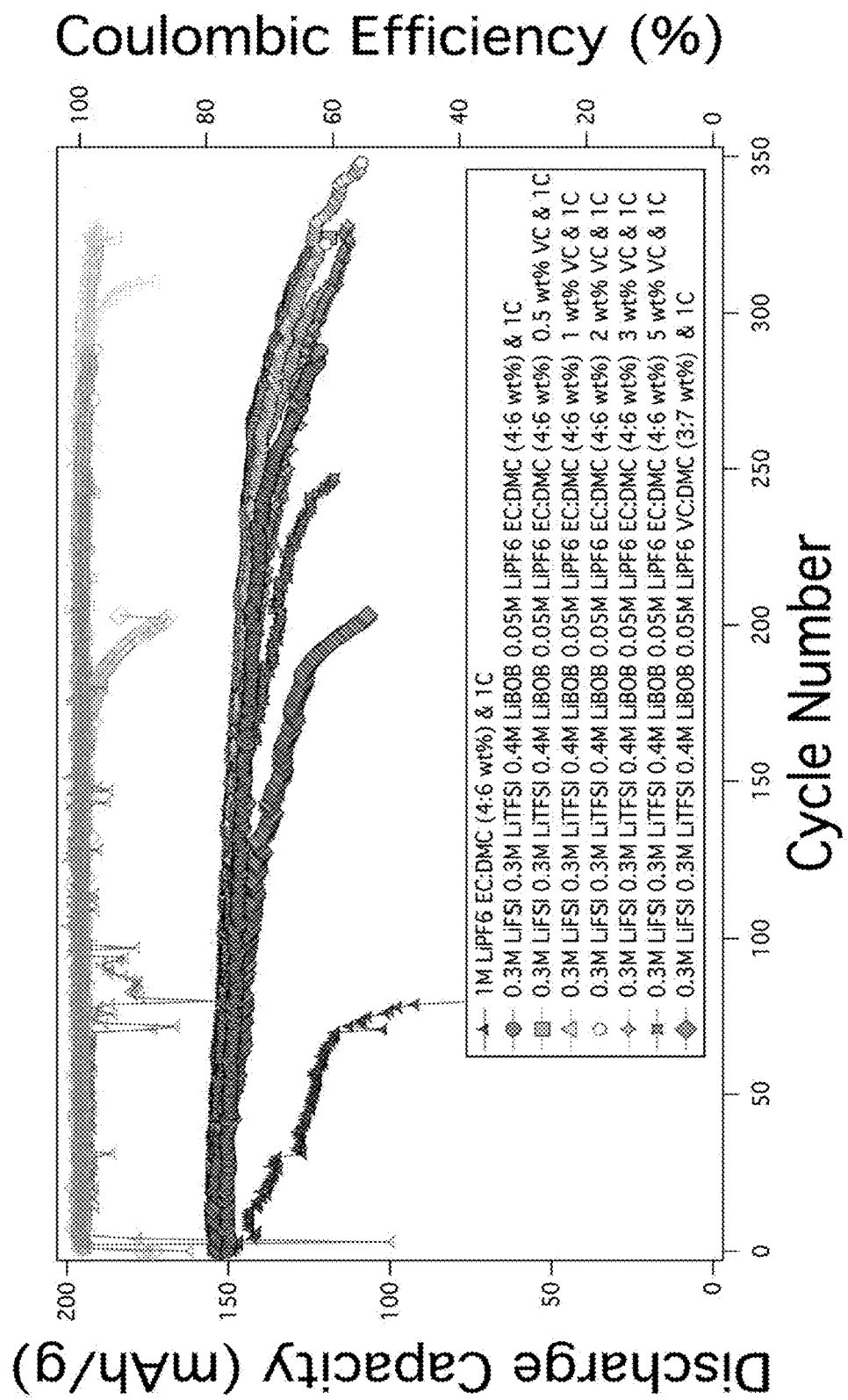
FIG. 32 illustrates the characteristics of lithium metal coin cell batteries using NCM (6/2/2) positive electrodes as a function of addition of VC in the electrolyte systems including 0.3 M LiFSI, 0.3 M LiTFSI, 0.4 M LiBOB, 0.05 M LiPF$_6$ in EC:DMC (weight ratio 4:6).

FIG. 32 illustrates the characteristics of lithium metal coin cell batteries as a function of addition of VC in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.3 M LiFSI, 0.3 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 0.5 wt % or 2 wt %, the most stable capacity maintenance is provided. This is because the SEI formed from VC in the lithium negative electrode and NCM positive electrode inhibits a side reaction with the electrolyte and causes electrochemical surface stabilization. The positive electrode used herein is NCM (6/2/2).

Figure 33:
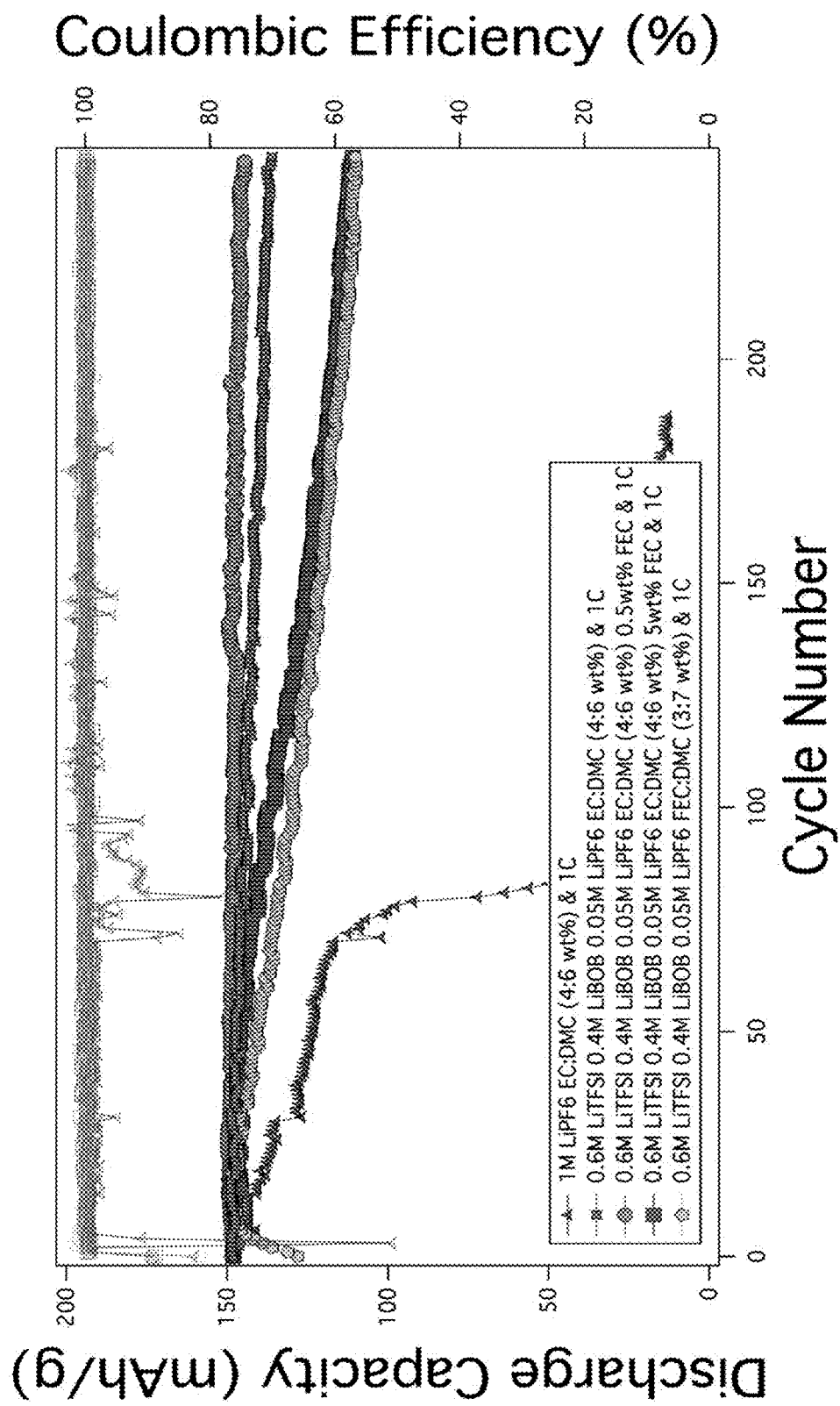
FIG. 33 illustrates the characteristics of lithium metal coin cell batteries using NCM (6/2/2) positive electrodes as a function of addition of FEC in the electrolyte systems including 0.6 M LiTFSI, 0.4 M LiBOB, 0.05 M LiPF$_6$ in EC:DMC (weight ratio 4:6) of FIG. 3.

FIG. 33 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6) of FIG. 31. 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which FEC is added show slightly improved life characteristics under the condition of charging/discharging at 1C. Particularly, when FEC is added at 0.5 wt %, the most stable capacity maintenance is provided. This is because an adequate amount of LiF-based SEI formed from FEC is formed on the lithium negative electrode and stabilizes the SEI on the NCM positive electrode. The positive electrode used herein is NCM (6/2/2).

Figure 34:
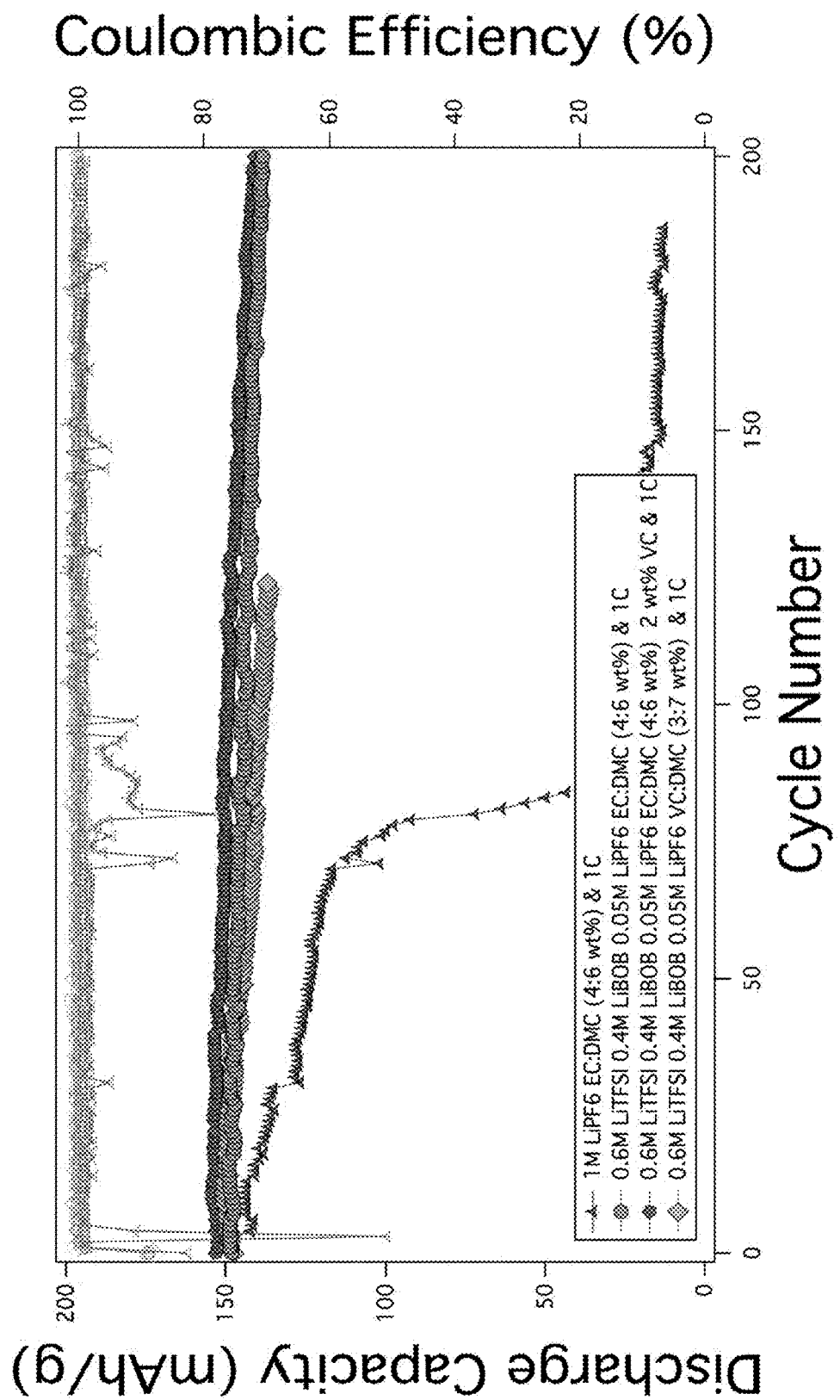
FIG. 34 illustrates the characteristics of lithium metal coin cell batteries using NCM (6/2/2) positive electrodes as a function of addition of VC in the electrolyte systems including 0.6 M LiTFSI, 0.4 M LiBOB, 0.05 M LiPF$_6$ in EC:DMC (weight ratio 4:6).

FIG. 34 illustrates the characteristics of lithium metal coin cell batteries as a function of addition of VC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cells using 0.6 M LiTFSI, 0.4 M LiBOB, 0.05 M LiPF$_6$ EC:DMC (weight ratio 4:6) to which VC is added show slightly improved life characteristics under the condition of charging/discharging at 1C. Particularly, when VC is added at 2 wt %, the most stable capacity maintenance is provided. This is because the SEI formed from VC in the lithium negative electrode and NCM positive electrode inhibits side reaction with the electrolyte and causes electrochemical surface stabilization. The positive electrode used herein is NCM (6/2/2).

Figure 35:
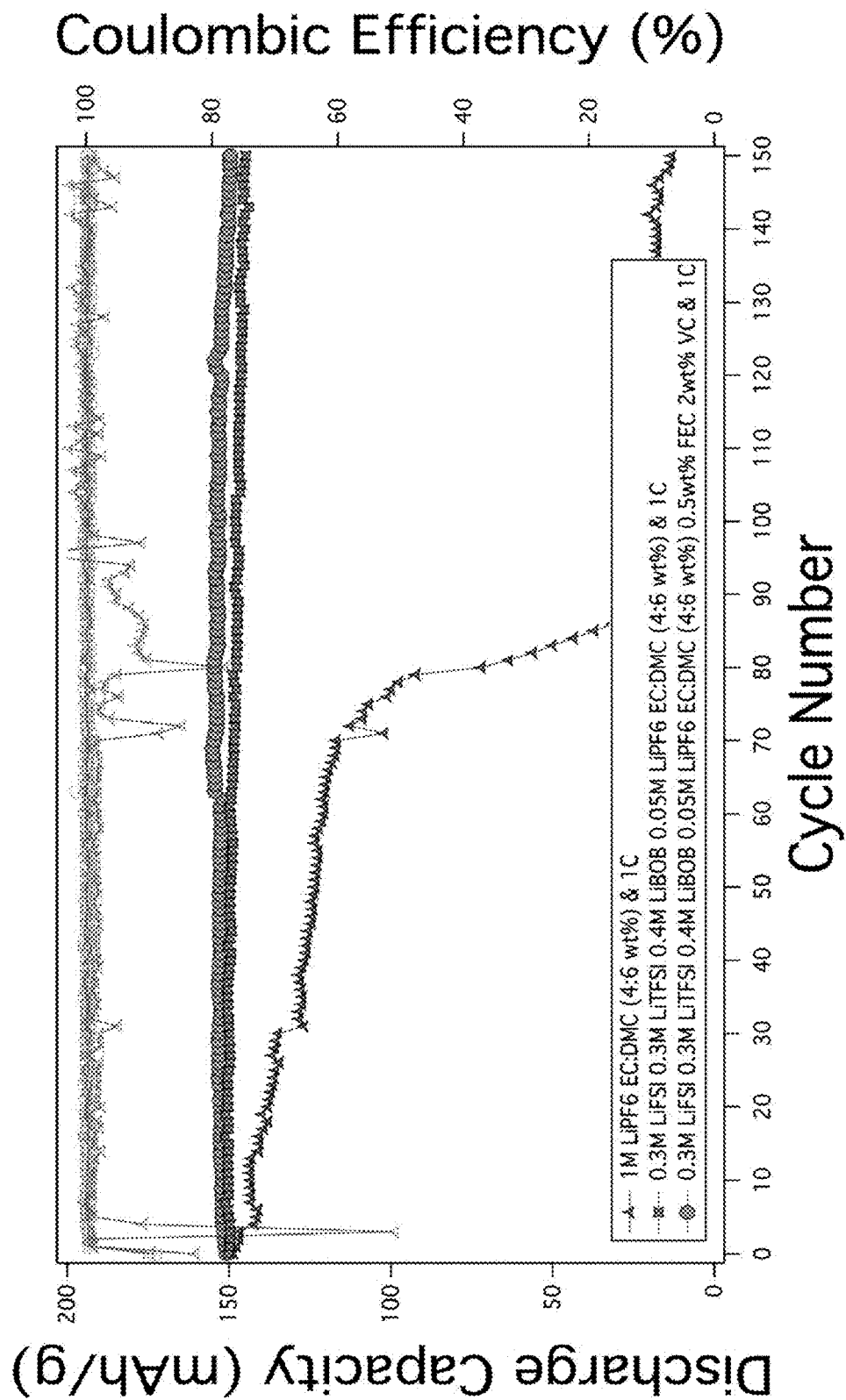
FIG. 35 illustrates the characteristics of lithium metal coin cell batteries using NCM (6/2/2) positive electrodes to which FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6).

FIG. 35 illustrates the characteristics of lithium metal coin cell batteries to which optimized FEC and VC additive solvents are added, in the electrolyte systems including 0.3 M LiFSI, 0.3 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 80$^{th}$ cycle, while the coin cell using 0.3 M LiFSI, 0.3 M LiTFSI, 0.4 M LiBOB, 0.05 M LiPF$_6$ EC:DMC (weight ratio 4:6) in combination with optimized 0.5 wt % of FEC and 2 wt % of VC additive solvents shows the most stable life characteristics under the condition of charging/discharging at 1 C and more stable life characteristics as compared to the electrolyte system using no additive solvent. The positive electrode used herein is NCM (6/2/2).

Figure 36:
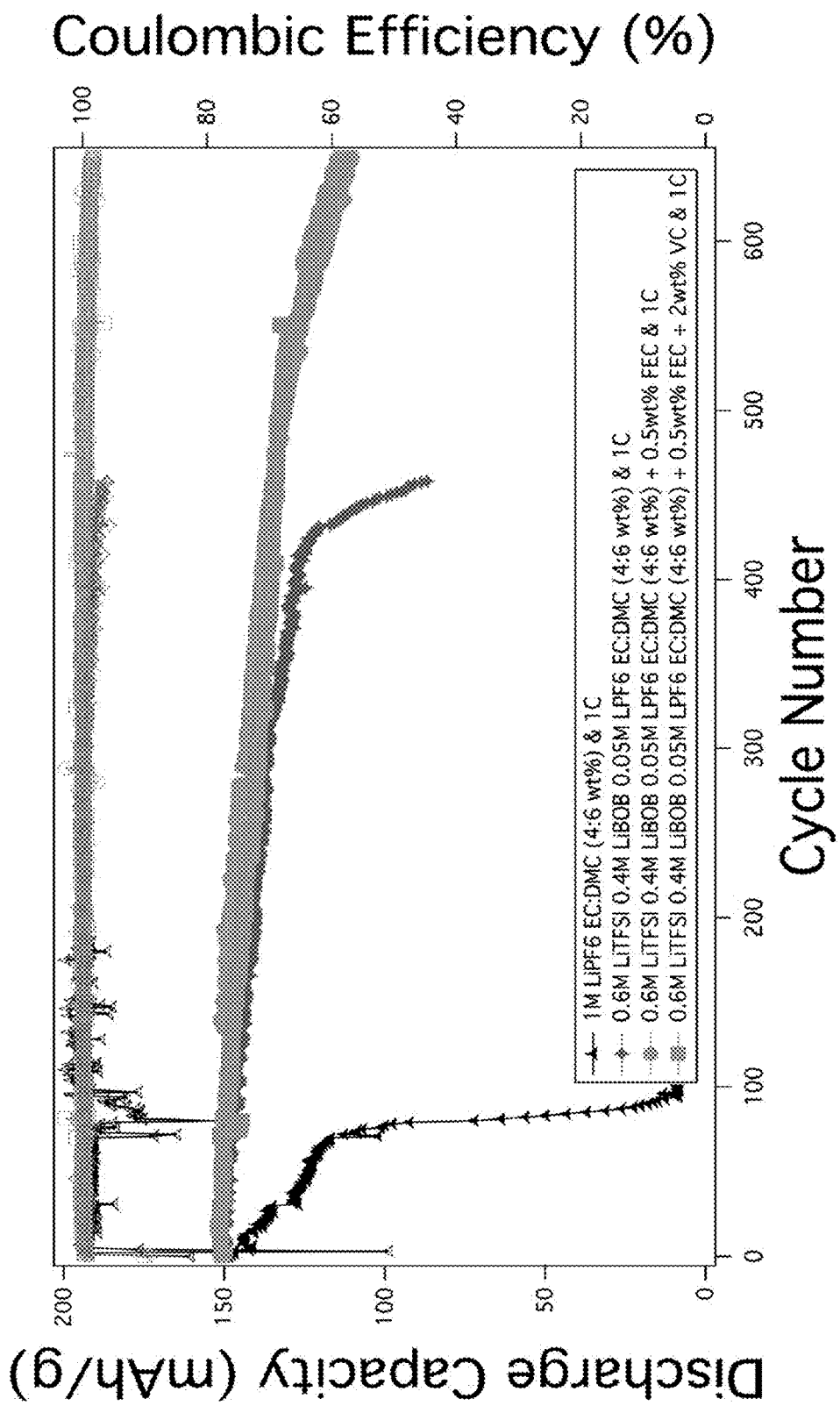
FIG. 36 illustrates the characteristics of lithium metal coin cell batteries using NCM (6/2/2) positive electrodes to which 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6).

FIG. 36 illustrates the characteristics of lithium metal coin cell batteries to which optimized 0.5 wt % of FEC and 0.5 wt % of FEC+2 wt % VC additive solvents are added, in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data including termination of the battery life at the 80$^{th}$ cycle and the electrolyte containing no additive solvent causes termination of the battery life at the 400$^{th}$ cycle, while the coin cell using 0.6 M LiTFSI, 0.4 M LiBOB, 0.05 M LiPF$_6$ EC:DMC (weight ratio 4:6) in combination with optimized 0.5 wt % of FEC alone or 0.5 wt % of FEC and 2 wt % of VC additive solvents shows the most stable life characteristics under the condition of charging/discharging at 1 C and more stable life characteristics as compared to the electrolyte system using no additive solvent.

Figure 37A:
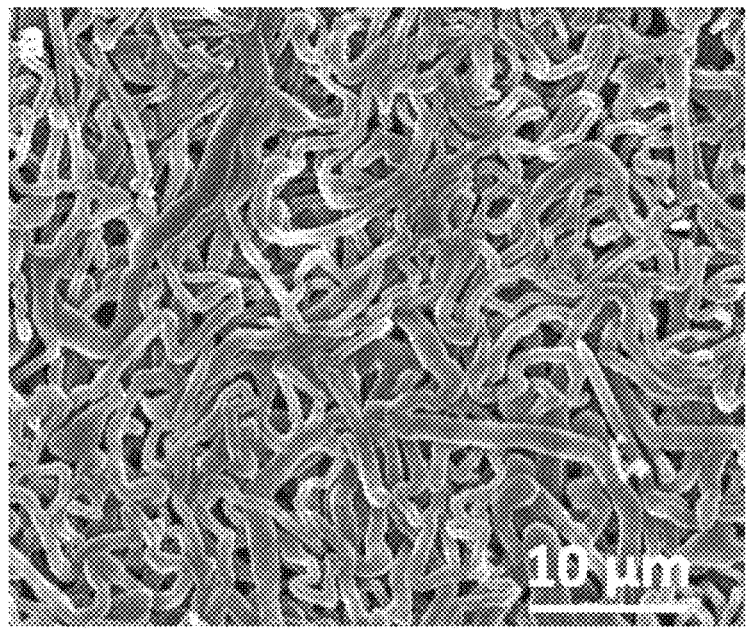
FIGS. 37A and 37B show images of lithium surfaces taken by scanning electron microscopy (SEM) after carrying out cycles by using electrolytes including LiTFSI, LiBOB and LiPF$_6$ salts and EC:DMC to which additive solvents are added or not.
Figure 37B:
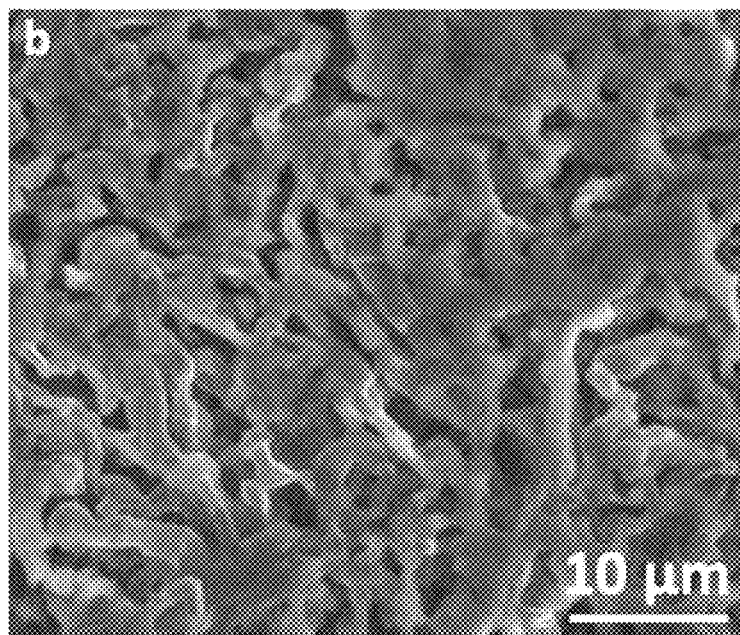

FIGS. 37A and 37B show images of lithium surfaces taken by scanning electron microscopy (SEM) after carrying out cycles by using electrolytes including LiTFSI, LiBOB and LiPF$_6$ salts and EC:DMC to which additive solvents are added or not. After subjecting the cells to 200 charging/discharging cycles at 1 C, the cell (a) using the electrolyte including LiTFSI, LiBOB and LiPF$_6$ salts and EC:DMC with no additive solvent shows a larger amount of formation of high-surface area lithium dendrite and higher surface roughness, as compared to the electrolyte (b) containing an additive solvent. This is because such an adequate combination of the salt with additive solvents allows formation of more stable and elastic SEI on the surface of the lithium negative electrode.

Figure 38:
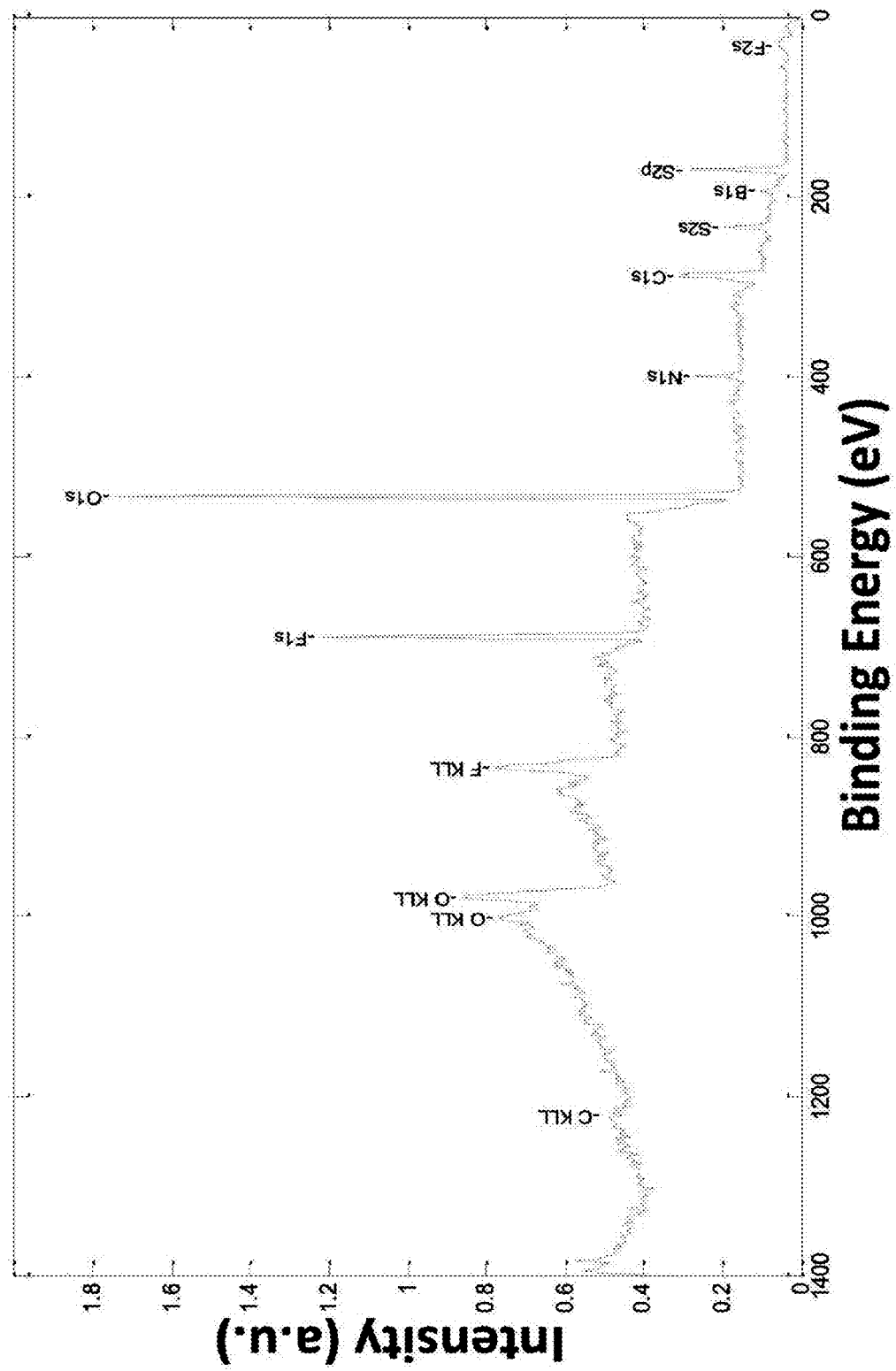
FIG. 38 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C.

FIG. 38 shows the spectrum of a lithium negative electrode surface taken by X-ray photoelectric spectrometry (XPS) after subjecting a cell using electrolytes including LiTFSI, LiBOB and LiPF$_6$ salts and additive solvents to 200 charge/discharge cycles at 1C. After carrying out cycles for a long time by using the electrolyte system including LiTFSI, LiBOB and LiPF$_6$ salts and additive solvents, no Al is detected, and Li (13.99%), B (3.16%), C (26.81%), N (3.41%), O (34%), F (12.41%) and S (5.41%) are detected in the SEI formed from the composition of main salts. This suggests that such an adequate combination of salts inhibits corrosion of Al.

Figure 39:
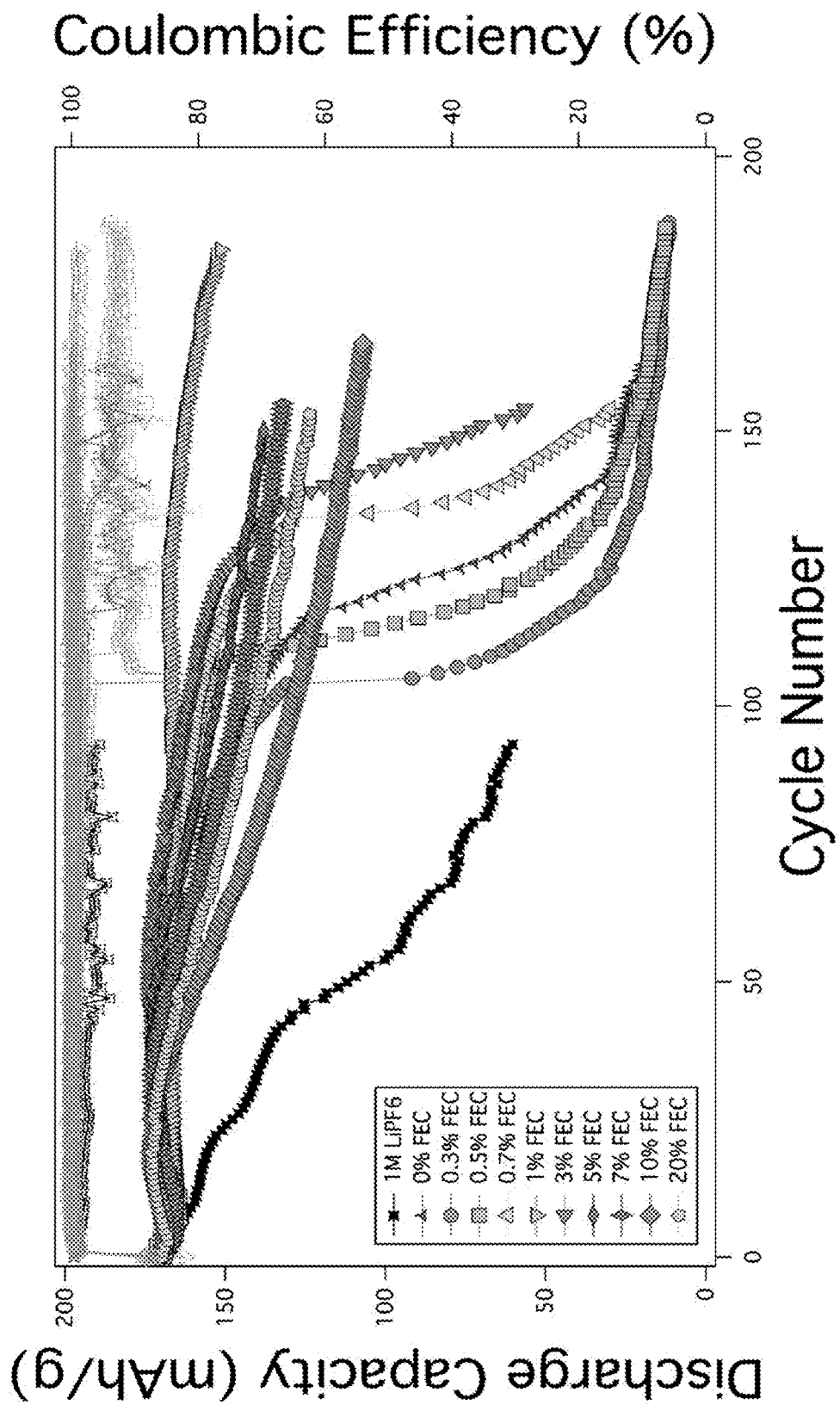
FIG. 39 illustrates the characteristics of lithium metal coin cell batteries using NCM (8/1/1) positive electrodes as a function of addition of FEC in the electrolyte systems including 0.6 M LiTFSI, 0.4 M LiBOB, 0.05 M LiPF$_6$ in EC:DMC (weight ratio 4:6).

FIG. 39 illustrates the characteristics of lithium metal coin cell batteries as a function of addition of FEC in the electrolyte systems including 0.6 M LiTFSI, 0.4 M LiBOB, 0.05 M LiPF$_6$ in EC:DMC (weight ratio 4:6). 1 M LiPF$_6$ EC:DMC (weight ratio 4:6) 1C shows comparative data and the battery life is terminated at the 30$^{th}$ cycle, while the coin cell using 0.6 M LiTFSI, 0.4 M LiBOB, 0.05 M LiPF$_6$ EC:DMC (weight ratio 4:6) in combination with optimized 1 wt % of FEC additive solvent shows the most stable life characteristics under the condition of charging/discharging at 1 C and more stable life characteristics as compared to the electrolyte system using no additive solvent. The positive electrode used herein is NCM (8/1/1). This is a test for finding an optimized FEC addition ratio when using a high-energy density NCM positive electrode different from the above-mentioned positive electrode.

Figure 40:
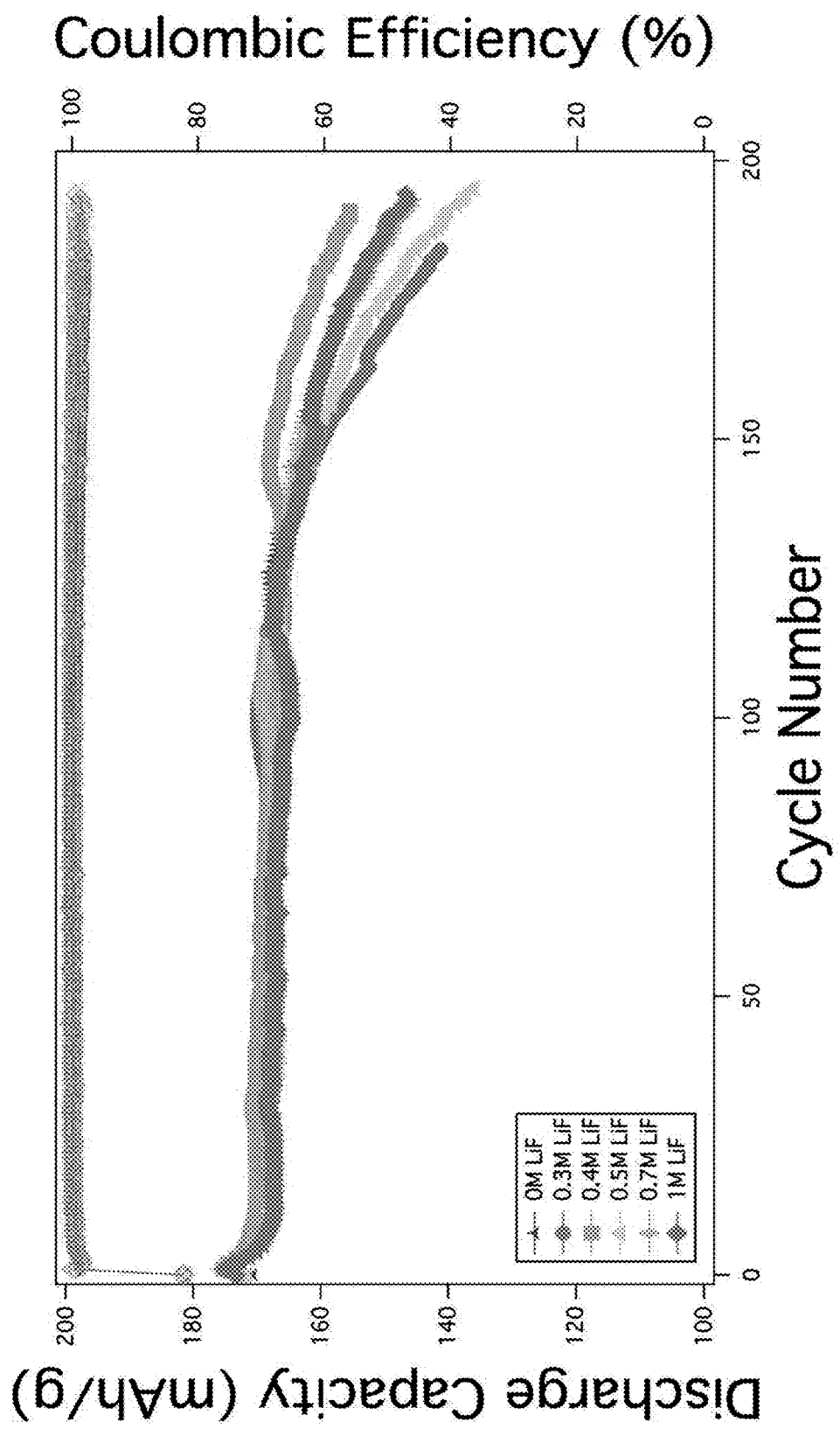
FIG. 40 illustrates the characteristics of lithium metal coin cell batteries using NCM (8/1/1) positive electrodes as a function of concentration of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio).

FIG. 40 illustrates the characteristics of lithium metal coin cell batteries as a function of concentration of LiF (0.3-1M) in the electrolyte systems including 0.6 M LiTFSI, 0.4 M LiBOB, 0.05 M LiPF$_6$ in EC:DMC (weight ratio 4:6) and 1 wt % FEC (weight ratio). The optimized LiF concentration in the electrolyte system of 0.6 M LiTFSI, 0.4 M LiBOB, 0.05 M LiPF$_6$ in EC:DMC (weight ratio 4:6) and 1 wt % FEC (weight ratio) is 0.4 M. The coin cell using the solvent to which the optimized LiF salt is added shows the most stable life characteristics under the condition of charging/discharging at 1 C. The positive electrode used herein is NCM (8/1/1). This is a test for finding an optimized FEC addition ratio when using a high-energy density NCM positive electrode different from the above-mentioned positive electrode.

Figure 41:
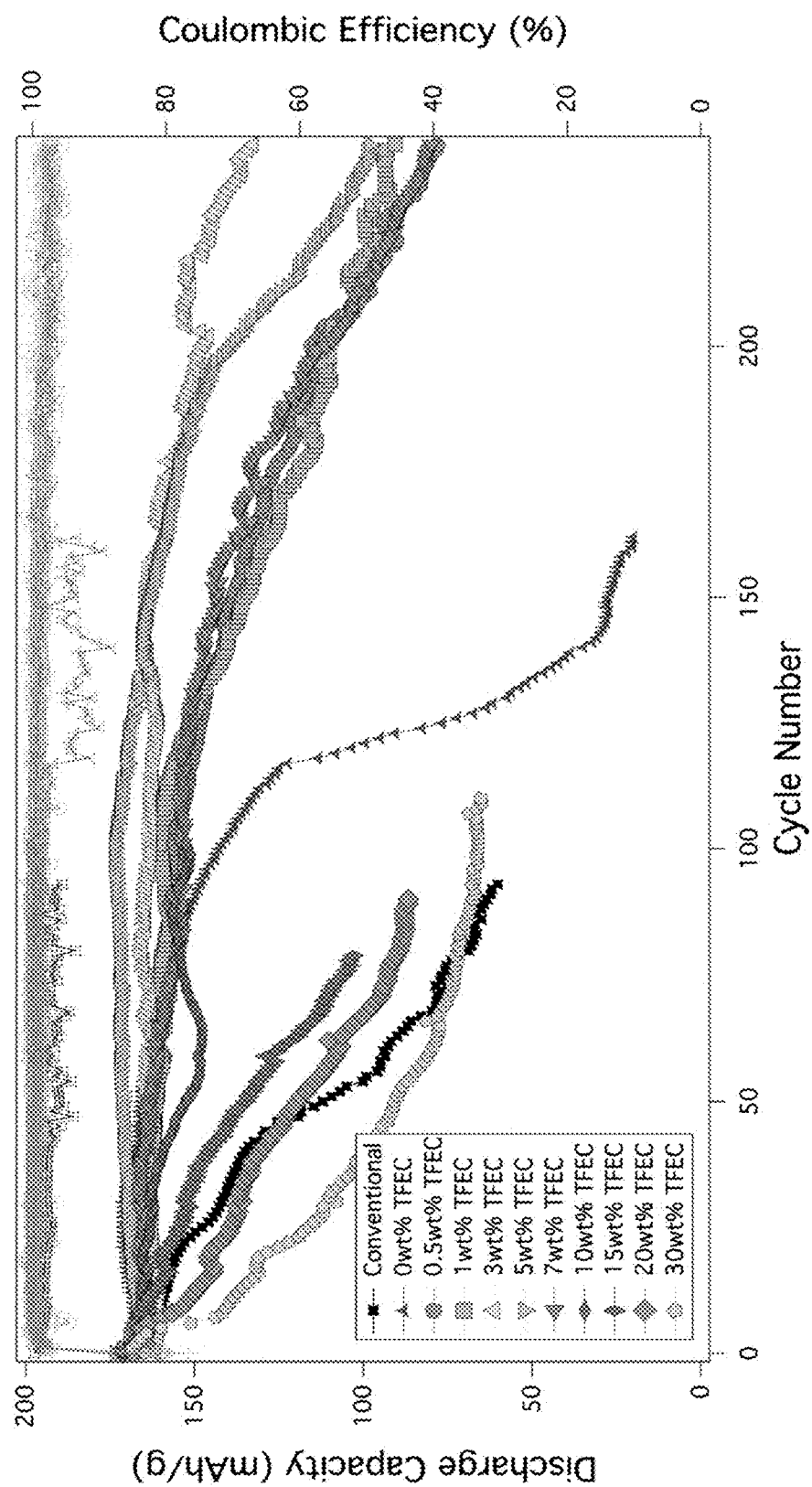
FIG. 41 illustrates the characteristics of lithium metal coin cell batteries using NCM (8/1/1) positive electrodes in the electrolytes including 0.6 M LiTFSI, 0.4 M LiBOB, 0.4M LiF and 0.05 M LiPF$_6$ salts combined with 1 wt % FEC and 3 wt % of VC as solvents, wherein 0-30 wt % of TFEC additive solvent is added to the electrolytes.

FIG. 41 illustrates the cycle characteristics of lithium metal batteries using EC:DMC (weight ratio 4:6), 1 wt % of FEC, 3 wt % of VC solvent combined with 0.6 M LiTFSI, 0.4 M LiBOB, 0.4 M LiF, 0.05 M LiPF$_6$ salts and containing 0-30 wt % of TFEC as an additive solvent. 1 M LiPF$_6$ EC:DMC (weight ratio 4:6) [Conventional] 1C shows comparative data and the battery life is terminated at the 30$^{th}$ cycle, while the electrolyte system including 0.6 M LiTFSI, 0.4 M LiBOB, 0.4 M LiF, 0.05 M LiPF$_6$ in EC:DMC (weight ratio 4:6) combined with 1 wt % of FEC, 3 wt % of VC and 3 wt % of TFEC shows significantly stable capacity maintenance and life characteristics. The positive electrode used herein is NCM (8/1/1). It is most preferred that 3 wt % of TFEC is added in the range of 0-30 wt % of TFEC.

Figure 42:
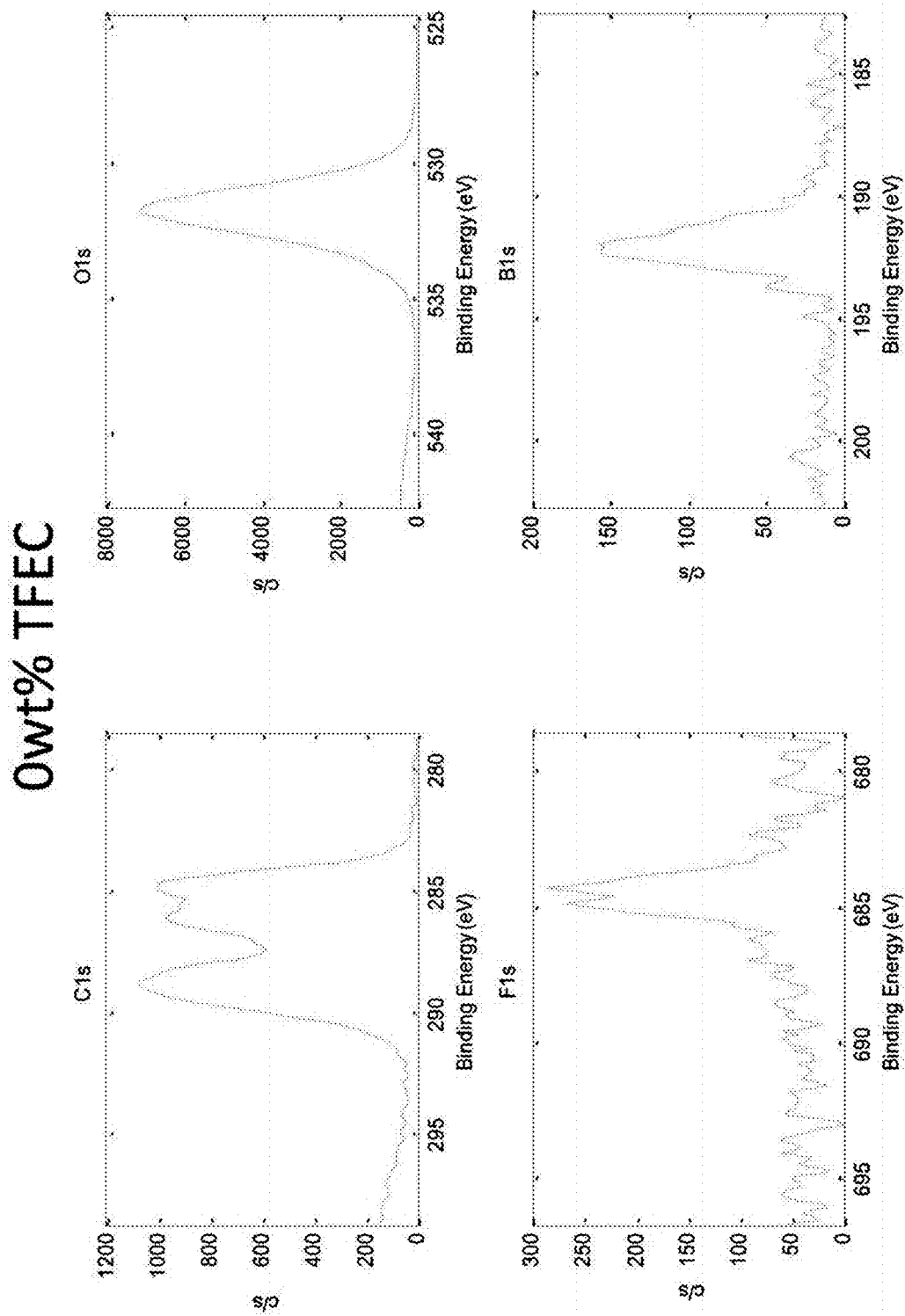
FIG. 42 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0 wt % TFEC.

FIG. 42 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0 wt % TFEC. The positive electrode used herein is NCM (8/1/1).

Figure 43:
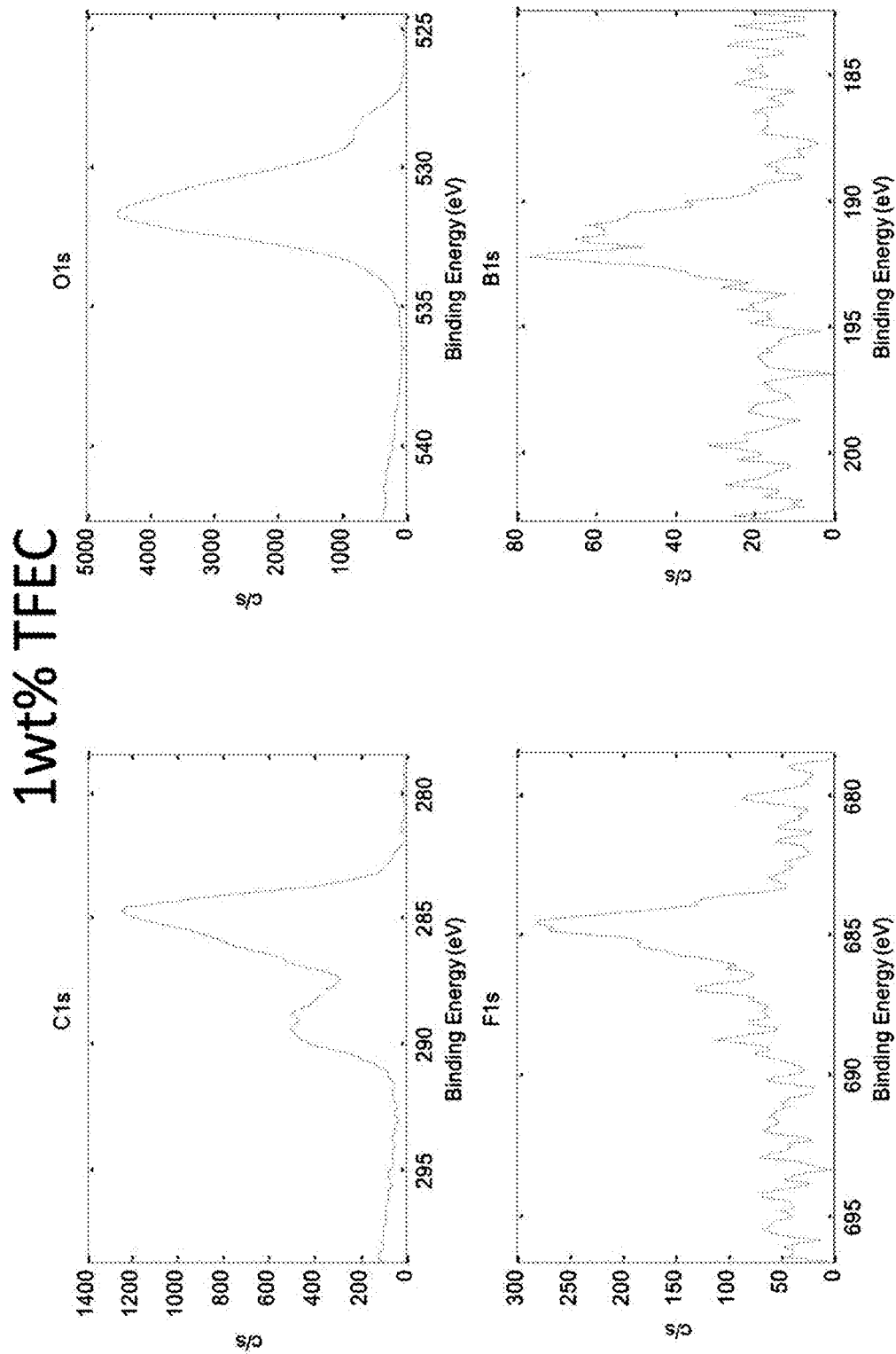
FIG. 43 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 1 wt % TFEC.

FIG. 43 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 1 wt % TFEC. The positive electrode used herein is NCM (8/1/1).

Figure 44:
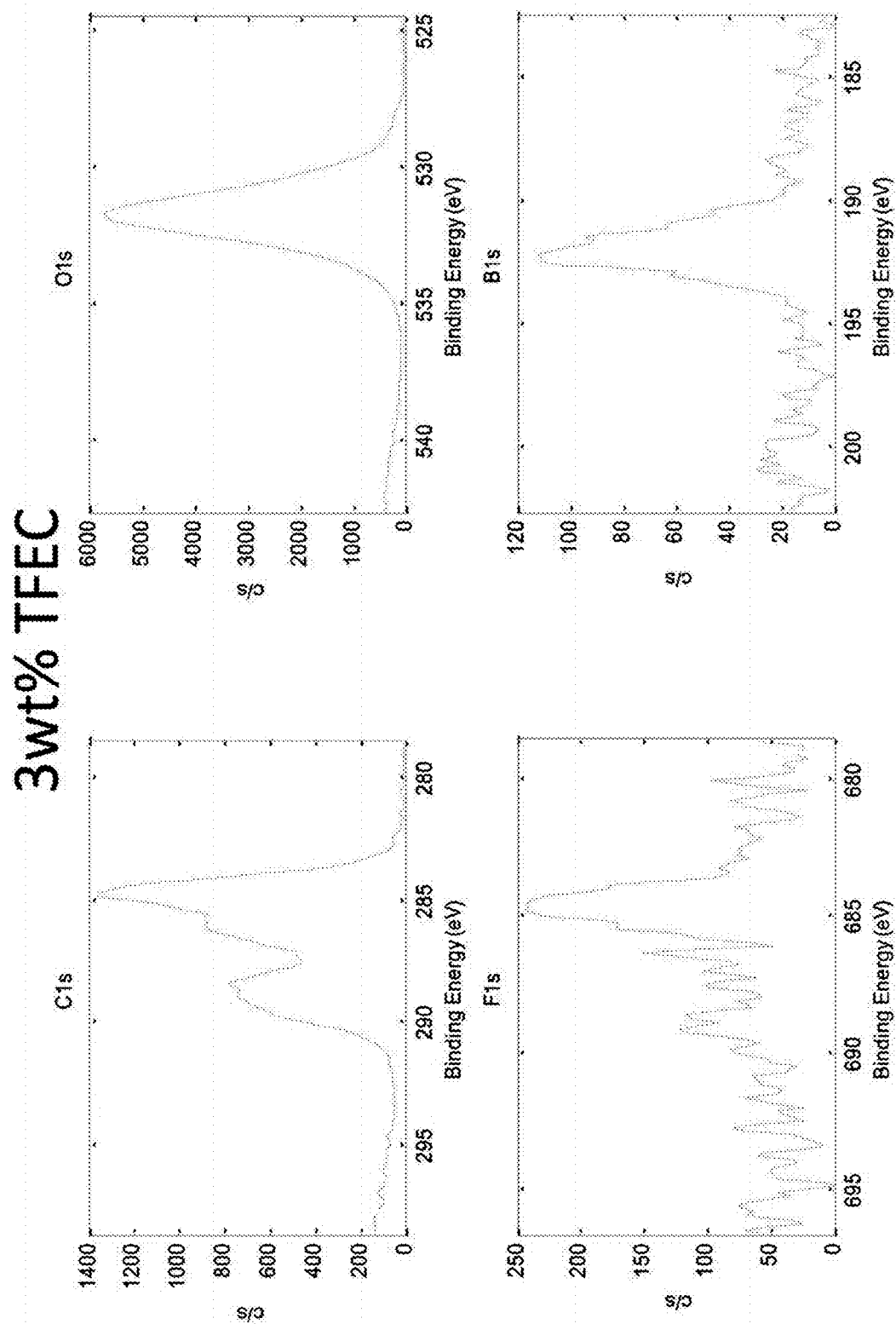
FIG. 44 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 3 wt % of TFEC.

FIG. 44 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 3 wt % TFEC. The positive electrode used herein is NCM (8/1/1).

Figure 45:
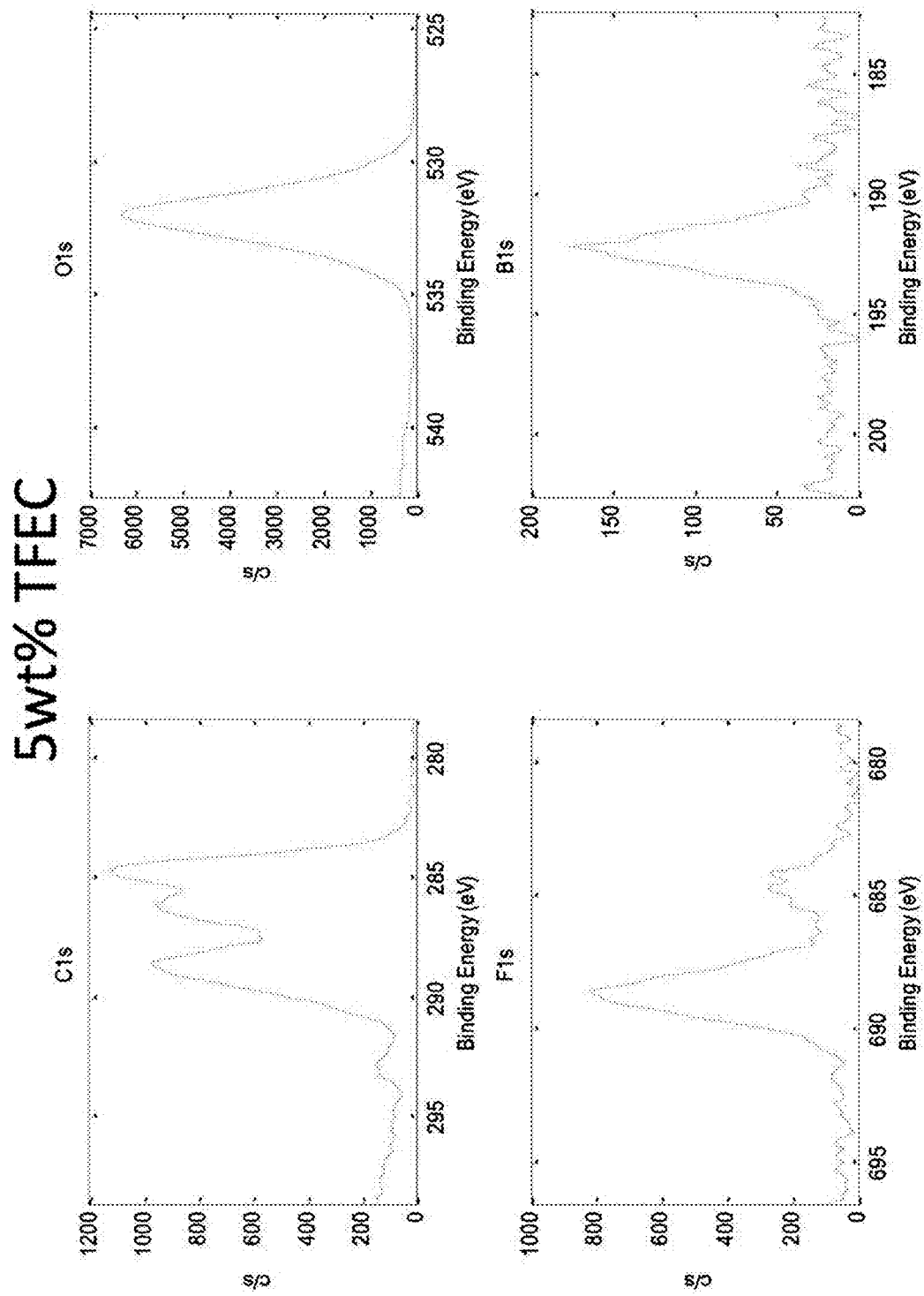
FIG. 45 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 5 wt % TFEC.

FIG. 45 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 5 wt % TFEC. The positive electrode used herein is NCM (8/1/1).

Figure 46:
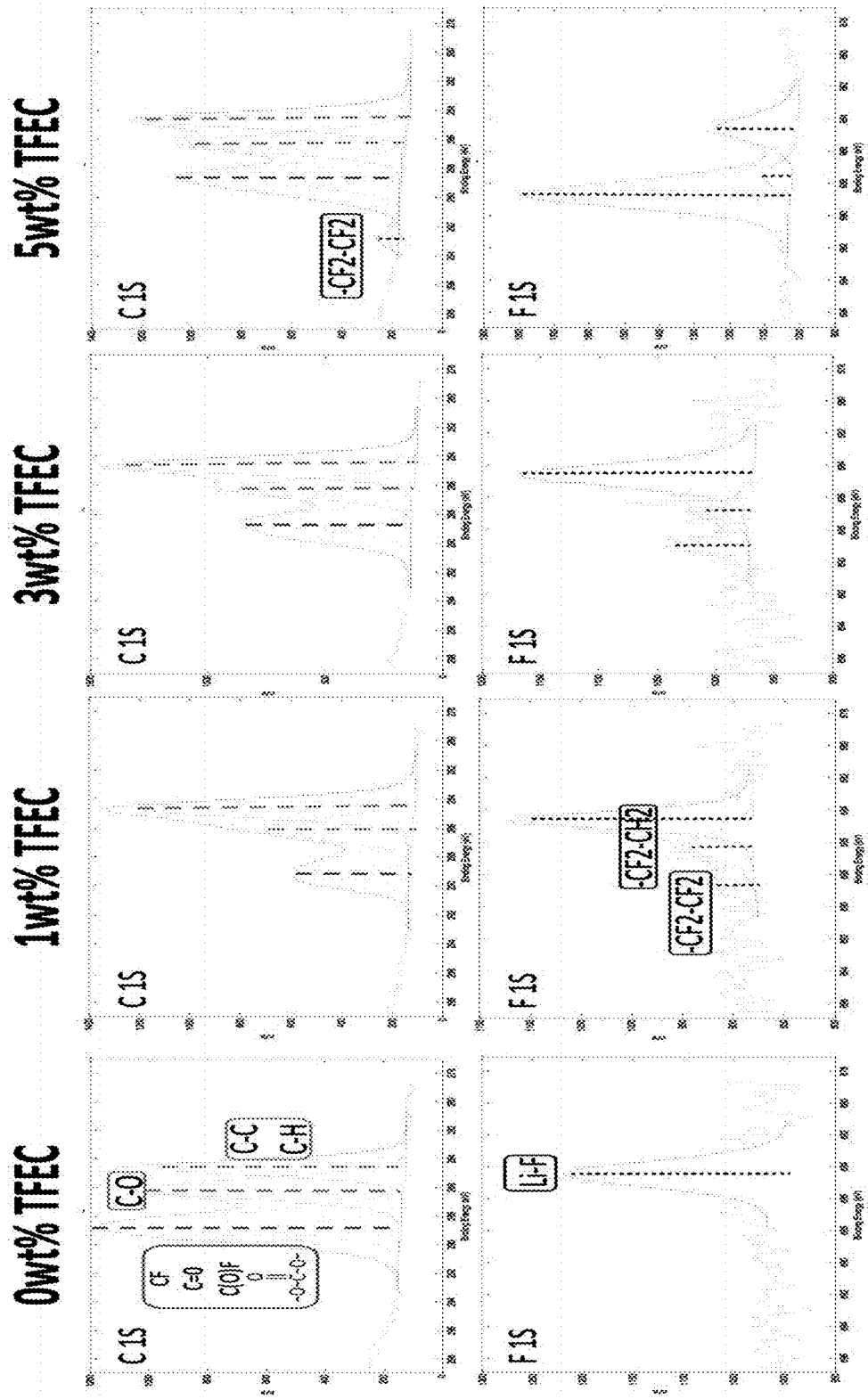
FIG. 46 illustrates narrow scan XPS spectra of C 1s and F 1s elements of FIG. 14 to FIG. 17 and shows a change of each peak.

FIG. 46 illustrates narrow scan XPS spectra of C 1s and F 1s elements of FIG. 42 to FIG. 45 and shows a variation of each peak.

As the weight proportion of TFEC is increased, the peak ratio of LiF is varied, peaks of —CF$_2$—CF$_2$ and CF$_2$—CH$_2$ are newly formed, and the peak ratio of F 1s using 3 wt % of TFEC is most preferred. In addition, referring to C 1s peaks, a higher weight proportion of TFEC provides increased peaks of [C—F, C=O, C(O)F, CO$_3$], i.e., peaks of elements F bound with C. The peak ratio of F 1s using 3 wt % of TFEC is most preferred.

This is because an adequate amount of LiF forms a stable SEI layer but causes degradation of ion conductivity. Thus, when LiF is generated excessively, the SEI layer shows decreased ion conductivity and becomes excessively hard to cause degradation of physical properties.

Meanwhile, the SEI layer having an adequate amount of [C—F, C=O, C(O)F, $CO_3$] bonds has a certain degree of flexibility. Thus, formation of a SEI layer having an adequate ratio of bonds between C and F significantly contributes to improvement of the characteristics of a lithium metal secondary battery.

Figure 47:
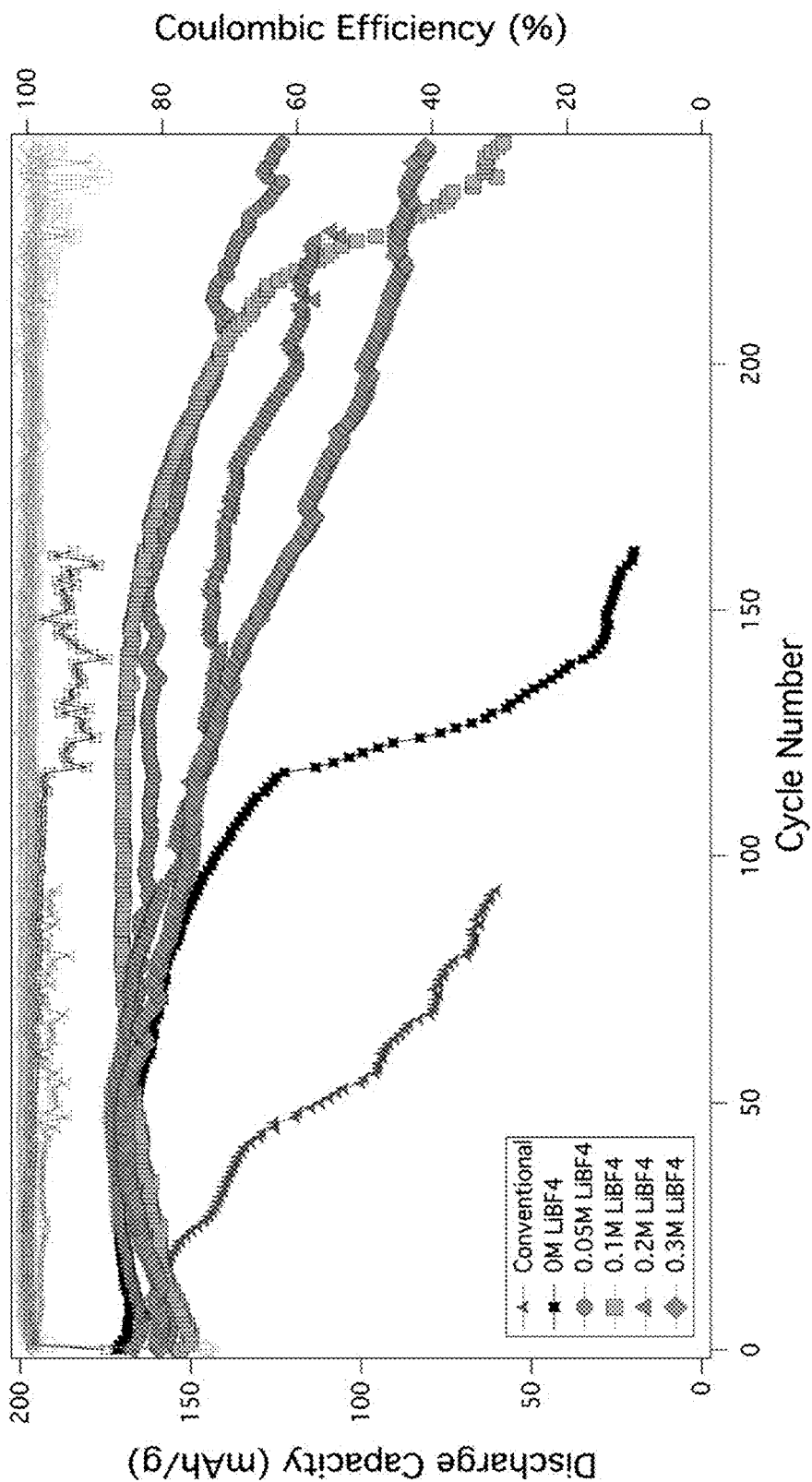
FIG. 47 illustrates the cycle characteristics of lithium metal coin cell batteries using NCM (8/1/1) positive electrodes in the electrolyte systems including 0.6 M LiTFSI, 0.4 M LiBOB, 0.4 M LiF and 0.05 M LiPF$_6$ salts combined with EC:DMC (weight ratio 4:6), 1 wt % FEC and 3 wt % VC solvents, wherein 0-0.3 M of LiBF$_4$ additive salt is added to the electrolytes.

FIG. 47 illustrates the cycle characteristics of lithium metal batteries using EC:DMC (weight ratio 4:6), 1 wt % of FEC, 3 wt % of VC solvent combined with 0.6 M LiTFSI, 0.4 M LiBOB, 0.4 M LiF, 0.05 M $LiPF_6$ salts and containing 0-0.3M of $LiBF_4$ as an additive salt. 1 M $LiPF_6$ EC:DMC (weight ratio 4:6) [Conventional] 1C shows comparative data and the battery life is terminated at the $30^{th}$ cycle, while the electrolyte system including 0.6 M LiTFSI, 0.4 M LiBOB, 0.4 M LiF, 0.05 M $LiPF_6$ in EC:DMC (weight ratio 4:6) combined with 1 wt % of 1-EC, 3 wt % of VC and 0.05 M $LiBF_4$ shows significantly stable capacity maintenance and life characteristics. The positive electrode used herein is NCM (8/1/1). It is most preferred that 0.05 M $LiBF_4$ is added in the range of 0-0.3 M.

Figure 48:
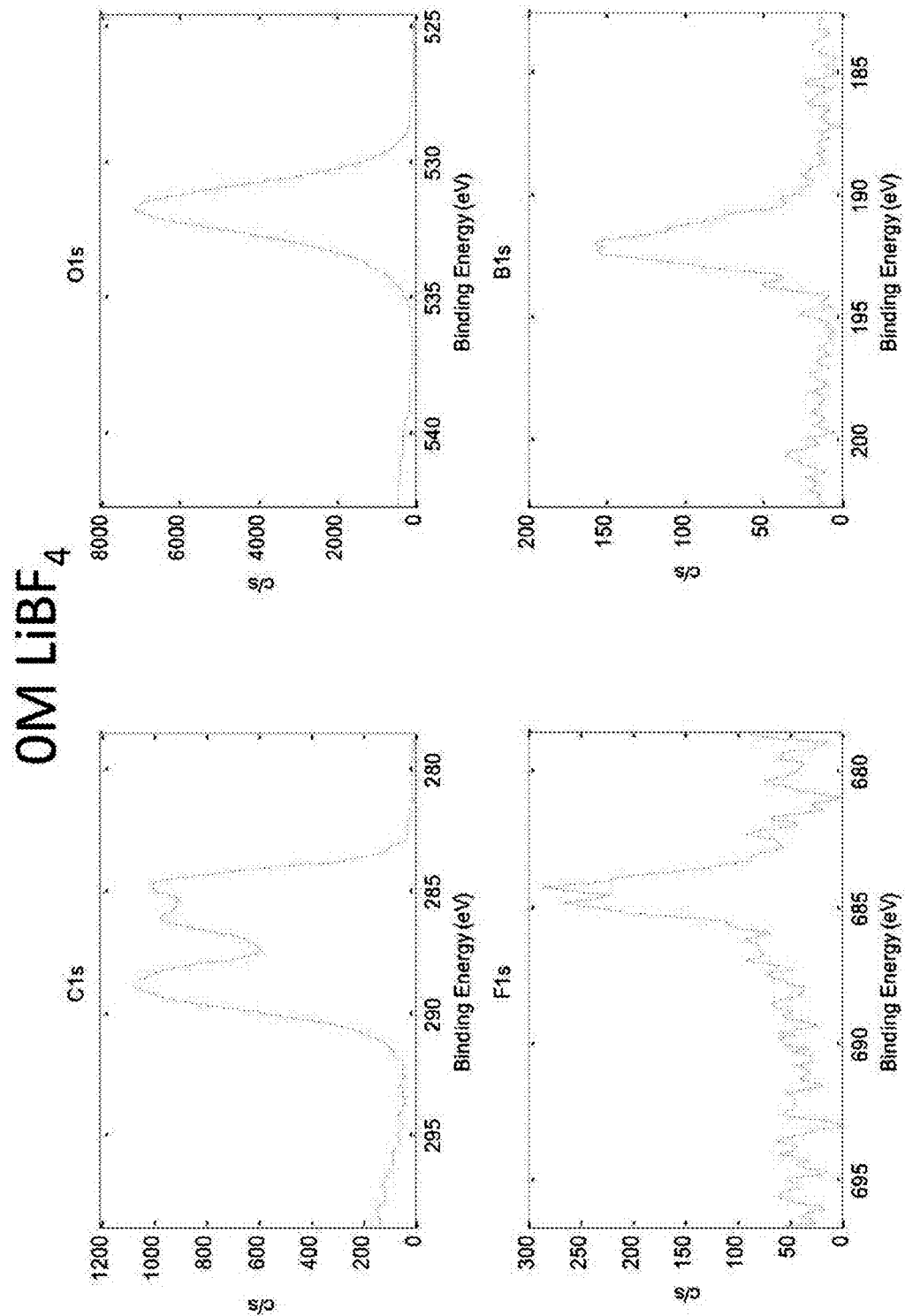
FIG. 48 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0 M LiBF$_4$.

FIG. 48 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M $LiPF_6$ salts in EC:DMC (weight ratio 4:6), 1 wt % FEC, 3 wt % VC and 0 M of $LiBF_4$. The positive electrode used herein is NCM (8/1/1).

Figure 49:
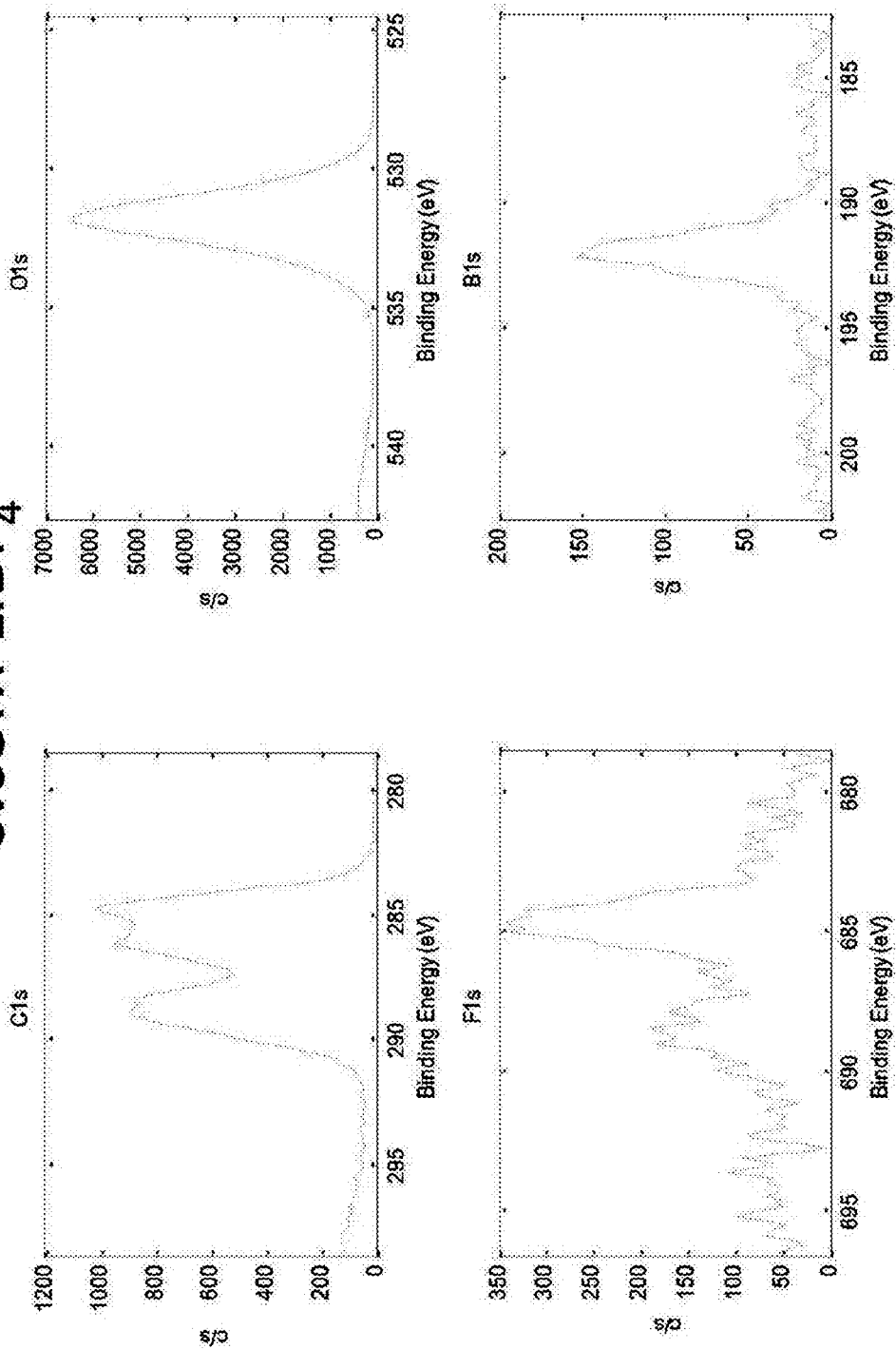
FIG. 49 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0.05 M LiBF$_4$.

FIG. 49 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M $LiPF_6$ salts in EC:DMC (weight ratio 4:6), 1 wt % FEC, 3 wt % VC and 0.05 M $LiBF_4$. The positive electrode used herein is NCM (8/1/1).

Figure 50:
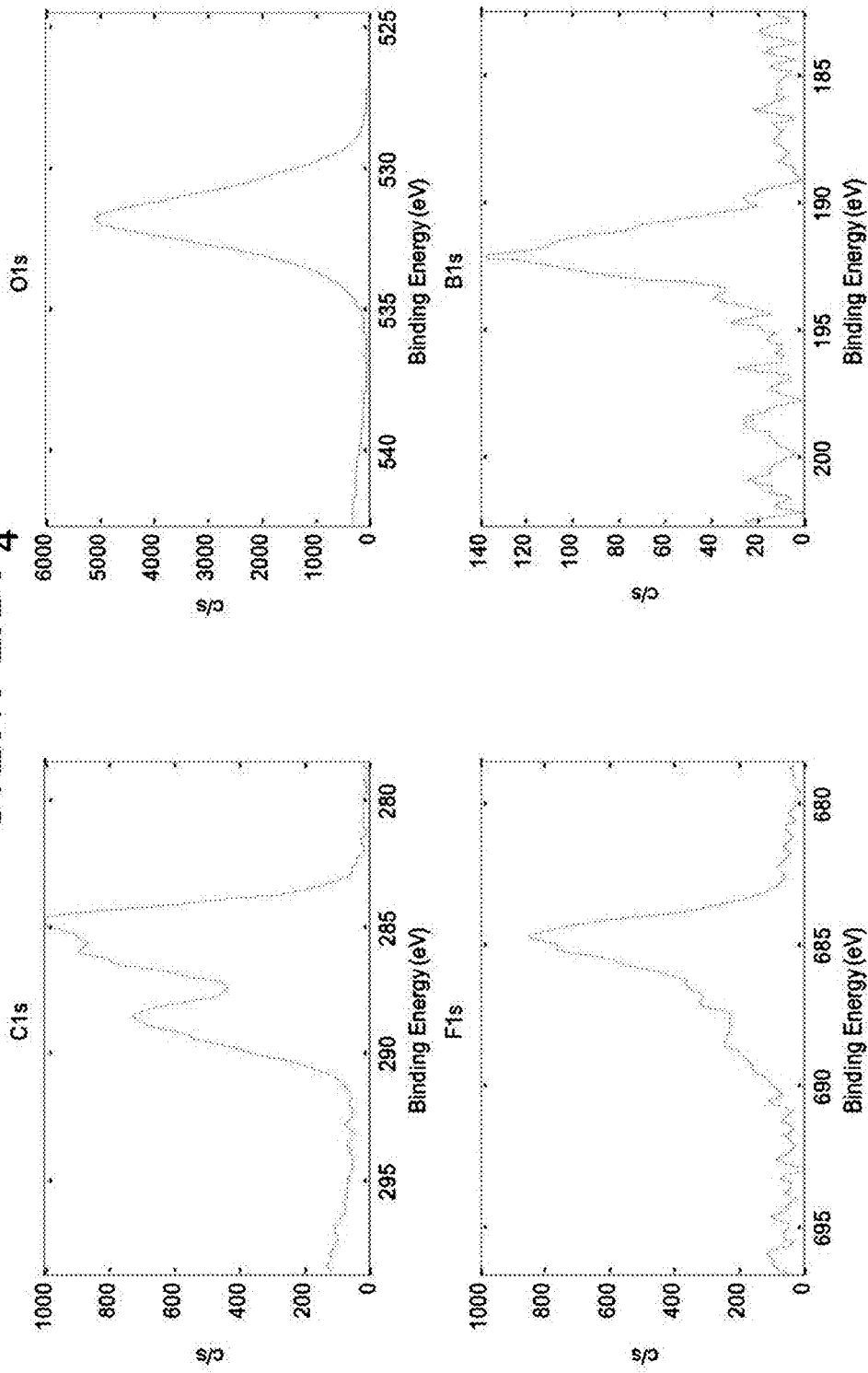
FIG. 50 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0.1 M LiBF$_4$.

FIG. 50 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M $LiPF_6$ salts in EC:DMC (weight ratio 4:6), 1 wt % FEC, 3 wt % VC and 0.1 M $LiBF_4$. The positive electrode used herein is NCM (8/1/1).

Figure 51:
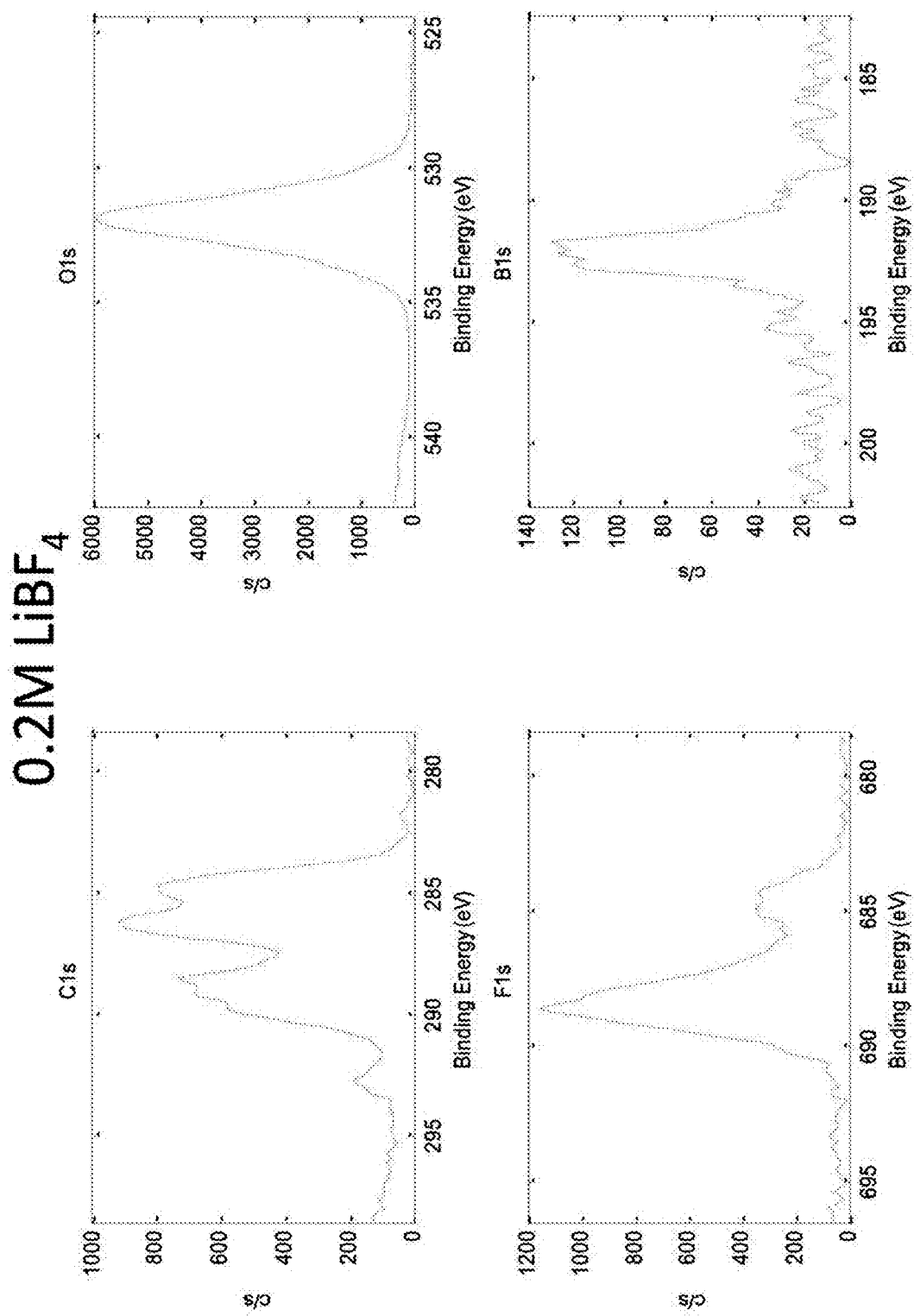
FIG. 51 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0.2 M LiBF$_4$.

FIG. 51 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M $LiPF_6$ salts in EC:DMC (weight ratio 4:6), 1 wt % FEC, 3 wt % VC and 0.2 M $LiBF_4$. The positive electrode used herein is NCM (8/1/1).

Figure 52:
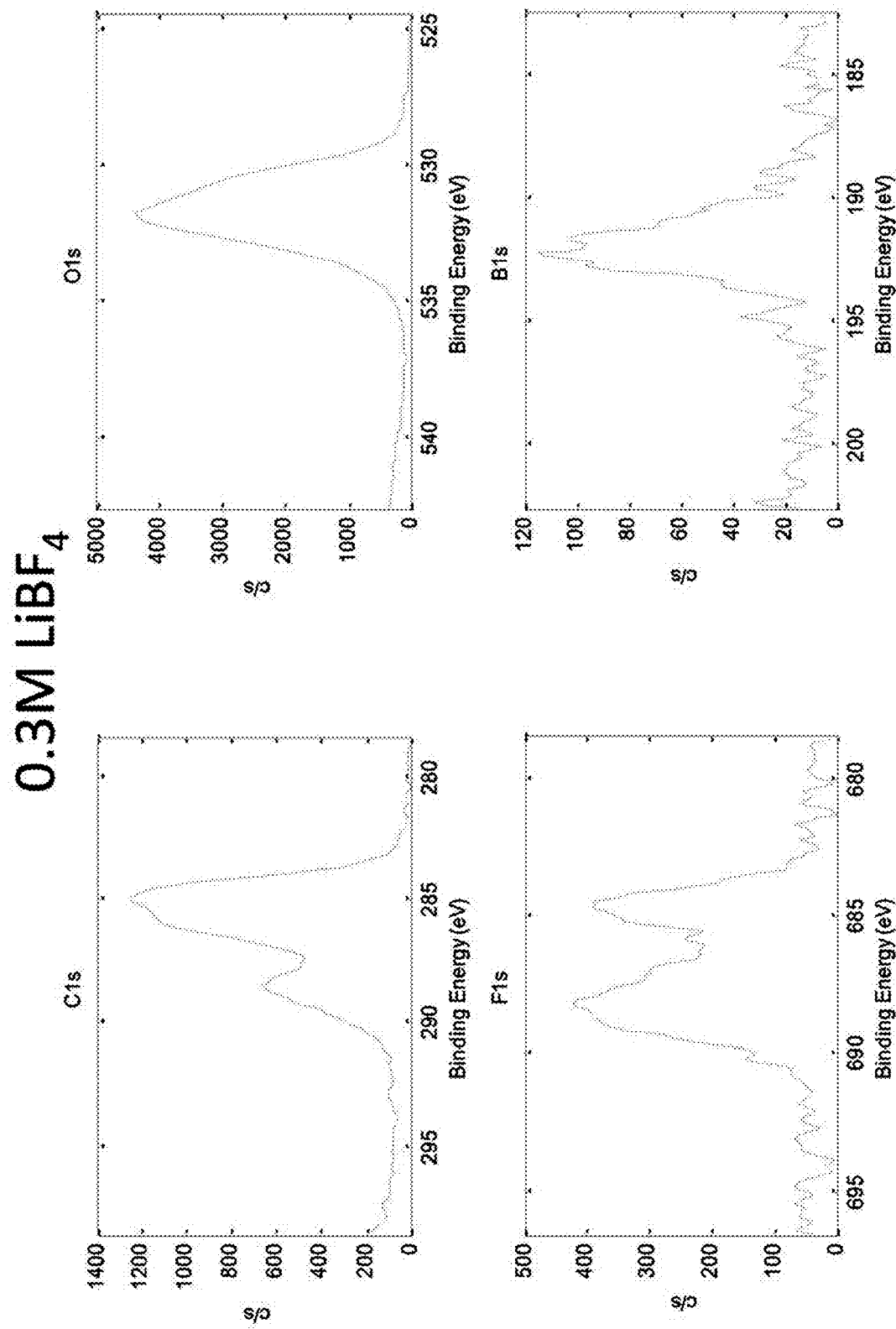
FIG. 52 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M LiPF$_6$ salts in EC:DMC (weight ratio 4:6), 1 wt % FEC, 3 wt % VC and 0.3 M LiBF$_4$.

FIG. 52 illustrates XPS narrow scan spectra (C, O, F and B elements) of the lithium negative electrode surfaces separated from batteries, after carrying out 20 charge/discharge cycles of the batteries at 1C by using electrolytes including 0.6 M LiTFSI, 0.4 M LiBOB, 0.4M LiF and 0.05 M $LiPF_6$ salts in EC:DMC (weight ratio 4:6), 1 wt % FEC, 3 wt % VC and 0.3 M $LiBF_4$. The positive electrode used herein is NCM (8/1/1).

Figure 53:
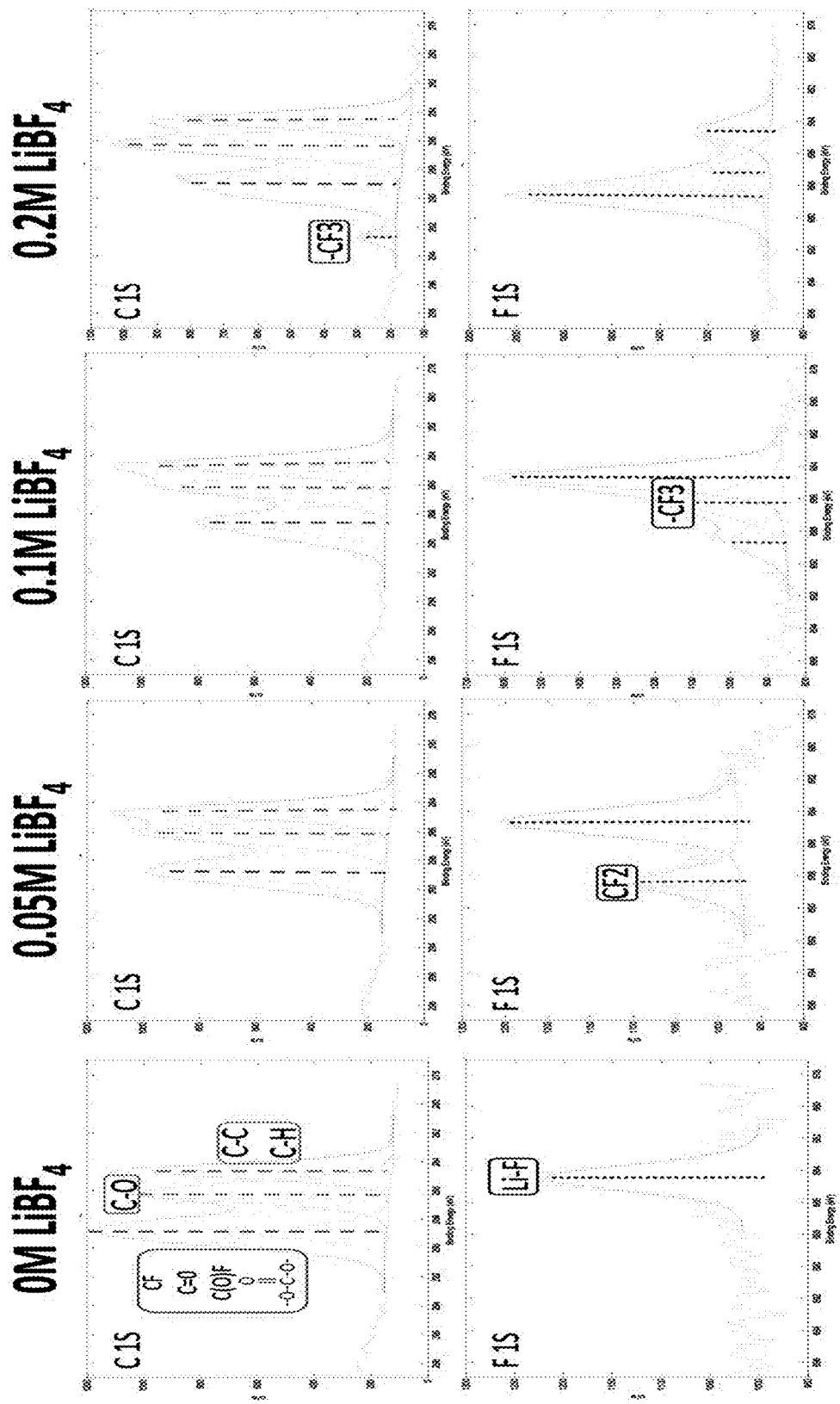
FIG. 53 illustrates narrow scan XPS spectra of C 1s and F 1s elements of FIGS. 20A and 20B to FIG. 23 and shows a variation of each peak.

FIG. 53 illustrates narrow scan XPS spectra of C 1s and F 1s elements of FIG. 48 to FIG. 51 and shows a variation of each peak. As the concentration of $LiBF_4$ is increased, the peak ratios of LiF, —$CF_2$ and —$CF_3$ are varied, and the peak ratio of F is using 0.05M of $LiBF_4$ is most preferred. In addition, referring to C 1s peaks, a higher concentration of $LiBF_4$ provides increased peaks of [C—F, C=O, C(O)F, $CO_3$], i.e., peaks of elements F bound with C. The peak ratio of C 1s using 0.05 M of $LiBF_4$ is most preferred. This is because an adequate amount of LiF forms a stable SEI layer but causes degradation of ion conductivity. Thus, when LiF is generated excessively, the SEI layer shows decreased ion conductivity and becomes excessively hard to cause degradation of physical properties. In addition, the SEI layer having an adequate amount of [C—F, C=O, C(O)F, $CO_3$] bonds has a certain degree of flexibility. Thus, formation of a SEI layer having an adequate ratio of bonds between C and F significantly contributes to improvement of the characteristics of a lithium metal secondary battery.

Figure 54:
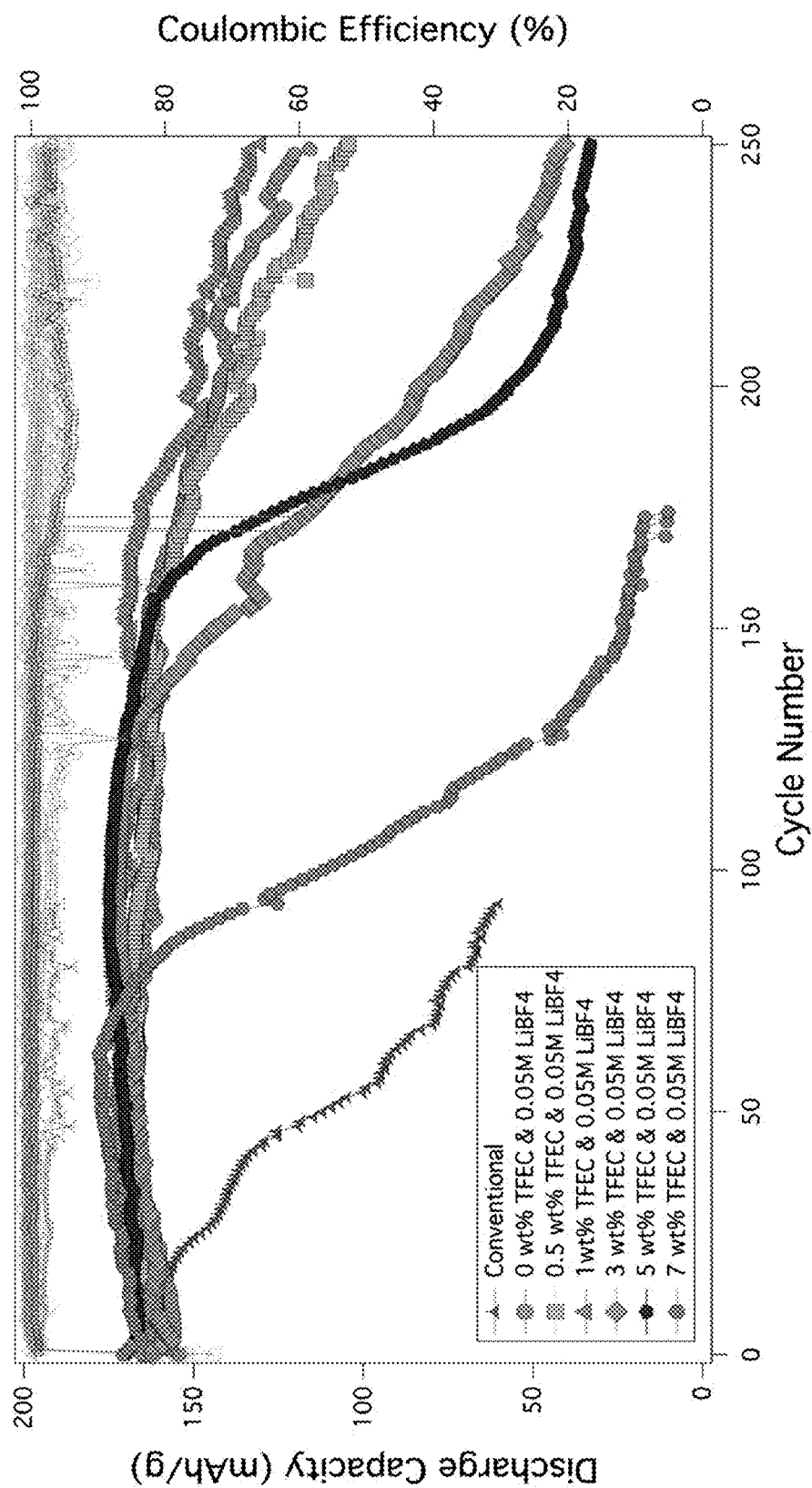
FIG. 54 illustrates the cycle characteristics of lithium metal coin cell batteries using NCM (8/1/1) positive electrodes in the electrolyte systems including 0.6 M LiTFSI, 0.4 M LiBOB, 0.4 M LiF and 0.05 M LiPF$_6$ salts combined with EC:DMC (weight ratio 4:6), 1 wt % FEC and 3 wt % VC solvents, wherein 0-7 wt % of TFEC additive solvent is added to the electrolytes.

FIG. 54 illustrates the cycle characteristics of lithium metal batteries using EC:DMC (weight ratio 4:6), 1 wt % of FEC, 3 wt % of VC solvent combined with 0.6 M LiTFSI, 0.4 M LiBOB, 0.4 M LiF, 0.05 M $LiPF_6$, 0.05 M $LiBF_4$ salts and containing 0-7 wt % of TFEC as an additive solvent. 1 M $LiPF_6$ EC:DMC (weight ratio 4:6) [Conventional] 1C shows comparative data and the battery life is terminated at the $30^{th}$ cycle, while the electrolyte system including 0.6 M LiTFSI, 0.4 M LiBOB, 0.4 M LiF, 0.05 M $LiPF_6$, 0.05 M $LiBF_4$ salts in EC:DMC (weight ratio 4:6) combined with 1 wt % of FEC, 3 wt % of VC and 1 wt % TFEC shows significantly stable capacity maintenance and life characteristics. The positive electrode used herein is NCM (8/1/1). It is most preferred that 1 wt % of TFEC is added in the range of 0-7 wt %, among the electrolytes to which 0.05 M $LiBF_4$ is added.

What is claimed is:

1. An electrolyte for a lithium metal secondary battery, comprising:
   (a) a first salt selected from the group consisting of LiFSI, LiTFSI, and a combination thereof;
   (b) a second salt selected from the group consisting of LiBOB, LiDFOB, and a combination thereof;
   (c) a third salt comprising $LiPF_6$;
   (d) a solvent comprising a mixture of EC and DMC;
   (e) a first additive that has solvent properties and that is selected from the group consisting of 0.4-1.5 wt % of FEC, 0.01-3.5 wt % of VC, and combinations thereof based on total weight of the electrolyte; and
   (f) a second additive that has solvent properties and that is 2.5-4.5 wt % of TFEC based on the total weight of the electrolyte.

2. The electrolyte for a lithium metal secondary battery according to claim 1, wherein:
   the first salt comprises 0.2-0.4 M of LiFSI and 0.2-0.4 M of LiTFSI or 0.3-1 M of LiTFSI alone,
   the third salt comprises 0.03-0.07 M of $LiPF_6$, and
   the mixture of EC and DMC has a mixing ratio by weight of EC to DMC that is 3-6:7-4.

3. The electrolyte for a lithium metal secondary battery according to claim 2, wherein:
   the first salt comprises 0.5-0.7 M of LiTFSI alone,
   the second salt comprises 0.3-0.5 M of LiBOB alone,
   the third salt comprises 0.04-0.06 M of $LiPF_6$, and
   the mixture of EC and DMC has a mixing ratio by weight of EC to DMC that is 3.75-5.25:6.25-4.75.

4. The electrolyte for a lithium metal secondary battery according to claim 1, wherein:
   the electrolyte further comprises 0.4-0.5 M of LiF salt, and
   the first additive comprises 0.7-1.2 wt % of FEC based on the total weight of the electrolyte.

5. The electrolyte for a lithium metal secondary battery according to claim 1, wherein:
the first salt comprises 0.5-0.7 M of LiTFSI alone,
the second salt comprises 0.35-0.45 M of LiBOB alone,
the third salt comprises 0.04-0.06 M of $LiPF_6$,
the mixture of EC and DMC has a mixing ratio by weight of EC to DMC that is 3.75-5.25:6.25-4.75,
the electrolyte further comprises 0.4-0.5 M of LiF salt, and
the first additive comprises 0.8-1.2 wt % of FEC based on total weight of the electrolyte and optionally comprises 0.01-3.5 wt % of VC.

6. A lithium metal secondary battery, comprising:
the electrolyte as defined in claim 1, and
a positive electrode that comprises lithium nickel cobalt manganese oxide.

7. An electric device comprising the lithium metal secondary battery as defined in claim 6.

8. The electric device according to claim 7, which is selected from the group consisting of a communication device, a transport device, an energy storage device, and an acoustic device.

9. An electrolyte for a lithium metal secondary battery, comprising:
(a) a first salt selected from the group consisting of LiFSI, LiTFSI, and a combination thereof;
(b) a second salt selected from the group consisting of LiBOB, LiDFOB, and a combination thereof;
(c) a third salt comprising $LiPF_6$; and
(d) a solvent comprising a mixture of EC and DMC,
(e) a first additive that has solvent properties and that is selected from the group consisting of 0.4-1.5 wt % of FEC, 0.01-3.5 wt % of VC, and a combination thereof based on total weight of the electrolyte;
(f) a fourth salt comprising 0.02-0.06 M of $LiBF_4$, and
(g) a second additive that has solvent properties and that is 0.8-1.2 wt % of TFEC based on total weight of the electrolyte.

10. The electrolyte for a lithium metal secondary battery according to claim 9, wherein:
the first salt comprises 0.2-0.4 M of LiFSI and 0.2-0.4 M of LiTFSI or 0.3-1 M of LiTFSI alone,
the third salt comprises 0.03-0.07 M of $LiPF_6$,
the mixture of EC and DMC has a mixing ratio by weight of EC to DMC that is 3-6:7-4.

11. The electrolyte for a lithium metal secondary battery according to claim 10, wherein:
the first salt comprises 0.5-0.7 M of LiTFSI alone,
the second salt comprises 0.3-0.5 M of LiBOB alone,
the third salt comprises 0.04-0.06 M of $LiPF_6$, and
the mixture of EC and DMC has a mixing ratio by weight of EC to DMC that is 3.75-5.25:6.25-4.75.

12. The electrolyte for a lithium metal secondary battery according to claim 9, wherein the first additive comprises 0.5-1.3 wt % of FEC based on the total weight of the electrolyte and optionally comprises 0.01-3.5 wt % of VC based on the total weight of the electrolyte.

13. The electrolyte for a lithium metal secondary battery according to claim 12, further comprising from 0.3-0.5 M of LiF salt.

14. The electrolyte for a lithium metal secondary battery according to claim 13, wherein the first additive comprises 0.7-1.2 wt % of FEC based on the total weight of the electrolyte, and optionally comprises 0.01-3.5 wt % of VC based on the total weight of the electrolyte.

15. The electrolyte for a lithium metal secondary battery according to claim 9, wherein:
the first salt comprises 0.5-0.7 M of LiTFSI alone,
the second salt comprises 0.35-0.45 M of LiBOB alone,
the third salt comprises 0.04-0.06 M of $LiPF_6$,
the mixture of EC and DMC has a mixing ratio by weight of EC to DMC that is 3.75-5.25:6.25-4.75,
the electrolyte further comprises 0.3-0.5 M of LiF salt, and
the first additive comprises 0.8-1.2 wt % of FEC based on the total weight of the electrolyte and optionally comprises 0.01-3.5 wt % of VC.

16. The electrolyte for a lithium metal secondary battery according to claim 15, wherein:
the electrolyte further comprises 0.05-0.1 M of $LiNO_3$ salt.

* * * * *